(12) United States Patent
Brown et al.

(10) Patent No.: US 8,517,260 B1
(45) Date of Patent: *Aug. 27, 2013

(54) BANKING SYSTEM CONTROLLED RESPONSIVE TO DATA BEARING RECORDS

(71) Applicant: Diebold, Incorporated, North Canton, OH (US)

(72) Inventors: Martin J. Brown, Canton, OH (US); Todd Galloway, Canton, OH (US); Robert W. Barnett, Louisville, OH (US); Mike R. Ryan, Canton, OH (US); James R. Kay, Uniontown, OH (US); Mark A. Ward, North Canton, OH (US); David A. Peters, Tallmadge, OH (US); Songtao Ma, Wadsworth, OH (US); Sangeeta Huria, Copley, OH (US); Eric Klein, Massillon, OH (US); Tim Crews, Alliance, OH (US)

(73) Assignee: Diebold Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,000

(22) Filed: Oct. 15, 2012

Related U.S. Application Data

(63) Continuation of application No. 13/334,124, filed on Dec. 22, 2011, now Pat. No. 8,286,867, which is a continuation of application No. 12/378,050, filed on Feb. 10, 2009, now Pat. No. 8,083,136, which is a continuation-in-part of application No. 11/371,272, filed on Mar. 8, 2006, now Pat. No. 7,494,052, which is a continuation-in-part of application No. 09/723,304, filed on Nov. 27, 2000, now abandoned.

(Continued)

(51) Int. Cl.
*G06K 7/00* (2006.01)

(52) U.S. Cl.
USPC .......................................................... 235/379

(58) Field of Classification Search
USPC .......................................................... 235/379
See application file for complete search history.

(56) References Cited

U.S. PATENT DOCUMENTS

| 4,944,505 | A | * | 7/1990 | Sherman, III | ............ | 271/265.03 |
| 5,680,472 | A | * | 10/1997 | Conant | ......................... | 382/135 |

(Continued)

*Primary Examiner* — Christle Marshall
(74) *Attorney, Agent, or Firm* — Ralph E. Jocke; Daniel D. Wasil; Walker & Jocke

(57) ABSTRACT

An automated banking machine operates to carry out financial transfers responsive to data read form data bearing records. The machine includes a card reader that operates to read data from user cards. The card data corresponds to financial accounts. The machine further includes a cash dispenser and a receipt printer. The machine can dispense cash to an authorized user based on read card data including an identifier of an authorized financial account. The machine can cause a dispensed amount of cash to be transferred from the financial account through communication with at least one remote computer. The machine can also dispense cash in exchange for a check received through a check acceptor. The check acceptor includes a check imager that can scan a check to generate a check image. The check acceptor can read magnetic check data on a check and check data from a check image.

20 Claims, 39 Drawing Sheets

Related U.S. Application Data

(60) Provisional application No. 61/065,303, filed on Feb. 11, 2008, provisional application No. 61/065,304, filed on Feb. 11, 2008, provisional application No. 61/065,331, filed on Feb. 11, 2008, provisional application No. 61/065,334, filed on Feb. 11, 2008, provisional application No. 61/065,336, filed on Feb. 11, 2008, provisional application No. 61/065,337, filed on Feb. 11, 2008, provisional application No. 61/065,338, filed on Feb. 11, 2008, provisional application No. 61/065,378, filed on Feb. 11, 2008, provisional application No. 60/659,990, filed on Mar. 9, 2005, provisional application No. 60/660,075, filed on Mar. 9, 2005, provisional application No. 60/167,996, filed on Nov. 30, 1999, provisional application No. 61/065,302, filed on Feb. 11, 2008.

(56) References Cited

U.S. PATENT DOCUMENTS

| | | | | |
|---|---|---|---|---|
| 6,078,683 | A | * | 6/2000 | Denison et al. ............... 382/135 |
| 8,286,867 | B1 | * | 10/2012 | Brown et al. ................. 235/380 |

* cited by examiner

| MICR | Blanks | Zone 6 | Confidence | Classification |
|---|---|---|---|---|
| absent | clean | clean | High | copied |
| absent | clean | dirty | Medium | copied |
| absent | dirty | clean | Low | copied |
| absent | dirty | dirty | Low | copied |
| absent | clean | clean | Medium | copied |
| absent | clean | dirty | Medium | copied |
| absent | dirty | clean | Medium | copied |
| absent | dirty | dirty | High | copied |
| present | clean | clean | High | good ← 651 |
| present | clean | dirty | Medium | good ← 652 |
| present | dirty | clean | Low | copied |
| present | dirty | dirty | Medium | copied |
| present | clean | clean | Medium | copied |
| present | clean | dirty | High | copied |
| present | dirty | clean | High | copied |
| present | dirty | dirty | High | copied |

E-13B MICR FONT FEATURE VECTOR TABLE

| 0 | 1 | 2 | 3 | 4 | 5 | 6 | 7 | 8 | 9 | Transit | Amount | Dash | On-Us |
|---|---|---|---|---|---|---|---|---|---|---------|--------|------|-------|
| 130 | 68 | 105 | 85 | 69 | 105 | 70 | 75 | 79 | 166 | 104 | 72 | 71 | 70 |
| -90 | 0 | -45 | 93 | 0 | -45 | -30 | -34 | 86 | -45 | 0 | 0 | -65 | 0 |
| 0 | 85 | 0 | -107 | -50 | 0 | 41 | 70 | -99 | -77 | 0 | -73 | 67 | 0 |
| 0 | -55 | 53 | 0 | 0 | 0 | -22 | -88 | 0 | 0 | -104 | 77 | 0 | -70 |
| 0 | -99 | -102 | 0 | 105 | 53 | 0 | 28 | 0 | 54 | 0 | -75 | -71 | 101 |
| 0 | 0 | 0 | -55 | 0 | -102 | 105 | -51 | 105 | -88 | 105 | 68 | 67 | -97 |
| 103 | 0 | 0 | 0 | -123 | 0 | -154 | 0 | -73 | 0 | 0 | 0 | 0 | 99 |
| -126 | 0 | 0 | 0 | 0 | 0 | 0 | 0 | -86 | 0 | -106 | -73 | -71 | -98 |

FIG 24

CMC7 Standard Feature Matrix

| 0 | 1 | 2 | 3 | 4 | 5 | 6 | 7 | 8 | 9 | I | T | A | N | R |
|---|---|---|---|---|---|---|---|---|---|---|---|---|---|---|
| 10 | 15 | 10 | 15 | 15 | 10 | 10 | 15 | 10 | 10 | 15 | 10 | 10 | 10 | 10 |
| 10 | 10 | 15 | 10 | 10 | 10 | 10 | 15 | 15 | 15 | 10 | 15 | 10 | 10 | 10 |
| 15 | 10 | 15 | 15 | 10 | 10 | 15 | 10 | 10 | 10 | 10 | 10 | 15 | 10 | 10 |
| 15 | 10 | 10 | 10 | 15 | 15 | 10 | 10 | 10 | 15 | 10 | 10 | 10 | 15 | 10 |
| 10 | 15 | 10 | 10 | 10 | 15 | 15 | 10 | 15 | 10 | 10 | 10 | 10 | 10 | 15 |
| 10 | 10 | 10 | 10 | 10 | 10 | 10 | 10 | 10 | 10 | 15 | 15 | 15 | 15 | 15 |

I = SI, T = SIII, A = SII, N = SIV, R = SV

Face up, right side up.

Face up, upside down.

Face down, right side up.

Face down, upside down.

BANKING SYSTEM CONTROLLED RESPONSIVE TO DATA BEARING RECORDS

CROSS-REFERENCE TO RELATED APPLICATIONS

This application is a continuation of U.S. application Ser. No. 13/334,124 filed Dec. 22, 2011, now U.S. Pat. No. 8,286, 867. Application Ser. No. 13/334,124 is a continuation of Ser. No. 12/378,050 filed Feb. 10, 2009, now U.S. Pat. No. 8,083, 136, which claims benefit under 35 U.S.C. §119(e) of Provisional Applications 61/065,302; 61/065,303; 61/065,304; 61/065,331; 61/065,334; 61/065,336; 61/065,337; 61/065, 338; and 61/065,378; each of which was filed Feb. 11, 2008. Application Ser. No. 12/378,050 is also a continuation-in-part of U.S. application Ser. No. 11/371,372 filed Mar. 8, 2006, now U.S. Pat. No. 7,494,052, which claims the benefit pursuant to 35 U.S.C. §119(e) of Provisional Applications 60/659,990 and 60/660,075 each filed Mar. 9, 2005. U.S. application Ser. No. 11/371,372 is also a continuation-in-part of U.S. application Ser. No. 09/723,304 filed Nov. 27, 2000, now abandoned, which claims benefit pursuant to 35 U.S.C. §119(e) of Provisional Application 60/167,996 filed Nov. 30, 1999. The disclosures of each of these applications are herein incorporated by reference in their entirety.

TECHNICAL FIELD

This invention relates to automated banking machines that operate responsive to data read from user cards and which may be classified in U.S. Class 235, Subclass 379.

BACKGROUND OF INVENTION

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine which enables customers to carry out banking transactions. Banking transactions carried out may include the dispensing of cash, the making of deposits, the transfer of funds between accounts and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an ATM shall be deemed to include any machine that may be used to electronically carry out transactions involving transfers of value.

Automated banking machines may benefit from improvements.

OBJECTS OF EXEMPLARY EMBODIMENTS

It is an object of an example embodiment to provide an automated banking machine that is operative responsive to data included on user cards.

It is a further object of an example embodiment to provide an automated banking machine system and method that accepts deposits and provides cash to a user.

It is a further object of an example embodiment to provide a deposit accepting apparatus.

It is a further object of an example embodiment to provide a deposit accepting apparatus for use in connection with an automated banking machine.

It is a further object of an example embodiment to provide a deposit accepting apparatus which can be used to accept, image and verify the authenticity of items.

It is a further object of an example embodiment to provide a deposit accepting apparatus that can be used in existing automated banking machine systems.

It is a further object of an example embodiment to provide a deposit accepting apparatus that has greater reliability.

It is a further object of an example embodiment to provide a deposit accepting apparatus and method that can accurately detect MICR symbols peaks and peak intervals.

It is a further object of an example embodiment to provide a deposit accepting apparatus and method that is operative to read MICR symbols in any four check orientations.

It is a further object of an example embodiment to provide a method that is operative to accurately place magnetic symbol peaks after a glitch in transport frequency.

It is a further object of an example embodiment to provide a method that is operative to recognize MICR symbols on checks by correlating magnetic waveform peaks to feature vectors representing MICR symbol peaks.

It is a further object of an example embodiment to provide a method that is operative to recognize MICR symbols on checks by correlating magnetic waveform peak distances to feature vectors representing MICR symbol peaks distances.

It is a further object of an example embodiment to provide a method that is operative to recognize MICR symbols on checks by flagging magnetic waveform peaks that appear redundant, out of place or missing and projecting where they should be located on the magnetic waveform.

It is a further object of an example embodiment to provide a method that is operative to optically locate MICR symbols using a limited set of optical scan lines.

It is a further object of an example embodiment to provide a method that is operative to more accurately filter signals corresponding to magnetic waveforms to allow better recovery of magnetic waveform peaks.

It is a further object of an example embodiment to provide a method that is operative to better analyze possible magnetic waveform peaks to determine valid waveform peaks.

It is a further object of an example embodiment to provide a deposit accepting apparatus and method that is operative to use both magnetic and optical data to accurately recognize MICR symbols.

It is a further object of an example embodiment to provide methods of accepting deposited items.

It is a further object of an example embodiment to provide methods of optically scanning a MICR symbol and then correlating the optical scan with a predetermined feature vector.

It is a further object of an example embodiment to provide a method for verifying the authenticity of deposited items.

It is a further object of an example embodiment to provide a method for verifying the authenticity of a deposited check.

It is a further object of an example embodiment to provide a method for handling and storing deposited items.

It is a further object of an example embodiment to provide an apparatus and method for correlating image and transaction data to facilitate check processing.

Further objects of example embodiments will be made apparent in the following Detailed Description of Example Embodiments and the appended claims.

The foregoing objects are accomplished in example embodiments by a deposit accepting apparatus and method used in connection with an automated banking machine. The machine includes a housing with a deposit accepting apparatus therein. One example deposit accepting apparatus includes a transport section. The transport section includes a transport which accepts items of variable thickness. The transport section includes a biasing mechanism for reliably engaging deposited items with moving mechanisms such as belts or rollers in the transport section. The deposited items are reliably engaged with such moving members to assure that the deposited item is moved through the transport section.

The example transport section further includes an analysis module adjacent thereto. In the example embodiment the analysis module serves as an imaging device and is operative to analyze documents passing through the transport section. For purposes of this application an imaging device includes any device that is operative to enable the generation of image data which corresponds to a visual image of at least a portion of the document. In addition the analysis module is operative to sense for features and characteristics of the document which may be used to identify the document type. Alternatively or in addition the analysis module may operate to sense properties of a deposited document which distinguish acceptable or genuine documents from unacceptable documents.

An example embodiment may include an apparatus comprising at least one magnetic sensor, at least one transport, a data store, and at least one processor. The at least one transport may be operative to move a check across the at least one magnetic sensor. The at least one magnetic sensor may be operative to detect magnetic signals as the check crosses the magnetic sensor. The data store may comprise a plurality of predetermined sets of amplitude values for Magnetic Ink Character Recognition (MICR) symbols of at least one MICR font. The at least one processor may be in operative connection with the at least one magnetic sensor, the at least one transport, and the data store. The at least one processor may be operative to determine portions of the magnetic signals produced by the at least one magnetic sensor which corresponds to a plurality of MICR symbols. Each portion of the magnetic signal that corresponds to a MICR symbol may correspond to a MICR symbol waveform. For each MICR symbol waveform, the at least one processor may be operative to identify minimum and maximum peaks in the MICR symbol waveform; determine a set of amplitude values representative of the amplitudes of the identified peaks; and determine which MICR symbol of the at least one MICR font corresponds to the respective MICR symbol waveform responsive to a comparison of the set of amplitude values determined for the respective MICR symbol waveform to each one of the plurality of predetermined sets of amplitude values for the MICR symbols of the at least one MICR font stored in the data store. The at least one processor may be operative to determine at least one set of alphabetical, numerical and/or other characters based on the MICR symbols determined from the MICR symbol waveforms. Such a set comprising one or more such characters is referred to herein as a number for purposes of brevity. In addition, the at least one processor may be operative to send at least one message to a remote computer. The at least one message may include data representative of the at least one number.

An exemplary embodiment may carry out a method of processing banking customer transactions that may provide for the steps of: (a) receiving a check in an automated banking machine including a card reader and cash dispenser, wherein the check may include a front face and a rear face; (b) moving a check across at least one magnetic sensor; (c) acquiring digitized magnetic signals from the at least one magnetic sensor as the check moves across the at least one magnetic sensor, wherein the magnetic signal corresponds to a MICR symbol of at least one MICR font; (d) selecting data values corresponding to the digitized magnetic signals; (e) comparing the selected data values to predetermined feature vectors of each symbol of the MICR font; and (f) determining which feature vector corresponds to the selected data values. In some example embodiments the feature vector values and the selected data values correspond to peak values, wherein the peak values may be positive or negative. In other example embodiments the feature vector values and the peak values correspond to peak amplitude and the data values may correspond to eight equally spaced locations in the time domain. In some example embodiments the MICR font may correspond to the E-13B font. In other example embodiments the feature vector values and the selected data values may correspond to distances between peak values. In other example embodiments the feature vector values and the data values correspond to the six distances between peaks. In some example embodiments the distances between peaks may be either long or short distance values. In some example embodiments the MICR font corresponds to the CMC-7 font. In some example embodiments the digitized magnetic signal may correspond to a magnetic signal that has been sampled about 100 times per MICR symbol and may correspond to a magnetic signal that has been sampled about eleven times per magnetic signal peak.

An example embodiment may include an apparatus comprising a reader device, a magnetic sensor, a transport, a data store, and a processor. In some example embodiments the reader device is operative to read a data-bearing record, where the automated banking machine is operative to utilize the information read from the record by the reader device. In some example embodiments the transport may be operative to move a check across the magnetic sensor. The magnetic sensor may be operative to sample magnetic signals as the check crosses the magnetic sensor, wherein the magnetic signal corresponds to a MICR symbol of a MICR font. In some example embodiments the data store may comprise a set of predetermined feature vectors that each correspond to a MICR symbol of a MICR font. In some example embodiments the processor may be in operative connection with the magnetic sensor, the transport, and the data store. In some example embodiments the processor may be operative to select data values corresponding to the sampled magnetic signals and compare the selected data values to a predetermined feature vector of each symbol of the MICR font. In yet other example embodiment the processor may determine which feature vector corresponds to the selected data values. In some example embodiments the processor may use a Pearson correlation function to determine which feature vector corresponds to the selected data values.

An exemplary embodiment may carry out a method of processing banking customer transactions that includes the steps of: (a) receiving a check in an automated banking machine including a card reader and cash dispenser, wherein the check includes a front face and a rear face; (b) moving a check in a transport past top and bottom magnetic sensors; (c) acquiring digitized magnetic signals from the top and bottom magnetic sensors as the check moves past the magnetic sensors; (d) through operation of a processor in the automated banking machine, determining the digitized magnetic signal regions corresponding to MICR symbols; (e) selecting data values corresponding to the digitized magnetic signals; (f) comparing the selected data values to a predetermined feature vector of each symbol of the MICR font; (g) determining which feature vector corresponds to each of the selected data values or if the selected data values correspond to an invalid MICR symbol; and (h) determining whether the top or bottom magnetic sensors detected a valid MICR line of symbols. In some example embodiments the top magnetic sensor is positioned at the top of the check as the check is moved in the transport and the bottom magnetic sensor is positioned at the bottom of the check operative to read magnetic data on bottom of the check. In other example embodiments the top and bottom sensors are both operative to read magnetic data from the face of the check, facing magnetic sensor or magnetic data on the rear side of the check facing away from the top magnetic sensor. In other example embodiment MICR data may be read on the rear side of the check away from the sensors, by the magnetic sensors sensing magnetic signals through the check. In some example embodiments the MICR font is an E-13B font. In some example embodiments the selected data values correspond to digitized magnetic signal waveform peak values. In some example embodiments the selected peak values may be above a threshold value and the threshold value may be updated after a fixed period of sampled data values.

Some example embodiments may carry out a method including the steps of: (a) receiving a check in an automated banking machine including a card reader and cash dispenser, wherein the check includes a front face and a rear face; (b) moving a check in a transport past top and bottom magnetic sensors; (c) acquiring digitized magnetic signals responsive to the top and bottom magnetic sensors as the check moves past the magnetic sensors; (d) through operation of a processor in the automated banking machine, determining the digitized magnetic signal regions corresponding to MICR symbols of the MICR font; (e) selecting data values corresponding to the digitized magnetic signals; (f) comparing the selected data values to a predetermined feature vector of each symbol of the MICR font, wherein each feature vector corresponds to a different MICR symbol of the MICR font; (g) determining which feature vector corresponds to each of the selected data values; (h) through operation of a processor in the automated banking machine, causing the optical sensors to capture images of the check; and (h) responsive to (e) and (f) determining whether the top or bottom magnetic sensors detected a valid MICR line of symbols. In some example embodiments the MICR font is a CMC-7 font. In some example embodiments the selected data values correspond to the distance between adjacent waveform peak values.

In some example embodiments an automatic banking machine may read a banking check in any of the four possible positional orientations with an apparatus comprising: a reader device, a top magnetic sensor, a bottom magnetic sensor, a transport and a processor. In some example embodiments the reader device may be operative to read a data bearing record, and the automated banking machine may be operative to utilize the information read from the record by the reader device. In some example embodiments the top magnetic sensor may be operative to be positioned at the top of the check as the check is moved in the transport and the bottom magnetic sensor may be positioned near the bottom of the check operative to read magnetic data on the bottom of the check. In some example embodiments the top and bottom sensors are both operative to read magnetic data from the face of the check facing the magnetic sensors and may also be operative to read magnetic data on the rear side of the check facing away from the top and bottom magnetic sensors. In some example embodiments when a sensor is reading data on the rear side of the check away from the sensors, the magnetic signals may be sensed through the check. In some example embodiments the processor may be operative to cause a check in a transport to move across the at least top and bottom magnetic sensors. In some example embodiments the processor may cause the magnetic sensors to acquire digitized magnetic signals as the check moves past the magnetic sensors. In some example embodiments the processor may determine the digitized magnetic signal regions that correspond to MICR symbols of a MICR font either for the digital magnetic signals corresponding with the top magnetic sensor or for the digital magnetic signals corresponding with the bottom magnetic sensor. In some example embodiments the processor may be operative to determine, for each the magnetic signal regions, how many valid and invalid MICR signals are detected with the top magnetic sensor and how many valid and invalid MICR symbols are detected with the bottom magnetic sensor and to determine whether the top or bottom magnetic sensors detected a valid MICR line of symbols. In some example embodiments the MICR font is an E-13B font. In some example embodiments the processor may also be operative to select data values corresponding to the digitized magnetic signals and to compare the selected data values to predetermined feature vectors of each symbol of the MICR font. In some example embodiments the processor may determine which feature vector corresponds to each of the selected data values or if the selected data values may correspond to an invalid MICR symbol. In some example embodiments the selected data values may correspond to digitized magnetic signal waveform peak values and the peak values may be above a threshold value. In some example embodiments the threshold may be updated after a fixed period of data values.

Some example embodiments an automatic banking machine may read a banking check in any of the four possible positional orientations with an apparatus comprising: a reader device, a top and a bottom magnetic sensor, a transport and a processor. In some example embodiments the reader device is operative to read a data bearing record with information that the automated banking machine may use. In some example embodiments the top and bottom magnetic sensors may be operative to detect magnetic signals as the check moves across the magnetic sensors, and the top magnetic sensor may be operative to be positioned at the top of the check as the check is moved in the transport and the bottom magnetic sensor may be positioned at the bottom of the check to read magnetic data on the bottom of the check. In some example embodiments the sensors may read magnetic data from the face of the check facing magnetic sensor or magnetic data on the rear side of the check facing away from the magnetic sensors. In some example embodiments when reading data on the rear side of the check away from the sensors, the magnetic signals may be sensed through the check. In some example embodiments the processor may be in operative connection with the magnetic sensor, the transport, and the data store. In some example embodiments the processor may be operative to cause a check in the transport to move across the sensors, cause the magnetic sensors to acquire digitized magnetic signals and determine the digitized magnetic signal regions corresponding to MICR symbols of a MICR font. In some example embodiments the processor may be further operative to determine which MICR symbols correspond to the digitized magnetic signal regions, cause the optical sensors to capture images of the check and determine whether the top or bottom magnetic sensors detected a valid MICR line of symbols. In some example embodiments the MICR font is a CMC-7 font. In some example embodiments the processor is further operative to select data values corresponding to the digitized magnetic signals, compare those values to predetermined feature vectors of each symbol of the MICR font which corresponds to a different MICR symbol and to determine which feature vector corresponds to each of the selected data values. In some example embodiments the selected data values may correspond to the distance between adjacent waveform peak values and the selected peak values may be above a threshold value.

Some example embodiments may carry out a method of recognizing peak values comprising the steps of: (a) receiving a check in an automated banking machine including a cash dispenser; (b) moving a check across a magnetic sensor; (c) acquiring electrical signals from the magnetic sensor as the check moves across the magnetic sensor, wherein the magnetic sensor may be operative to cause generation of a plurality of digital magnetic samples; (d) determining a plurality of magnetic signal portions which may correspond to one of a plurality of MICR symbols of a MICR font; (e) identifying a plurality of peaks of each of the plurality of magnetic signal portions; (f) determining for each of the plurality of peaks the weight of each peak; (g) accessing a data store including a plurality of predetermined sets of data values for MICR symbols of MICR font; (h) correlating each of the plurality of magnetic signal portions using the weights determined in (f) with each of the MICR symbols of the MICR font; and (i) determining which MICR symbol of the MICR font corresponds to each magnetic signal portion by selecting the MICR symbol of the MICR font that has the highest correlation value calculated in (h). In some example embodiments in (f) the weight of a peak is determined by taking a given distance P and calculating the data corresponding to left and right areas under a graphical representation of a magnetic signal portion, where the left area corresponds to the left area from the peak center to a distance P on the left side of the peak, and where the right area corresponds to the area from the peak center to a distance P right of the peak center, wherein the weight of a peak is defined as two times the smaller of the left or right peak areas. In some example embodiments digitally sampled signals may be acquired in (c). In some example embodiments a baseline correction may be subtracted from each raw digitized magnetic signal, where the baseline correction may be an average value. In some example embodiments the average value may be the average value over a corresponding fixed range of the digital magnetic samples. In some example embodiments the plurality of peaks determined in (e) may correspond to a set of amplitude values representative of the amplitudes of the identified peaks and may be ordered in a sequence corresponding to the respective positions in time along the magnetic signal portions. In some example embodiments the possible peaks may be determined at eight fixed locations equally spaced apart. In some example embodiments a processor may cause the check to be stored in the automated banking machine. In some example embodiments predetermined sets of data values in (g) may be peak weight values or peak amplitude values. In some example embodiments the at least one MICR font may include a MICR E-13B font. In yet other example embodiments in (h) a Pearson correlation may be used to correlate each of the magnetic signal portions to one of the MICR symbols.

In some example embodiments an automatic banking machine may detect MICR peak symbols with an apparatus comprising a reader device, a magnetic sensor, a transport, a data store and a processor. In some example embodiments the processor may be in operative connection with the reader device, magnetic sensor, the transport, and the data store. In some example embodiments the processor may be operative to determine a magnetic signal portion of the acquired magnetic signal which corresponds to a MICR symbol, identify a peak of the magnetic signal portion and determine for each of the plurality of peaks the weight of each peak. In some example embodiments the processor may be operative to compare the plurality of peaks of a magnetic signal portion to each one of the predetermined sets of peak values for each MICR symbol of a MICR font and to determine which MICR symbol corresponds to the magnetic signal portion. In some example embodiments the data store may comprise a plurality of predetermined sets of values for MICR symbols of at least one MICR font. In some example embodiments the weight of a peak may correspond in a graphical representation to at least a portion of the area under the magnetic signal portion. In some example embodiments the weight of a peak may be determined by taking a given distance P and calculating the left and right areas under a magnetic signal portion, wherein the left area may correspond to the left area from the peak center to a distance P on the left side of the peak, wherein the right area may correspond to the area from the peak center to a distance P right of the peak center, wherein the weight of a peak may be defined as two times the smaller of the left or right peak areas.

In some example embodiments the magnetic sensor may be operative to cause the machine to digitally sample the acquired magnetic signals. In some example embodiments a baseline correction may be subtracted from each raw digitized magnetic signal, where the baseline correction may be an average value and where the average value may be an average value over a corresponding fixed range of the digitally sampled signals. In some example embodiments the plurality of peaks may correspond to a set of amplitude values representative of the amplitudes of the identified peaks and are ordered in a sequence corresponding to the respective positions in time along the magnetic signal portions. In some example embodiments possible peaks may be determined at eight locations equally spaced apart. In some example embodiments the processor may cause the check to be stored in the automated banking machine. In some example embodiments the predetermined sets of data values may be peak weight values and may correspond to peak amplitude values. In some example embodiments the at least one MICR font may include a MICR E-13B font. In some example embodiments a Pearson correlation may be used to correlate the magnetic signal to the MICR symbols.

Some example embodiments may carry out a method for detection MICR peaks with steps that may comprise: (a) receiving a check in an automated banking machine including a cash dispenser (b) moving a check across a magnetic sensor; (c) acquiring electrical signals from the magnetic sensor as the check moves across the magnetic sensor, wherein the magnetic sensor may be operative to cause generation of a plurality of digital magnetic samples; (d) determining a first magnetic signal portion which corresponds to one of a plurality of MICR symbols; (e) identifying a plurality of peaks in the first magnetic signal portion; (f) determining for each of the plurality of peaks, a zone of consecutive magnetic samples; (g) determining an anchor depth for each of the plurality of peaks; (h) determining for each of the plurality of peaks the weight of each peak (i) determining for each of the plurality of peaks the cut series of each peak (j) determining for each of the plurality of peaks a peak cut; (k) comparing for each of the plurality of peaks determined in (e) with the corresponding anchor depth, peak cut, cut series, peak weight and peak amplitude to determine if the peak is a valid peak and discarding invalid peaks; (l) for the magnetic signal portion, comparing the plurality of valid peaks to each one of a plurality of predetermined sets of peak values for each MICR symbol of a MICR font; and (m) for the magnetic signal portion, determining which MICR symbol of the MICR font corresponds to the first magnetic signal portion responsive to (l).

Some example embodiments may include an apparatus for detecting MICR peaks used with an automatic banking machine apparatus comprising: a reader device, magnetic sensor, transport, a data store and a processor. In some example embodiments the processor may be in operative connection with the magnetic sensor, the transport, and the data store. The processor may be further operative to determine a first magnetic signal portion of acquired magnetic signals which are electrical signals that correspond to a MICR symbol and to identify a plurality of minimum and maximum peaks of the magnetic signal portion. In some embodiments the processor may be further operative to determine a set of amplitude values representative of the amplitudes of the identified peaks. In some example embodiments the processor may be operative to determine for each of the peaks, an anchor depth, cut series, weight, and peak cut. In some example embodiments the processor is further operative to compare each of the plurality of peaks with the corresponding anchor depth, cut series, weight, and peak cut of each peak to determine if the peak is a valid peak and to discard invalid peaks. In some example embodiments the processor may be operative to read from the data store a plurality of predetermined sets of peak values for each MICR symbol of a MICR font and to compare the plurality of peaks of the first magnetic signal portion to predetermined sets of peak values for the MICR symbols. In some example embodiments the processor may be operative to determine which MICR symbol of the MICR font corresponds to the first magnetic signal portion.

In some example embodiments the reader device is operative to read a data-bearing record, where the automated banking machine may be operative to utilize the information read from the record by the reader device. In some example embodiments the transport may be operative to move a check across the magnetic sensor, where the magnetic sensor may be operative to generate electrical signals which may also be referred to herein as magnetic signals as the check crosses the magnetic sensor. In some example embodiments the data store may comprise a plurality of predetermined sets of amplitude values for MICR symbols of a MICR font. In some example embodiments a zone of consecutive magnetic samples may be selected that correspond to locations that are equal distance apart in the time domain. In some example embodiments the zone may contain 2*hw+1 consecutive magnetic samples where hw represents the peak half width such that there may be exactly hw magnetic samples before and after the identified peak. In some example embodiments the anchor depth may be determined by measuring the value of the first magnetic signal portion at distance hw on each side of the center of the peak, wherein the anchor depth is defined as the smaller magnitude of the two magnetic values at a distance hw on each side of the center of the peak. In some example embodiments a baseline correction may be subtracted from each raw digitized magnetic signal and the baseline correction may be an average value. In some example embodiments the average value may be the average value over a corresponding fixed range of raw digitized magnetic signals. In some example embodiments when a new raw magnetic sample may be acquired and added to the fixed raw magnetic sample range, the oldest raw magnetic sample from the fixed raw magnetic sample range may be removed and the average value may be recalculated. In some example embodiments the weight of a peak may be determined by taking a given distance P and calculating the left and right areas under the first magnetic signal portion, where the left area corresponds to the left area from the peak center to a distance P on the left side of the peak, where the right area corresponds to the area from the peak center to a distance P right of the peak center and where the weight of a peak is defined as two times the smaller of the left or right peak areas. In some example embodiments the cut series of a peak may be determined by subtracting the product of the average of the endpoints and the zone length L from the total area under the first magnetic signal portion between the two endpoints, wherein the endpoints are the points on each side of the peak center at distance L/2 from the peak center. In some example embodiments the peak cut may be the area under the first magnetic signal portion and a straight cord extending from the two magnetic signal portion values at a distance X from the peak center on each side of the peak center. In some example embodiments the value of hw may be about 5.

Some example embodiments may carry out a method for detection of MICR peaks with optical symbol recognition assistance with steps that may comprise: (a) receiving a check in an automated banking machine including a card reader and cash dispenser; (b) moving the check across magnetic sensor; (c) acquiring samples of magnetic signal data with the magnetic sensor as the check moves across the magnetic sensor; (d) determining from the samples of magnetic signal data, at least one set of data corresponding to MICR symbols for the magnetic symbols on the check; (e) determining a correspondence between the set of data determined in (d) and a predetermined MICR symbol of a MICR font; (f) capturing an optical image of the check; (g) cropping the MICR symbols from the rest of the check; (h) applying a contrast boost to the MICR symbols; (i) de-skewing the MICR symbol; (j) determining a correspondence between the optical image and a predetermined MICR symbol of a MICR font; and (k) combining the magnetic symbol correspondence of step (e) with the optical symbol correspondence in step (j) to determine a final symbol associated with each of the plurality of magnetic symbols on the check. Some example embodiments may consist of the further step of (l) performing a positional correlation with the magnetic and optical representations of the magnetic symbols beginning at the symbol that has the highest combined magnetic and optical confidence levels and performing the correlation from that symbol in the forward and reverse directions one symbol at a time until a determination has been made as to what may be the correct value of each symbol. In some example embodiments a magnetic confidence level may be associated with each symbol associated with the plurality of magnetic symbols on a check for each step (e) and an optical confidence level is associated with each symbol associated with the plurality of magnetic symbols on a check for each step (j), wherein the confidence levels may be indications of how likely each of the plurality of symbols is associated with the correct symbol, wherein (k) may be responsive to the confidence levels. In some example embodiments in step (k) the symbol associated with the plurality of symbols on a check may be the one with the highest magnetic or optical confidence level. In some example embodiments the samples of magnetic signal data may correspond to digital magnetic samples, where the sets of data each consist of a range of digital magnetic samples that are evenly spaced in the time domain represented by x(i) where x is the value of the digital magnetic sample at location i. In some example embodiments when the magnetic confidence level may be below an optical confidence level, each data value in the set of data is shifted by one of: x(i+1) and x(i−1) and the magnetic confidence value may be recalculated. In some example embodiments the sets of data may be data for amplitude values. In some example embodiments the sets of data each may contain about 100 data values. In some example embodiments the confidence level may correspond to how well the peaks of magnetic data correspond to the peaks of the predetermined MICR symbols. In some example embodiments the confidence level may correspond to how well the distances between peak centers of the magnetic data correspond to the distances between peak centers of the predetermined MICR symbol of a MICR font.

Some example embodiments may include an apparatus for detecting MICR peaks with an optical recognition assist used with an automatic banking machine apparatus comprising: a reader device, a transport, a data store and a processor. In some example embodiments the reader device may be operative to read a data-bearing record and the automated banking machine may be operative to utilize the information read from the record by the reader device. In some example embodiments the optical imaging device may be operative to capture optical images. In some example embodiments the transport may be operative to move a check across the magnetic sensor. In some example embodiments the data store may comprise a plurality of predetermined sets of amplitude values for MICR symbols of a MICR font. In some example embodiments the processor may be in operative connection with the magnetic sensor, the transport, and the data store. In some example embodiments the processor may be operative to determine from the samples of magnetic signal data, sets of magnetic symbol data corresponding to MICR symbols for each of the plurality of magnetic symbols on the check. In some example embodiments the processor may further be operative to determine a symbol corresponding to each of the plurality of magnetic symbol waveforms on the check by correlating each of the sets of magnetic symbol data with a predetermined MICR symbol of a MICR font. In some example embodiments the processor may be operative to operate the optical imaging device to capture an optical image of the check. In some example embodiments the processor may use optical symbol recognition methods to determine a symbol corresponding to a MICR symbol on the check by associating an image of each symbol captured with the optical imaging device with a predetermined MICR symbol. In some example embodiments the processor may evaluate the magnetic and optical symbols to determine whether the magnetic or optical symbol corresponds best with the corresponding predetermined MICR symbol. In some example embodiments the processor may be further operative to determine a magnetic confidence level for each symbol determined to correspond to each of the plurality of magnetic symbols on the check by correlating each of the sets of magnetic symbol data with each predetermined MICR symbol of a MICR font and assigning a confidence level with the highest correlating magnetic symbol data. In some example embodiments the processor may be further operative to determine an optical confidence level for each symbol determined to corresponding to each of the plurality of symbols on the check by correlating an image of each symbol captured with the optical imaging device to each predetermined MICR symbol of a MICR font and assigning a confidence level with the highest correlating optical symbol data. In some example embodiments the confidence levels may be indications of how likely each of the plurality of symbols is associated with the correct symbol. In some example embodiments the symbol associated with the plurality of symbols on a check may be the one with the highest magnetic or optical confidence level. In some example embodiments the samples of magnetic signal data may correspond to digital magnetic samples, wherein the sets of data each consist of a range of digital magnetic samples that are evenly spaced in the time domain represented by x(i) where x is the value of the digital magnetic sample at location i. In some example embodiments when the magnetic confidence level may be below an optical confidence level, each data value in the set of magnetic symbol data is shifted by one of: x(i+1) and x(i−1) and the magnetic confidence value may be recalculated. In some example embodiments the sets of data may be sets of data for amplitude values. In some example embodiments the sets of data each may contain about 100 data values. In some example embodiments the confidence level corresponds to how well the peaks of magnetic data correspond to the peaks of the predetermined MICR symbol of MICR font. In some example embodiments the confidence level may correspond to how well the distances between peak centers of the magnetic data correspond to the distances between peak centers of the predetermined MICR symbol of MICR font. In some example embodiments the processor may be further operative to use an image captured from the optical imaging device to crop the MICR symbols from the rest of the check, apply a contrast boost to the cropped MICR symbols and to de-skew the MICR symbols. In some example embodiments the processor may be further operative to perform a positional correlation with the magnetic and optical representations of the magnetic symbols. The correlation may begin at the symbol that has the highest combined magnetic and optical confidence levels. Next, a correlation adjacent to that symbol may be performed in sequence on subsequent signals in the forward and reverse directions one symbol at a time until a determination has been made as to what is the correct value of each symbol.

Some example embodiments of a method to detect MICR symbols may comprise: (a) receiving a check in an automated banking machine including a card reader and cash dispenser, wherein the check may include a front face and a rear face; (b) moving a check across a magnetic sensor; (c) producing raw digitized magnetic signals from the electrical signals produced by the magnetic sensor as the check moves across the magnetic sensor; (d) applying a baseline correction to the raw digitized magnetic signals to produce baseline corrected magnetic signals; (e) filtering the baseline corrected magnetic signals to boost the signal to noise ratio by attenuating high frequency noise to produce filtered magnetic signals; (f) determining the first magnetic signal portion of the filtered magnetic signals that corresponds to a MICR symbol of a MICR font; (g) identifying a plurality of peaks of the first magnetic signal portion; (h) comparing the set of peaks determined in (g) for the first magnetic signal portion to each one of a plurality of predetermined sets of amplitude values for MICR symbols of the MICR font; (i) for the first magnetic signal portion, determining which MICR symbol of the MICR font corresponds to the first magnetic signal portion responsive to (h); (j) determining at least one number from the MICR symbols determined in (i); (k) sending at least one message to a remote computer, wherein the at least one message includes data representative of the at least one number determined in (j); (l) causing the check to be stored in the automatic banking machine; (m) determining for the first magnetic signal portion a confidence level for each comparison between the set of peak values determined in (g) for first magnetic signal portions to the plurality of predetermined sets of peak values for each MICR symbol of the MICR font; and (n) determining with which predetermined MICR symbol the first magnetic signal portion has the highest confidence level.

In some example embodiments the baseline correction may be an average value and may be subtracted from each raw digitized magnetic signal and, where the average value may be the average value over a corresponding fixed range of raw digitized magnetic signals. In some example embodiments when a new raw magnetic sample may be acquired and added to the fixed raw magnetic sample range, the oldest raw magnetic sample from the fixed raw magnetic sample range is removed and the average value may be recalculated. In some example embodiments the plurality of peaks may correspond to a set of amplitude values representative of the amplitudes of the identified peaks and may be ordered in a sequence corresponding to the respective positions in time along the filtered magnetic signal portion. In some example embodiments the confidence levels may be determined with a Pearson correlation calculation carried out by a microprocessor operating on the peak values. In some example embodiments the magnetic sensor may comprise a plurality of sensor elements arranged consecutively along at least one column and magnetic signals from each of the sensor elements may be acquired as the check moves across the magnetic sensor elements. In some example embodiments the check may be sampled with the magnetic sensor about every 63.5 microseconds and the sample may be converted to an eight bit unsigned integer value. In some example embodiments the check may be transported on a transport at the speed of about 500 mm/s. In some example embodiments the corrected magnetic signals may be filtered with a Bessel Infinite Impulse Response Filter (IIF) and the filter may be a 10th order filter. In yet other example embodiment the filtering may be performed with a processor in the automated banking machine digitally filtering the corrected magnetic signal values.

Some example embodiments may include an apparatus that filters and recognizes MICR symbols that may comprise a reader device, a magnetic sensor, a transport and a processor. In some example embodiments the reader device may be operative to read a data-bearing record, where the machine is operative to utilize the information read from the reader device. In some example embodiments a first filter may be operative to applying a baseline correction to the raw digitized magnetic signals to produce a baseline corrected magnetic signal. In some example embodiments a second filter may be operative to filter the base line corrected magnetic signals to boost the signal to noise ratio to attenuate high frequency noise and produce a filtered magnetic signal. In some example embodiments one or more of the filters may be a discrete filter or a filter digitally implemented in the processor. In some example embodiments the processor may be in operative connection with the magnetic sensor, the transport, and the data store. In some example embodiments the processor may be operative to determine a first magnetic signal portion of the filtered magnetic signal which corresponds to a MICR symbol and to identify minimum and maximum peaks in the first magnetic signal portion. In some example embodiments the processor may be operative to determine a set of amplitude values representative of the amplitudes of the identified peaks and may determine which MICR symbol corresponds to the first magnetic signal portion. In some example embodiments the automated banking machine includes a cash dispenser and a deposit accepting apparatus that may include the magnetic sensor and the transport. In some example embodiments the deposit accepting apparatus may include a storage area and the processor may be operative to cause the transport to move the check to the storage area.

Some example embodiments may recognize magnetic symbols using a method including flagging peak values located in between sample locations and may comprise: (a) receiving a check in an automated banking machine including a cash dispenser; (b) moving a check across at least one magnetic sensor; (c) sampling electrical signals from the at least one magnetic sensor as the check moves across the at least one magnetic sensor, wherein the sample magnetic signals include digital magnetic samples; (d) through operation of at least one processor in the automated banking machine, generating a plurality of data values corresponding to magnetic waveform peak values in the digital magnetic samples corresponding to a MICR symbol; (e) associating the peaks with a corresponding feature vector position and a corresponding feature vector position value to produce at least one sample feature vector, where the feature vector positions correspond to fixed locations in the time domain; (f) comparing the at least one sample vector with each of the feature vectors in the data store; and (g) determining to which MICR symbol the sample vector most likely corresponds.

In some example embodiments the check may have a front face and a rear face and may have symbols comprised of magnetic ink corresponding to MICR symbols. In some example embodiments each MICR symbol may correspond to a feature vector that may have eight feature vector position values. In some example embodiments a data store may store a set of standard feature vectors that correspond to the MICR symbols. In some example embodiments when a first peak is in between two feature vector positions the first peak may be associated with a first adjacent feature vector position and a second adjacent feature vector position, wherein a first sample vector may be produced with the first peak associated with a first adjacent feature vector position and a second sample vector may be produced with the first peak associated with a second adjacent feature vector position. In some example embodiments the feature position vector values and the peak values may correspond to peak amplitude and the feature position vector values and the peak values may correspond to eight sampling locations. In some example embodiments a Pearson correlation may be used to correlate each of the magnetic signal portions to one of the MICR symbols.

Some example embodiments may recognize magnetic symbols using a method including flagging peak values located in between sample locations comprising: (a) receiving a check in an automated banking machine including a cash dispenser; (b) moving a check across at least one magnetic sensor; (c) sampling signals from the at least one magnetic sensor as the check moves across the at least one magnetic sensor, wherein the sampled signals are digital magnetic samples; (d) identifying magnetic waveform peak locations in the digital magnetic samples corresponding to a MICR symbol; (e) determining distances between adjacent peak locations; (f) associating the distances between peaks with a corresponding feature vector position value to produce a sample vector; (g) correlating the sample vector with each of the feature vectors of a MICR font; (h) determining to which MICR symbol the sample vector most likely corresponds; (i) causing the check to be stored in the automated banking machine.

In some example embodiments where only six valid peaks are detected in (d) this may further include determining the longest distance between adjacent peak locations that may be made and estimating the location of the missing peak to be the middle of the longest distance of the peaks. Some example embodiments may have seven valid peaks in each MICR symbol and there may have six valid distances between peaks. In some example embodiments the distances between immediately adjacent peaks correspond to one of short or long relative distances. In some example embodiments the MICR font corresponds to the CMC-7 font. In some example embodiments a Pearson correlation may be used to correlate each of the magnetic signal portions to one of the MICR symbols. In some example embodiments the magnetic signals may be sampled about 100 times per symbol. In some example embodiments when eight peaks are detected a determination may be made as to which of the eight peaks is likely an invalid peak and the peak with the lowest amplitude may be determined to be an invalid peak.

Some example embodiments may include an apparatus that recognizes MICR symbols comprising: a reader device, a magnetic sensor, a transport, a data store and a processor. In some example embodiments the processor may be in operative connection with the magnetic sensor, the transport, and the data store. In some example embodiments the processor may be operative to identify magnetic waveform peak values in the digital magnetic samples taken by the magnetic sensor that may correspond to a MICR symbol. In some example embodiments the processor may be operative to associate the peaks with a corresponding feature vector position value to produce a sample vector and the processor may be able to correlate the sample vector with each of the feature vectors of a MICR font. In some example embodiments the processor may be operative to determine to which MICR symbol the sample vector may most likely correspond. In some example embodiments the reader device may be operative to read a data-bearing record, where the automated banking machine is operative to utilize the information read from the record by the reader device. In some example embodiments the transport may be operative to move a check across the magnetic sensor, wherein the magnetic sensor may be operative to sample magnetic signals as the check crosses the magnetic sensor. In some example embodiments the data store may comprise feature vectors corresponding to each MICR symbol of a MICR font.

In some example embodiments when the processor determines a first peak is in between two feature vector positions, the processor may associate the first peak with a first adjacent feature vector position and a second adjacent feature vector position. In some example embodiments the processor may be operative to produce a first sample vector with the first peak associated with a first adjacent feature vector element position and to produce a second sample vector with the first peak associated with a second adjacent feature vector element position.

Some example embodiments may include an apparatus that recognizes MICR symbols that may comprise: a reader device, a magnetic sensor, a transport, a data store and a processor. In some example embodiments the processor may be in operative connection with the magnetic sensor, a transport, and the data store. In some example embodiments the processor may be operative to identify magnetic waveform peak values of the digital magnetic samples taken with the magnetic sensor that corresponds to a MICR symbol. In some example embodiments the processor may be operative to associate the peaks with a corresponding feature vector position value to produce a sample vector. In some example embodiments the processor may be able to determine distances between adjacent peak locations and may be able to compare the sample vector with each of the feature vectors of the MICR font. In some example embodiments the processor may be operative to determine which MICR symbol the sample vector generally corresponds. In some example embodiments the reader device may be operative to read a data bearing record, where the automated banking machine is operative to utilize the information read from the record read by the reader device. In some example embodiments the transport may be operative to move a check across the magnetic sensor, wherein the magnetic sensor may be operative to sample electrical signals as the check crosses the magnetic sensor. In some example embodiments the data store comprises feature vectors that may correspond to each MICR symbol of a MICR font. In some example embodiments there may be seven valid peaks in each MICR symbol and there may be six valid distances between peaks. In some example embodiments the distances between peaks may correspond to a short or long distance. In some example embodiments when only six valid peaks are detected the processor may be further operative to determine the longest distance between adjacent peak locations and may be operable to estimate the location of the missing peak. In some example embodiments the distances between peaks correspond to one of short or long distances. In some example embodiments when eight peaks are detected the processor may be operable to determine which of the eight peaks may be likely an invalid peak. In some example embodiments the peak with the lowest amplitude may be determined to be an invalid peak.

Some example embodiments may recognize magnetic symbols using magnetic and optical recognition techniques and may comprise: (a) receiving a check in an automated banking machine including a cash dispenser; (b) optically scanning a MICR symbol on the check in a plurality of first parallel directions; (c) constructing a two dimensional constructed waveform, where the vertical axis corresponds to the optical intensity of the ink of the scanned MICR symbol and the horizontal axis corresponds to the location of the scanned optical intensity; (d) comparing the constructed waveform to the set of predetermined waveforms; and (e) determining to which of the waveforms in the set of predetermined waveforms the constructed waveform corresponds. In some example embodiments the MICR symbols may correspond to a predetermined waveform. In some example embodiments the predetermined waveform may have a vertical axis that corresponds to the optical intensity of a line of ink extending transversely across the image of a MICR symbol and a horizontal axis corresponds to the location of the optical intensity. In some example embodiments the predetermined waveforms for each MICR symbol form a set of predetermined waveforms. In some example embodiments the check may be optically scanned in the horizontal or vertical direction. In some example embodiments the symbol may be optically scanned in about eleven (11) parallel scan lines. In some example embodiments the correlation of the constructed waveform may be performed with a Pearson correlation. In some example embodiments the MICR font may be one of E-13B or CMC-7 font.

Some example embodiments may recognize magnetic symbols using magnetic and optical recognition and may comprise: (a) receiving a check in an automated banking machine including a cash dispenser; (b) capturing a first optical image of the entire check; (c) optically scanning the entire check in a plurality of horizontal directions the length of the check; (d) determining the vertical position as to where the line of MICR symbols are on the check, wherein the determination is made responsive to (c); (e) cropping the MICR symbols from the check from the first optical image; (f) contrast boosting the cropped MICR symbols to produce a second optical image; (g) scanning of the cropped MICR symbols in a plurality of transverse directions; (h) determining the position of the MICR symbol on the second image; and (i) providing the location of the MICR symbol on the second image to software that is operative to determine which MICR symbol corresponds with the MICR symbol on the second image. In some example embodiments the MICR symbols may correspond to a predetermined waveform. In some example embodiments the predetermined waveform may have a vertical axis that corresponds to the optical intensity of a line of ink extending transversely across the image of a MICR symbol and a horizontal axis that may correspond to the location of the optical intensity. In some example embodiments the predetermined waveforms for each MICR symbol form a set of predetermined waveforms. In some example embodiments the transverse directions may be vertical or horizontal directions corresponding to the orientation of the check. In some example embodiments the MICR symbol may be scanned with about 11 equally spaced vertical scans. In some example embodiments the X and Y coordinates of the MICR symbol on the second image may be provided to the symbol recognition software. In some example embodiments the MICR font may be E-13B or CMC-7 font. In some example embodiments the processor may be operative responsive to (c) to construct data corresponding to a two-dimensional first waveform, where the vertical axis may correspond to the optical intensity of the ink of the scanned MICR symbol and the horizontal axis may correspond to the location of the scanned optical intensity. In some example embodiments the processor may be operative responsive to (g) to construct data corresponding to a two-dimensional second waveform, where the vertical axis may correspond to the optical intensity of the ink of the scanned MICR symbol and the horizontal axis may correspond to the location of the scanned optical intensity. In some example embodiments the determination in (d) may be responsive to the first waveform and the determination in (h) may be responsive to the second waveform.

Some example embodiments may recognize MICR symbols with an apparatus that includes a reader device, an optical sensor, a transport, a data store and a processor. In some example embodiments the processor may be in operative connection with the optical sensor, a transport, and the data store. In some example embodiments the automated banking machine may be operative to utilize the information read from the record by the reader device. In some example embodiments the optical scanner may be operative to scan a check in a plurality of scan lines. In some example embodiments the transport may be operative to move a check to the optical scanner. In some example embodiments the processor may be operative to cause a check received in the automatic banking machine to be moved on the transport to the optical scanner and the check may have symbols written with magnetic ink corresponding to MICR symbols. In some example embodiments each MICR symbol corresponds to a predetermined waveform, where the predetermined waveform may correspond in a graphical representation to a representation which includes a vertical axis that corresponds to the optical intensity of a line of ink extending transversely across the image of a MICR symbol and a horizontal axis which may correspond to the location of the optical intensity. The predetermined waveforms for each MICR symbol may form a set of predetermined waveforms. In some example embodiments the processor may be further operative to cause the optical scanner to optically scan the MICR symbol on the check in a plurality of first parallel directions. In some example embodiments the processor may be further operative to construct a two-dimensional waveform, where the vertical axis may correspond to the optical intensity of the ink of the scanned MICR symbol and the horizontal axis may correspond to the location of the scanned optical intensity. In some example embodiments the processor may be further operative to correlate the constructed waveform to the set of predetermined waveforms and to determine to which of the waveforms in the set of predetermined waveforms the constructed waveform may correspond.

Some example embodiments may recognize MICR symbols with an apparatus that includes a reader device, an optical sensor, a transport, a data store and a processor. In some example embodiments the processor may be in operative connection with the optical sensor, a transport, and the data store. In some example embodiments the optical scanner may be operative to scan a check in a plurality of scan lines. In some example embodiments the transport may be operative to move a check to the optical scanner. In some example embodiments the processor may be operative to cause a check received in the automatic banking machine to be moved on the transport to the optical scanner. In some example embodiments each MICR symbol may correspond to a predetermined waveform, where the predetermined waveform may have a vertical axis that may correspond to the optical intensity of a line of ink extending transversely across the image of a MICR symbol and a horizontal axis which may correspond to the location of the optical intensity. In some example embodiments the processor may further be operative to cause the optical scanner to optically scan the MICR symbol on the check in a plurality of first parallel directions. In some example embodiments the processor may be operative to cause the optical scanner to optically scan the entire check in a plurality of horizontal directions corresponding to the length of the check. In some example embodiments the processor may be operative to determine the vertical position where the line of MICR symbols are located on the check, where the determination may be made responsive to the plurality of horizontal scans made the length of the check. In some example embodiments the processor may be operative to crop the MICR symbols from the image data. In some example embodiments the processor may be operative to contrast boost the cropped MICR symbols to produce a second optical image. In some example embodiments the processor is operative to scan the cropped MICR symbols in a plurality of transverse directions. In some example embodiments the processor is operative to determine the position of the MICR symbol on the second optical image and provide the location of MICR symbol on the second image to software that may be operative to determine which MICR symbol corresponds with the MICR symbol on the second image.

In an example embodiment, the described apparatus may correspond to an automated banking machine including a cash dispenser and a deposit accepting apparatus. The deposit accepting apparatus includes the at least one magnetic sensor, the at least one optical sensor and the at least one transport.

A further example embodiment may carry out a method. The method may include (a) moving a check across at least one magnetic sensor and (b) acquiring electrical signals from the at least one magnetic sensor as the check moves across the at least one magnetic sensor. In addition this exemplary method comprises (c) through operation of at least one processor in the automated banking machine, determining the portions of the signals which correspond to one of a plurality of MICR symbols. Each portion of the magnetic signals that correspond to a MICR symbol corresponds in a graphical representation to a MICR symbol waveform. Also this method may comprise (d) through operation of the at least one processor, for each MICR symbol waveform, generating data values that correspond to minimum and maximum peaks in the MICR symbol waveform and determining a set of amplitude values representative of the amplitudes of the identified peaks. Further this described method comprises (e) through operation of the at least one processor, for each MICR symbol waveform, comparing the set of amplitude values determined in (d) for the respective MICR symbol waveform to each one of a plurality of predetermined sets of amplitude values for MICR symbols of at least one MICR font. In addition this method comprises (f) through operation of the at least one processor, for each MICR symbol waveform, determining which MICR symbol of the at least one MICR font corresponds to the respective MICR symbol waveform responsive to (e). Also this described method comprises (g) through operation of the at least one processor, determining at least one number (i.e., symbol) from the MICR symbols determined in (f); and (h) through operation of the at least one processor, sending at least one message to a remote computer. The at least one message includes data representative of the at least one number determined in (g).

Of course these approaches are exemplary.

BRIEF DESCRIPTION OF DRAWINGS

FIG. 22 shows an example of a table used to classify a check as either good or a potential fraudulent copy.

FIG. 24 shows an example of a table of the MICR E-13b symbols (column labels) and their corresponding determined peak features which comprise their respective feature vector.

DETAILED DESCRIPTIONS OF EXEMPLARY EMBODIMENTS

Figure 1:
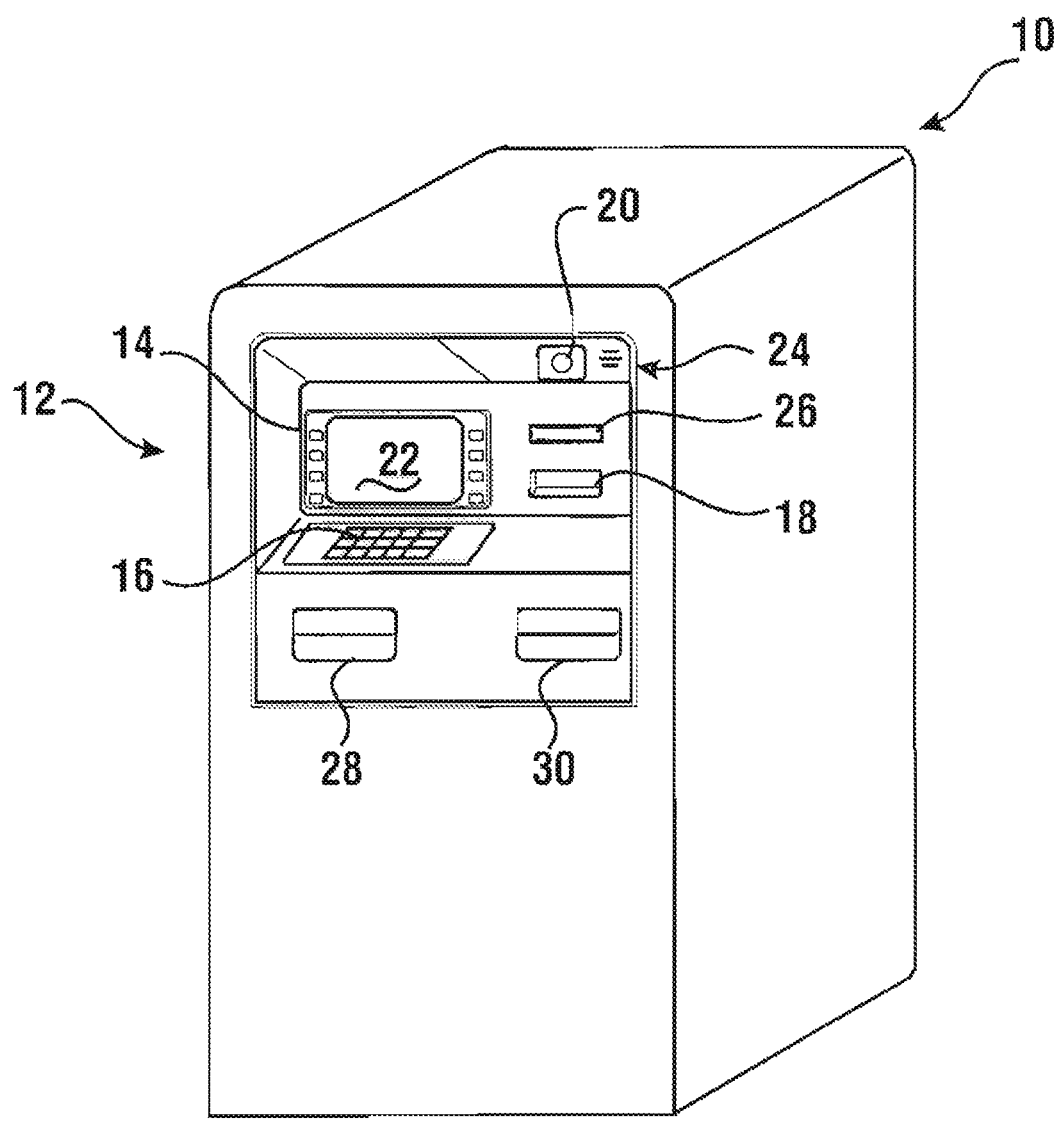
FIG. 1 is an example isometric view of an example automated banking machine.

Referring now to the drawings and particularly to FIG. 1 and referring to U.S. Pat. Nos. 7,314,163; 7,389,914; 7,467,744; 7,469,824; and 6,554,185, which are hereby incorporated herein by reference in their entirety, there is shown therein an example embodiment of an automated banking machine 10 which includes an example deposit accepting apparatus and which performs at least one operation. Automated banking machine 10 is an ATM. However it should be understood that the concepts disclosed herein may be used in connection with various types of automated banking machines and devices of other types. Automated banking machine 10 includes a user interface generally indicated 12. User interface 12 includes input and output devices. In the example embodiment the input devices include a plurality of function buttons 14 through which a user may provide inputs to the machine. The example input devices further include a keypad 16 through which a user may provide numeric or other inputs. A further input device in this example embodiment includes a card reader schematically indicated 18. Card reader 18 may be of the type used for reading data bearing records, such as magnetic stripe cards, smart cards, RFID tokens or other articles presented by a user. The card data corresponds to a financial account associated with the machine user. Another input device on the example machine includes an image capture device 20. The image capture device may be a camera or other device for capturing the image of a user or the surroundings of the machine. The example embodiment may include biometric reading devices. Such devices may include an imaging or reading device such as a fingerprint reader, iris scan device, retina scan device or other biometric input. It should be understood that the camera mentioned may serve as a biometric reading device in some embodiments.

The exemplary user interface 12 also includes output devices. In the example embodiment shown in FIG. 1 the output devices include a display 22. Display 22 includes a visual output device such as a CRT or LCD for providing messages and prompts to a user. These messages and prompts may be responded to by inputs from the user through the function buttons 14 adjacent to the display or by inputs through the keypad 16 or through other inputs. A further output device in the example embodiment includes an audio output device schematically indicated 24. The audio output device may be used to provide audible outputs to the user. A further output device in the example embodiment includes a printer. The printer may be used to provide outputs in the form of receipts or other items or information to the user. The printer is in connection with a printer outlet in the user interface indicated 26 in FIG. 1.

It should be understood that the input and output devices shown are examples and in other embodiments other types of input and output devices may be used. Such input and output devices commonly receive information which is usable to identify the customer and/or their accounts. Such devices are also operative to provide information to a user and to receive instructions from a user concerning transactions which are to be carried out through use of the machine. Various forms of user interfaces and input and output devices may be used in connection with various embodiments.

In the described example embodiment ATM 10 includes a cash dispensing mechanism which is alternatively referred to herein as a cash dispenser. The cash dispensing mechanism is selectively operated to enable the dispensing of cash to authorized users of the machine. Cash is provided to the users through a cash outlet indicated 28. A further feature of the example embodiment is the ability to accept deposits through the ATM. The machine includes a deposit accepting opening 30. In the example embodiment the ATM is enabled to accept deposits in the form of sheets, envelopes and other items as later discussed. In some embodiments the ATM may have structural components like those shown in U.S. Pat. No. 6,010,065 the disclosure of which is hereby incorporated herein by reference in its entirety.

Figure 2:
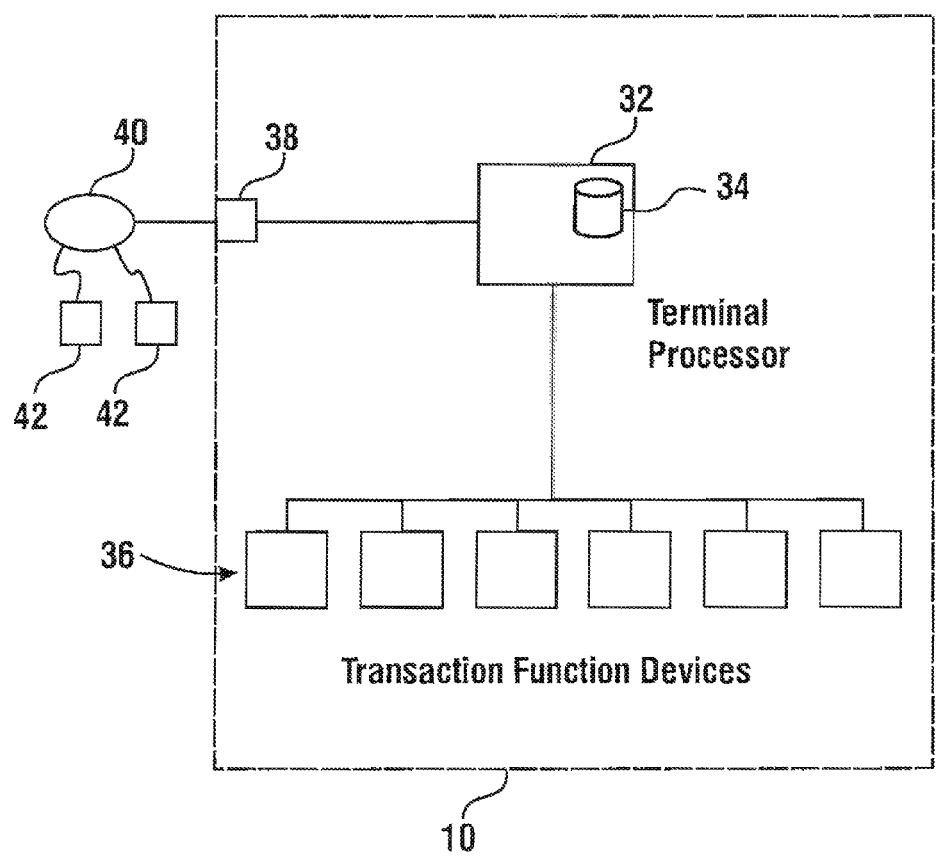
FIG. 2 is an example schematic view of components included within an automated banking machine of the type shown in FIG. 1 and a system in which the automated banking machine is used.

FIG. 2 shows a schematic view of exemplary computer architecture associated with ATM 10 and a first example system in which it is used. The ATM includes one or more computers therein, which computer or computers are alternatively referred to herein as a processor or processors. For purposes of this disclosure, a computer or a processor will be deemed to include a single computer or processor as well as multiple computers or processors. The one or more computers in the example embodiment are schematically represented by a terminal processor 32. The terminal processor is in operative connection with one or more data stores schematically represented 34. The terminal processor may comprise one or more computers that operate to control transaction function devices 36 which are included in the ATM. These transaction function devices include devices which operate in the ATM to carry out transactions. Transaction function devices may include, for example, currency dispensing mechanisms, currency presenters, currency acceptors, currency validators, item dispensing devices, card readers, printers, depositories, other input and output devices and other devices. Transaction function devices may further include cameras, sensors, image capture devices and other items. Transaction function devices may also include one or more processors. The particular symbol of the transaction function devices depends on the particular capabilities for carrying out transactions to be provided by the ATM.

In the example embodiment ATM 10 exchanges messages through a communication interface 38 with a communications network 40. Network 40 may be one or more types of data communications networks, including a phone line, data line, lease line, frame relay, wireless network, telecommunications network, local area network, wide area network or other medium for communicating messages to and from the ATM 10. The communications interface provided is suitable to work in connection with the particular type of network(s) to which the machine is connected. In the example embodiment the ATM may be connected to a network which communicates with a plurality of ATMs such as Cirrus® or Plus®, or other debit card network. Of course in other embodiments other suitable networks for processing credit, debit or other types of online transactions may be used including the Internet. Exemplary systems may also include features described in U.S. patent application Ser. No. 10/980,209 filed Nov. 2, 2004 the disclosure of which is incorporated herein by reference in its entirety.

As schematically represented in FIG. 2, network 40 may be in operative connection with one or more host computers 42, also referred to herein as a banking host. Host computers 42 in the example embodiment are operative to authorize transaction requests which are made by users at the ATM 10. The card reader in the ATM is operative to read data from user cards. The data corresponds to at least one of a user and a financial account. The ATM is also operative to receive from the user a personal identification number (PIN) that is input by a user through a keypad. The ATM is operative to deliver to the host computer, data identifying the user and/or their account, data corresponding to the PIN, and the particular transactions that they wish to conduct. The request is routed through the network to a host computer that can evaluate and/or authorize the request. The exemplary host computer is operative to authorize or deny the transaction based on a comparison of data that corresponds to the data read from the user card and stored data corresponding to authorized users and their associated PINs. The appropriate host computer receives and analyzes the received data and returns to the ATM a message which indicates whether the transaction requested is authorized to be conducted at the machine. The message returned may also include one or more instructions that cause the ATM to carry out one or more transaction functions. In response to receiving a message indicating that the transaction should proceed, the processor in the ATM operates the transaction function devices to carry out the requested transaction. If the transaction is not authorized, the user is so informed through the display or other output device and the transaction is prevented. The ATM is also operative in the example embodiment to send to the host computer authorizing the transaction, a completion message which includes data indicative of whether the transaction was able to be carried out successfully. Upon receiving the information that the transaction was carried out, the host computer is operative to take appropriate action such as to credit or debit a user's account. It should be understood that this system shown in FIG. 2 is an example and in other embodiments other approaches to operating automated banking machines and authorizing transactions may be used.

Figure 3:
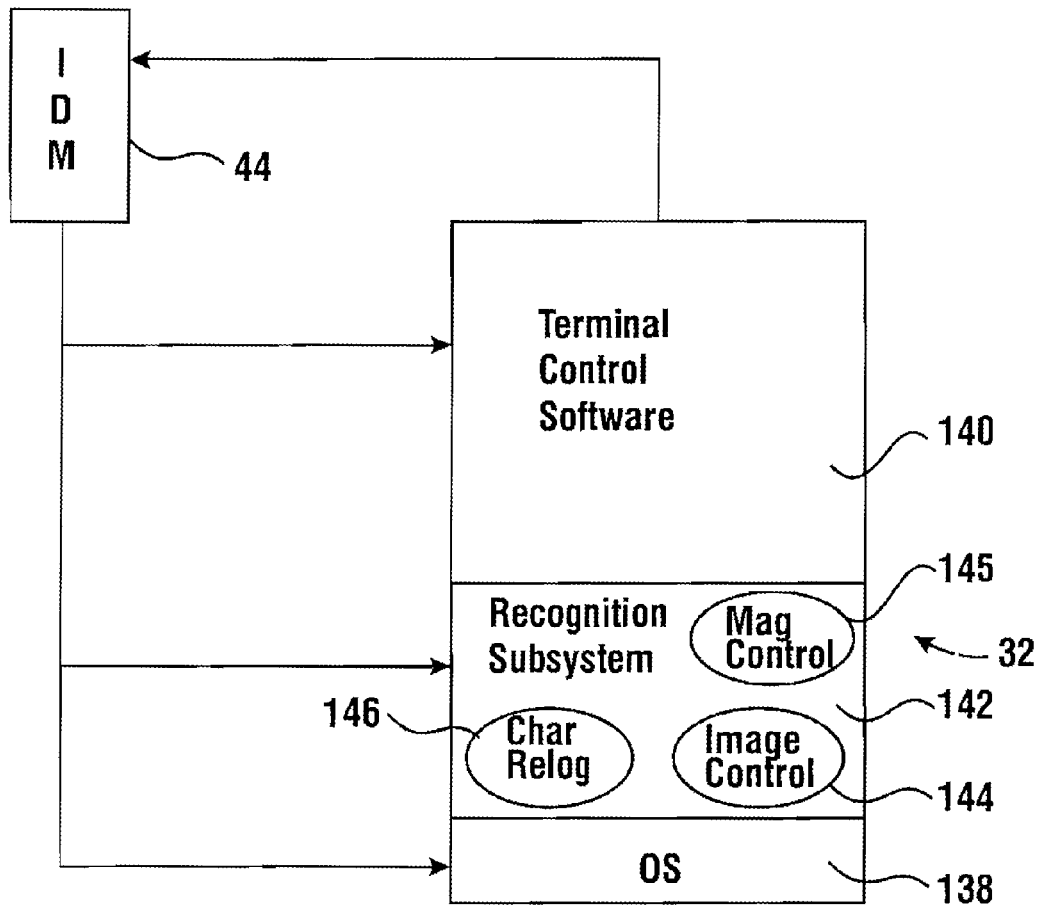
FIG. 3 is an example schematic view of exemplary software components used in connection with the automated banking machine shown in FIG. 2.
Figure 4:
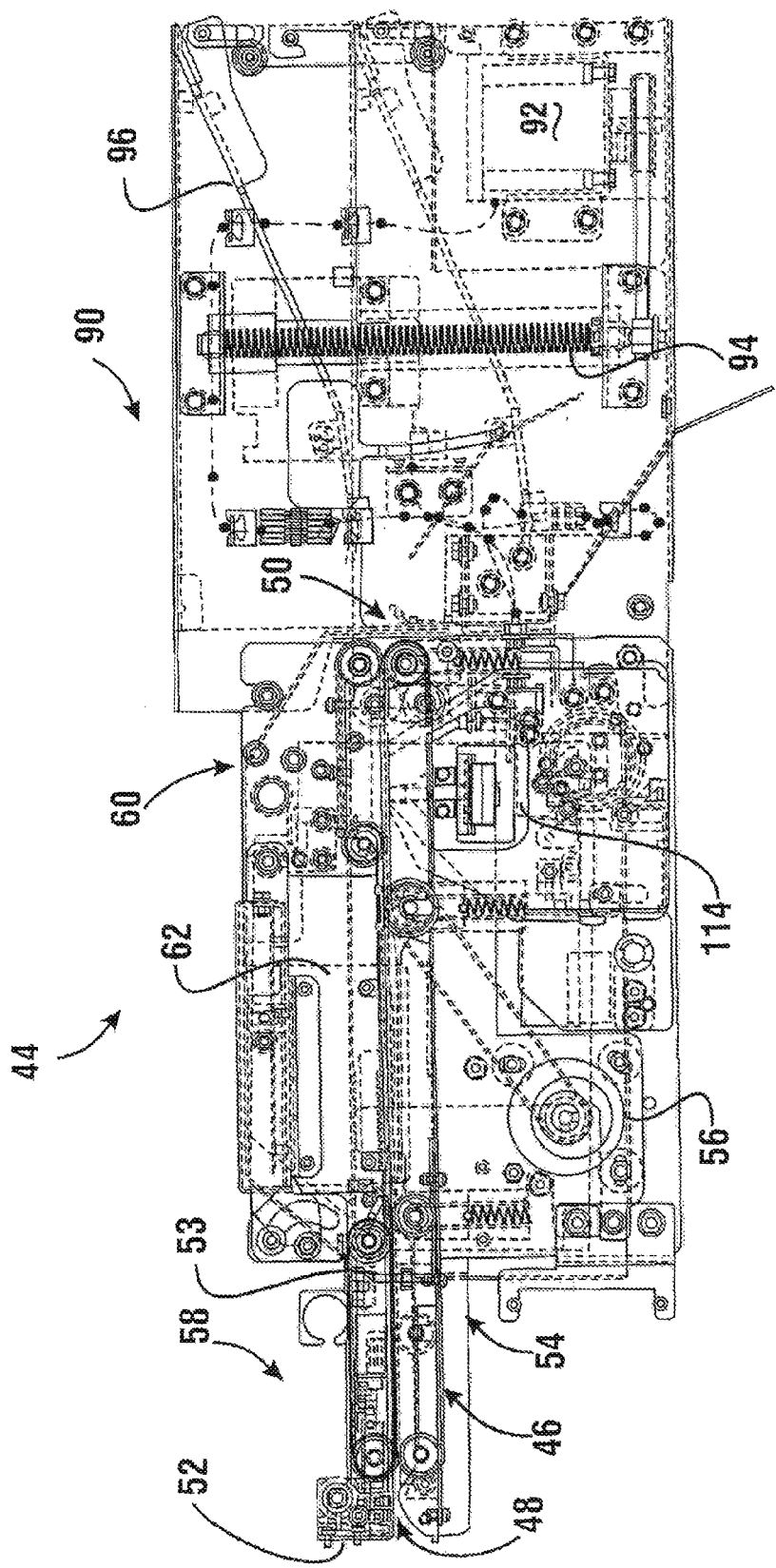
FIG. 4 is an example side view of a deposit accepting apparatus used in connection with an example embodiment.
Figure 5:
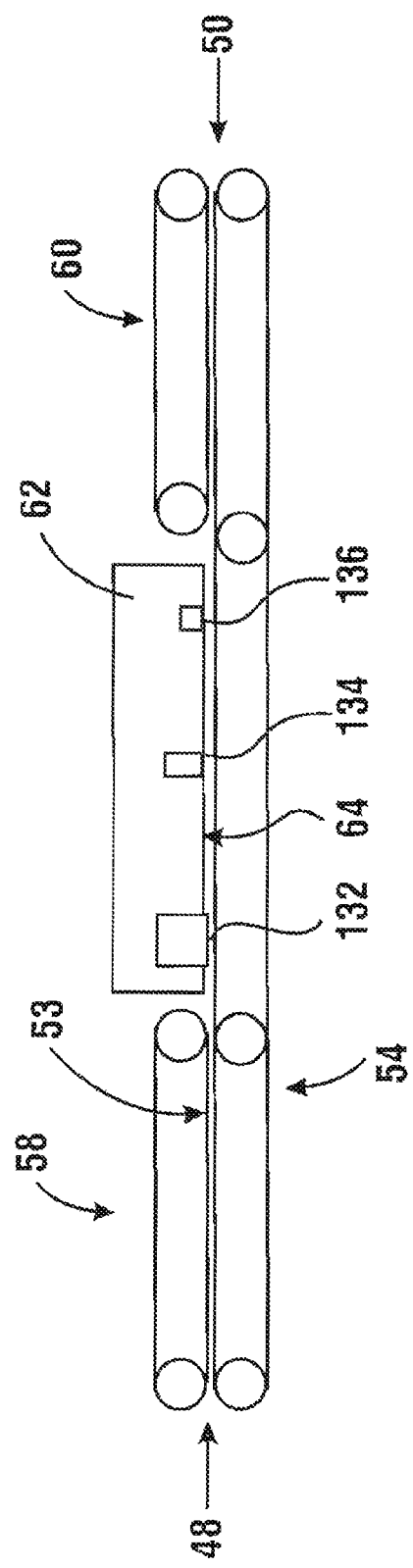
FIG. 5 is an example schematic view of the deposit accepting apparatus shown in FIG. 4.
Figure 6:
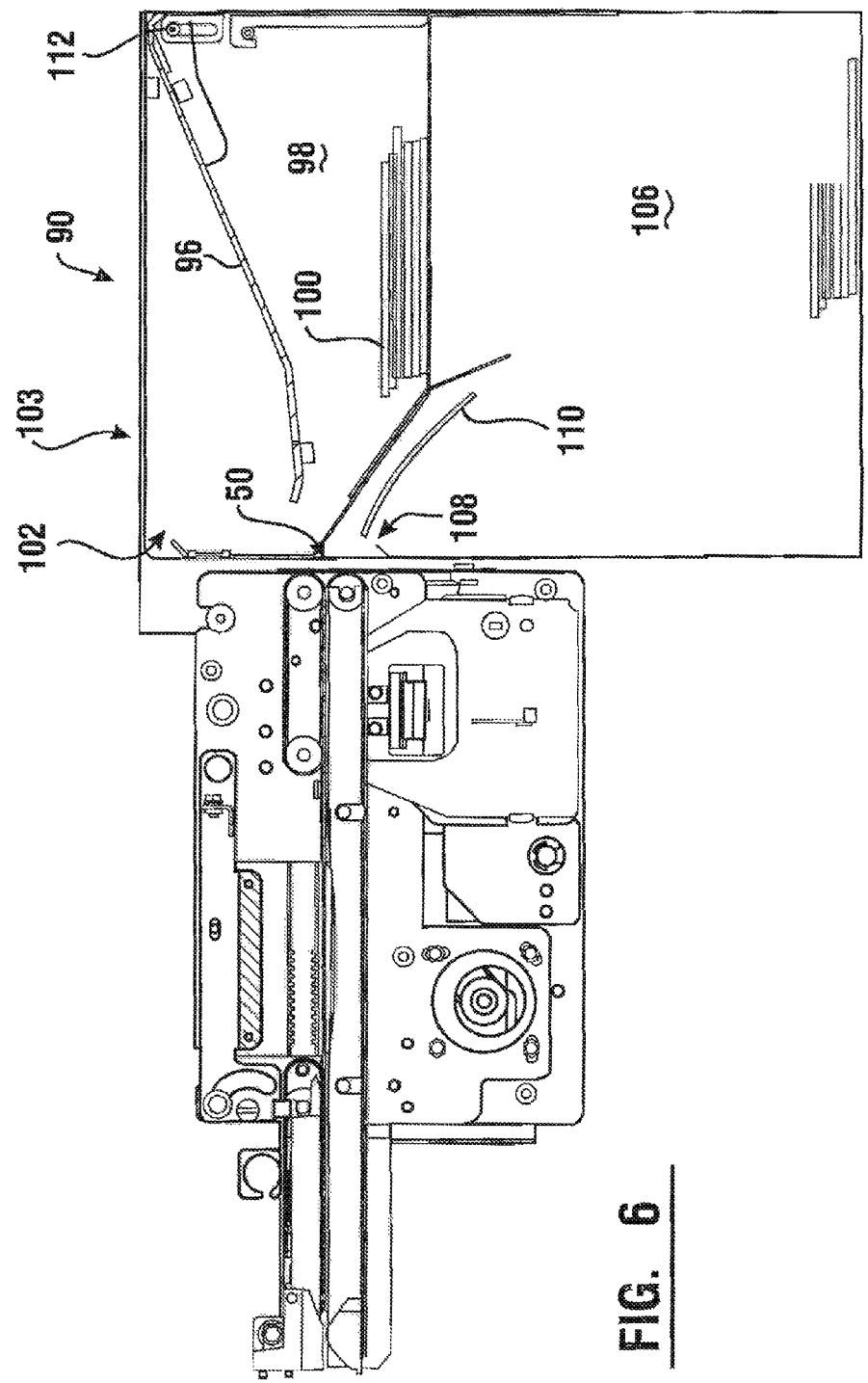
FIG. 6 is an example side view of the deposit holding module of the transport apparatus shown in a position accepting a sheet into a sheet holding compartment.

In the described example embodiment the transaction function devices include a check acceptor which comprises a deposit accepting apparatus. The example deposit accepting apparatus is capable of accepting deposited items such as envelopes as well as sheets and documents such as checks. This deposit accepting apparatus in alternative embodiments may be capable of accepting and analyzing other items such as papers, instruments, billing statements, invoices, vouchers, wagering slips, receipts, scrip, payment documents, driver's licenses, cards and items which may be moved in the deposit accepting device. Alternative embodiments of a deposit accepting apparatus may accept only selected ones of deposit items. The example deposit accepting apparatus may alternatively be referred to herein as an "intelligent depository module," "depository module" or "IDM." An example embodiment of the IDM 44 is shown in FIG. 3 and example mechanical components thereof are shown in FIGS. 4-6. It should be understood that for purposes of this application, a deposit accepting apparatus or deposit acceptor encompasses any mechanism that accepts an item into an automated banking machine.

As shown in FIG. 4, IDM 44 includes a transport section 46. Transport section 46 extends in generally a straight path from an inlet 48 to an outlet 50. Inlet 48 is positioned adjacent to a deposit accepting opening 30 through the body of the ATM 10. Access to the transport section 46 from the outside of the ATM may be controlled by a gate 52 or other suitable blocking mechanism which operates under the control of the terminal processor 32. The terminal processor operates to open the gate only when an authorized user of the ATM is to provide items to or to receive items from the transport section of the IDM. The IDM 44 may be like those shown in U.S. patent application Ser. No. 11/371,372, U.S. patent application Ser. No. 11/983,401 filed Nov. 8, 2007 and/or U.S. Pat. No. 7,448,536, the disclosures of each of which is hereby incorporated herein by reference.

The transport section 46 of the exemplary IDM includes a plurality of belts or other moving members 54. Moving members 54 operate to engage items deposited into the transport section and to move deposited items in engagement therewith. The moving members are moved in response to one or more drives schematically indicated 56. In this example embodiment an inlet transport section 58 moves deposited items between upper and lower belt flights (see FIG. 5). Similarly, deposited items are also moved through an outlet transport section 60 in sandwiched relation between upper and lower belt flights. Between the inlet and outlet transport sections deposited items are moved past an analysis module 62. In this example embodiment deposited items are moved adjacent to the analysis module in engagement with moving members that act on the lower side of the deposited item. In this way the deposited item moves in close proximity to the analysis module and in sandwiched relation between a lower face 64 of the analysis module and the upper face of the moving members. Of course it should be understood that this configuration is an example. In other embodiments additional analysis modules may be provided so that both sides of an item are analyzed. Analysis modules or discrete devices for activating indicia to facilitate sensing, as well as for sensing indicia on items, may be provided as necessary to read indicia from items handled by the banking machine.

The example embodiment further includes a deposit holding module schematically indicated 90 (see FIG. 4). In the example embodiment the deposit holding module includes a plurality of compartments which are moved relative to the outlet 50 of the transport section to enable items to be passed from the transport section into a selected compartment. The deposit holding module includes a drive which is part of a translation mechanism 94 of the screw type. The translation mechanism operates to move the compartments in a generally vertical direction relative to the outlet 50 in the transport section. The deposit holding module further includes a tamping member 96 which is movable in the compartment and operates to tamp sheets held in a sheet holding compartment so as to reduce the volume of sheets held therein until the items may be removed.

In the example embodiment the analysis module 62 includes optical scanning sensors schematically indicated 132 in FIG. 5. The analysis module may serve as a check imaging device. Scanning sensors 132 are operative to generate an image of documents that move adjacent to the analysis module. In the example embodiment the scanning sensors scan generally the entire transverse path through which documents may travel in the transport section. The scanner in the described embodiment generates radiation in the visible range and resolves images at approximately 240 dots per lineal inch. The scanning sensor is also operative to have a focal length which corresponds to the distance that the scanned documents are disposed from the surface of the sensor as they pass the analysis module. In the example embodiment the scanning sensor 132 has a focal length of about 4 millimeters. Of course in other embodiments other types of scanning sensors may be used. Such other types of sensors may include emitters and sensors for sensing radiation at discrete frequencies in the visible or non-visible range. In addition multiple sensor types may be used on one or both sides of documents. Various types of sensors may be used having different scanning resolution. The imaging device of the example embodiment is operative responsive to an associated processor to produce image data, which comprises electronic data which corresponds to a full or partial visual image corresponding to the visual appearance of the scanned check or other item.

The example analysis module further includes a magnetic sensor including sensing elements 134. The magnetic sensing elements 134 are operative to sense the magnetic properties of documents which pass adjacent to the analysis module. In the example embodiment the magnetic sensing elements 134 include a plurality of discrete transversely spaced magnetic sensors. The magnetic sensors generally each cover a relatively small portion of the overall transport width. The sensors are arranged in sufficient proximity so that substantially the entire transverse width of the document path is sensed. The analysis module further includes a magnet 136. Magnet 136 may comprise a unitary or a plurality of permanent or temporary magnets. In the example embodiment permanent magnets are used. The permanent magnets operate to activate magnetic properties of magnetic inks on documents passing adjacent to the analysis module. These magnetic properties may then be more readily sensed by the magnetic sensing elements 134.

It should be understood that the particular sensors and devices in analysis module 62 are examples. Other embodiments may include only an optical scanner or magnetic sensing elements, or different or additional types of scanning and sensing elements. For example, some embodiments may include scanners for reading bar code or other types of optical indicia. Other embodiments may include devices for reading magnetic flux reversals that may be encoded in a magnetic media. Some embodiments may include read heads for reading MICR symbols or other magnetically sensible features. Other embodiments may include devices which are operative to detect the presence of holograms or to read non-visible radiation, fluorescent inks, or other types of coding. The particular activating and sensing devices included in a particular analysis module will depend on the particular types of documents to be verified and analyzed through operation of the embodiment.

FIG. 3 shows schematically the relationship of the IDM 44 with example software components which operate in the terminal processor 32. The terminal processor 32 has operating therein an operating system layer schematically indicated 138. The operating system layer 138 may include operating systems such as OS/2® from IBM, Windows NT® or Windows XP® from Microsoft, Linux or other suitable operating system. The operating system communicates with a terminal control software layer 140. The terminal control layer in the example embodiment operates to control numerous aspects of the ATM functions including aspects of the transaction function devices. As schematically represented in FIG. 3 the terminal control software sends messages to and receives messages from devices associated with the IDM 44. The messages are generally operative to control mechanical components of the IDM as well as to receive inputs from sensors and other devices which operate in connection with the deposit accepting function.

The example software architecture also includes a recognition subsystem software layer 142. The recognition subsystem layer also communicates with the operating system layer and the terminal control software layer to control and receive inputs from the IDM. The recognition subsystem layer includes software which functions to control, manipulate and analyze image data received from the IDM as schematically represented by image control component 144. Another software component of the example recognition subsystem layer accomplishes symbol recognition. This symbol recognition component schematically represented 146 in the example embodiment is operative to identify MICR coding and numerical symbols. In the example embodiment the symbol recognition software includes software that is commercially available from Carreker Corp. Other providers of symbol recognition software include Parascript, Mitek and A2iA. Of course other suitable recognition software may be used. The recognition subsystem 142 of the example embodiment also includes a magnetic data control component schematically represented 145 that is operative to analyze and to manipulate data received from the magnetic sensing elements and to check for correlation between the magnetic data that is sensed and the optical data which is obtained from the scanning activity. Of course these software functions are examples and these functions may be programmed differently and other or additional software components may be included in other embodiments.

Figure 7:
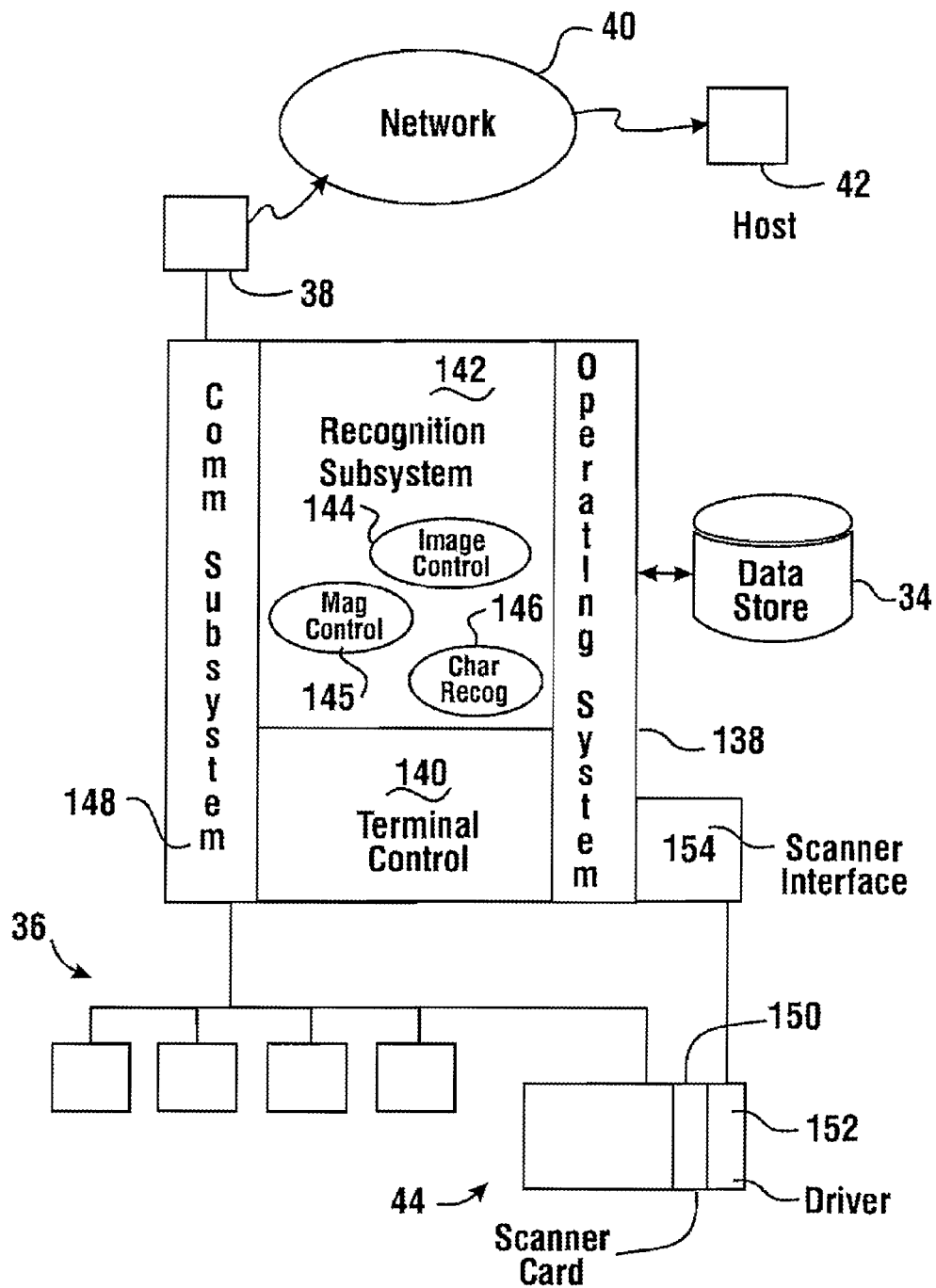
FIG. 7 is an example schematic view of hardware and software components used in connection with the automated banking machine of some example embodiments.
Figure 8:
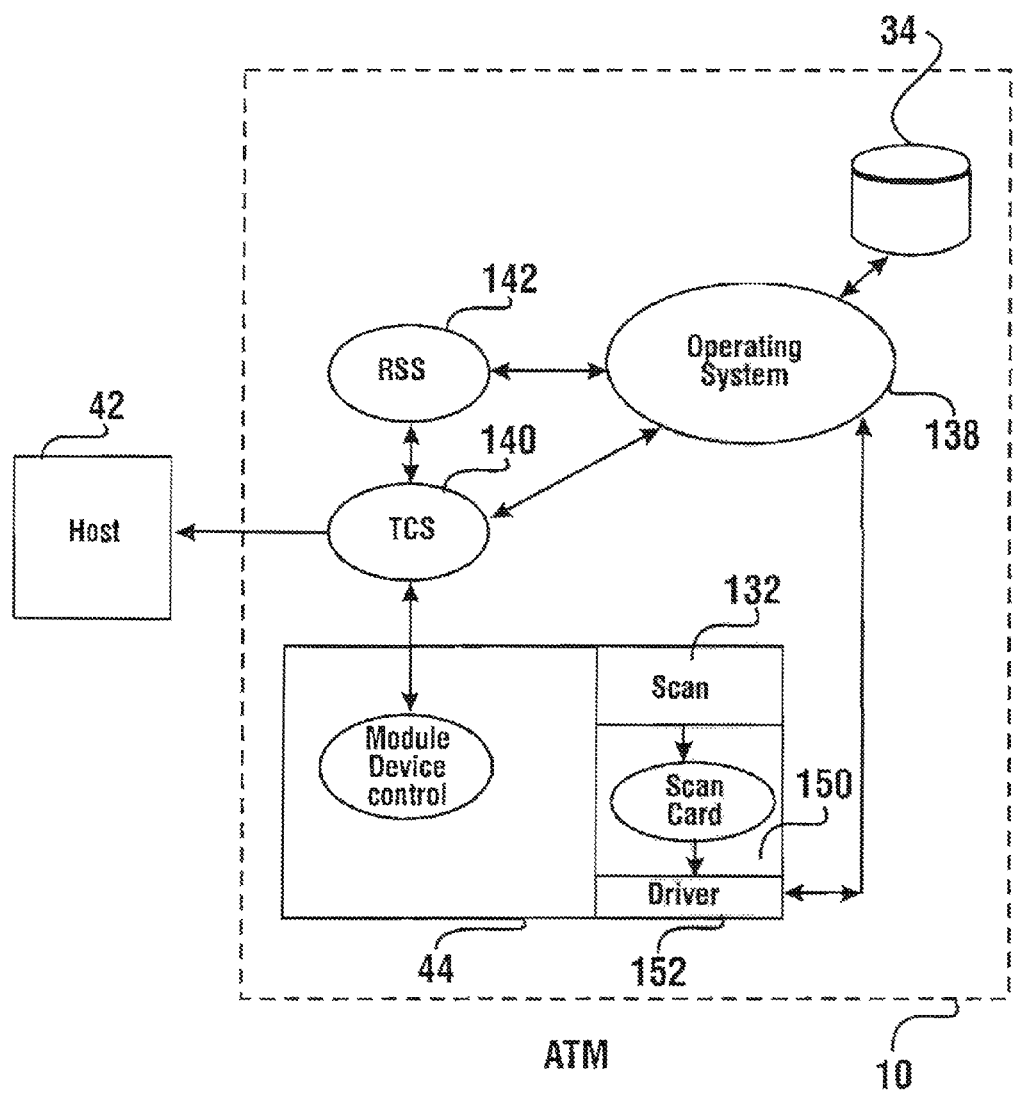
FIG. 8 is an example schematic view of the interaction of components used in connection with accepting documents in an exemplary deposit accepting system.
Figure 9:
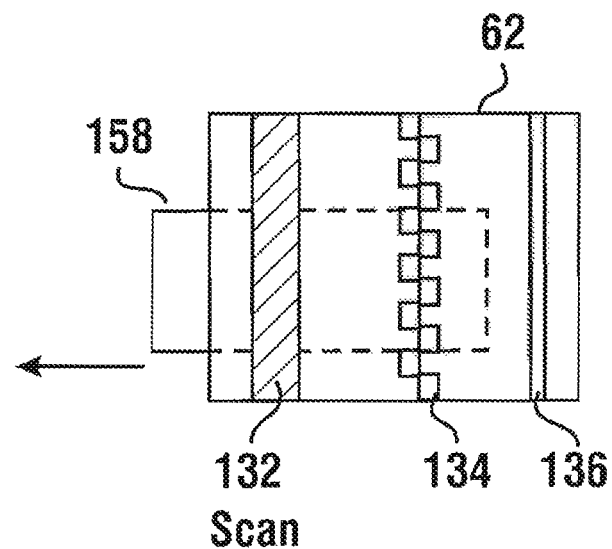
FIGS. 9-10 are example schematic views representing a series of steps executed through use of the deposit accepting apparatus in connection with accepting a check in the machine.
Figure 10:
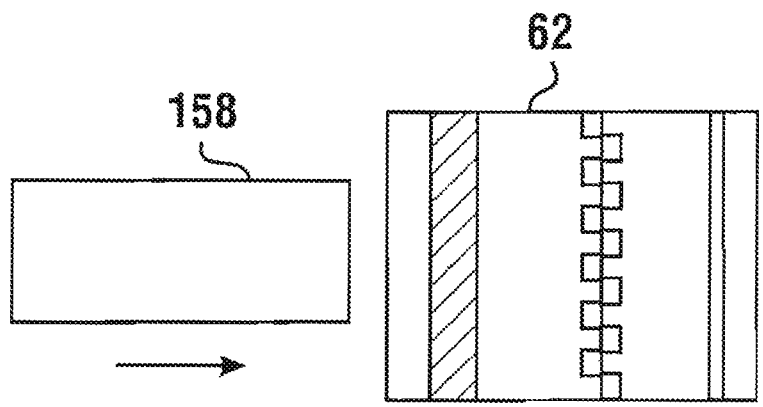

FIG. 7 shows the example schematic components of the software in greater detail. As can be appreciated the operating system 138 in the terminal processor is in operative connection with one or more data stores 34. The data store may include the data corresponding to information concerning programs, transactions, instructions and other data or program logic which are necessary to control the operation of the ATM. In addition the data store includes the data used in connection with analyzing and verifying documents. As later discussed the data store may also include image data corresponding to the images of documents that have been accepted by the system as well as transaction identifying data. The software in connection with the example terminal processor also includes a communication subsystem layer 148. The communication subsystem layer enables communication between the various software components of the system. The communication subsystem layer also communicates with the various transaction function devices 36 through appropriate interfaces or drivers. In addition communication layer 148 in the example embodiment also enables communication through appropriate interfaces 38 to one or more communications networks 40 and the host computers 42 which are operatively connected thereto. Of course this software architecture is merely an example and in other embodiments other approaches may be used.

In the example embodiment the IDM 44 includes an onboard computer processor which resides on a scanner card 150. The scanner card 150 further receives and operates upon data from the optical scanning sensors 132 on the analysis module 62. The scanner card further has included thereon a driver schematically indicated 152. The driver is operative to communicate through a scanner interface 154 with the operating system 138 and the data store 134. The driver 152 is also operative to control the scanning activity which is carried out by the scanner card 150. In the example embodiment the driver is also operative to control the allocation of memory for use in the scanner operation. This assures that adequate memory is available in RAM to carry out the capture, storage and analysis of the scanning data as required to analyze and authenticate documents which may be input in the machine.

As represented in FIG. 7 in the example embodiment, when a document is to be scanned the terminal control software 140 causes the particular document to be moved as desired in the IDM 44. This is done by controlling the various devices which sense and move documents in and through the module. The terminal control software 140 operates in conjunction with the recognition subsystem 142 which provides instructions to the scanner card 150 to scan documents using the optical scanning sensors 132 during the appropriate time periods. The data from the scanning process and magnetic sensing operations is returned through the operating system to memory. The data is then recovered from memory and manipulated responsive to the image control and symbol recognition features of the recognition subsystem 142. The results of the manipulation and analysis of the scanned data is then communicated through the terminal control layer to a remote host 42. This is done in this example embodiment using transaction request and authorization messages of a type that can be handled within the framework of ATM transaction processing systems.

In some example embodiments the ATM operates to receive identifying data from the user in the manner previously discussed. The user identifies the particular transaction type to be associated with the transaction. In this case the user may indicate that the user has selected the option of cashing a particular check. Next the user provides inputs corresponding to the amount associated with the transaction they wish to conduct. In response to these inputs the terminal processor may operate in accordance with its programming to open the gate 52 adjacent the opening to the transport section 46 of the IDM 44. The user may now insert a check into the opening. The document is then moved past the optical and magnetic sensors in the analysis module 62 as represented in FIG. 5. As the document moves past the analysis module, the terminal control software and recognition subsystem software gather the image and profile data that is used to analyze and/or produce an electronic image of the document. As the check 158 passes the magnet 136 the magnetic ink thereon is magnetized. This magnetized ink is then sensed by the magnetic sensors 134 which provide a profile of the area in which magnetic ink is present.

As also represented in FIG. 5 movement of the document past the scanning sensors 132 causes image data to be produced which is indicative of the optical characteristics of the document passing in the transport section. This image data corresponds to an electronic image of the check that is captured through operation of the scanner card and included in the data store associated with the ATM. The scanning process is continued as the check 158 moves past the analysis module 162 as shown in FIG. 4.

The terminal processor next operates to apply the rules which are implemented through operation of the programs stored in memory concerning the particular type of document associated with the transaction. Generally at least one input by the customer indicating that they are making a check deposit may be correlated with certain stored data or rules which indicate the particular characteristics of the document that is to be received. In some cases the inputs may correspond to a particular sized document. Alternatively the rules may correspond to particular configurations or other characteristics. In this example the rules stored in memory are also indicative of "windows" or particular zones or areas in the document landscape in which data which should be analyzed on the document may be found.

Figure 11:
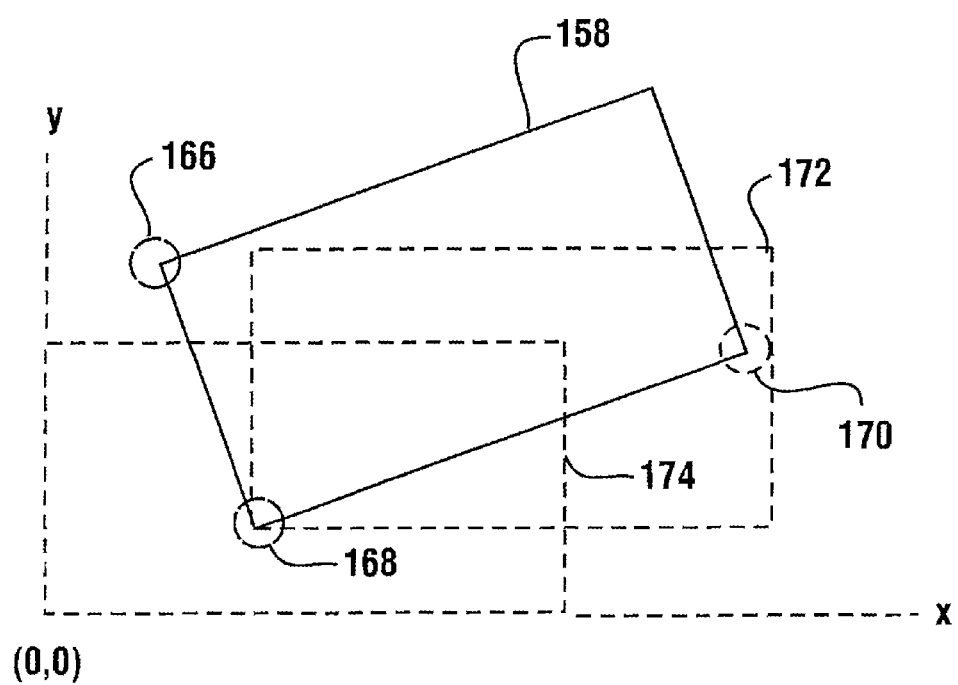
FIG. 11 is an example schematic view showing how data representative of an image of a deposited instrument is modified and aligned in an example embodiment for purposes of analysis.

In accordance with the example embodiment which operates to analyze check 158, the terminal processor operates in accordance with the applicable rules recovered from memory as associated with a check deposit to deskew the data corresponding to the image and place it in registration with an imposed coordinate system. This is done in the example embodiment through use of a programmed series of steps which finds the boundaries of the image data. This is done by comparing the pixels which make up the image and generating at least two of the lines which bound the document. By identifying these lines, one or more corners of the document may be identified. This process is represented in FIG. 11 by the skewed profile of check 158 which is shown in solid lines.

In the example embodiment, after finding the two leading corners of the document 166 and 168 and the most closely adjacent trailing corner to an X coordinate 170, the terminal processor operates in accordance with its programming to adjust the data corresponding to the image. The example terminal processor first operates to adjust the image by rotating the image data about corner 168. This causes the image to be "squared up" relative to the imposed coordinate system as represented by a phantom image 172. The computer next operates to shift the squared up image data to a reference point of the coordinate system. This shifting places the leading corner 168 at the origin of the imposed X and Y coordinate system. The leading corner 166 is placed along the Y axis while the trailing corner 170 is placed along the X axis. It should be understood that all of the pixels which make up the image data are correspondingly adjusted through this process to produce the shifted image 174 which is shown in phantom in FIG. 11.

Figure 12:
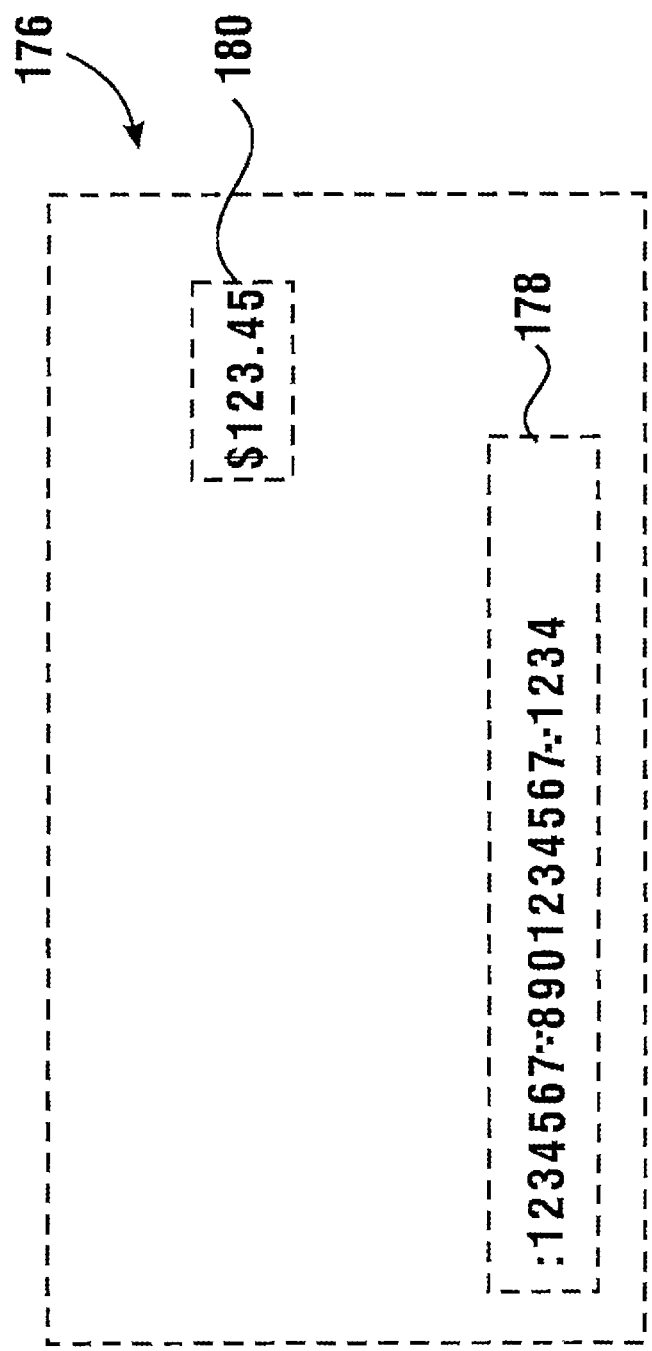
FIG. 12 is an example schematic view of the application of a template for a particular type of deposited instrument to image data for an instrument deposited to the deposit accepting apparatus of an example embodiment.

The terminal processor next operates in accordance with its programming to apply template logic to the shifted image 174. The computer operates to recover from memory, data corresponding to at least one selected template. In example embodiments a plurality of templates may be stored in memory and the selected one is recovered responsive to customer inputs to the machine, indicia read from the document or other data. In this step the computer operates to apply a template over the shifted image to identify for analysis "windows" within the image that contains data that is of interest. This is represented schematically in FIG. 12. In FIG. 12 a template is schematically indicated 176. Template 176 includes a first window 178 which generally corresponds to a zone or an area in which a MICR line on a check may be located. Template 176 further includes a second window 180. Window 180 corresponds to a zone or an area of the landscape on the check where a courtesy amount which represents the value of the deposited check may be located. It should be understood that these windows are examples and in other embodiments other or additional windows may be included. Such windows may include, for example, a window for the so called legal amount which is the written or typed amount of the check. A window may also be provided for an "amount not to exceed" indicator, date, payee name, payor name or other information that appears on the check. It should further be understood that these processes for identifying windowed zones or areas within shifted data are carried out through operation of the at least one processor and the computer executable instructions included in the recognition subsystem software, and that these graphic representations shown in the Figures merely serve to explain the nature of an example form of the analysis that is carried out.

The computer may operate to analyze the data in the window of the template which corresponds to the potential location of the MICR line. This is accomplished by the image control component 144 of the software analyzing data from the data store. It should be understood that the data within the particular window may or may not correspond to the MICR line depending on the orientation of the document as well as whether the document itself is valid.

The computer may then operate to pass the data extracted from the window 178. This symbol recognition software component is operative to apply the logic used for optically reading MICR symbols. Any method operative to read or detect the MICR symbol may be used. U.S. Pat. Nos. 5,303, 311 and 5,105,470 describe some example embodiments of optically recognizing symbols and the disclosures of each of them are hereby incorporated herein by reference. In the example embodiment this logic may be associated with reading E-13B or CMC-7 type symbols. The symbol recognition software component 146 is operative to analyze the data and make evaluations in looking for known symbols of the particular type. In the example embodiment the symbols represented which are resolved are processed to derive ASCII values corresponding to the symbols.

The recognition subsystem software 142 may next operate to determine if the degree of assurance or confidence as indicated by the symbol recognition component for the values returned, is above a threshold. The determination of the level of assurance is based on one or more values delivered by the pattern recognition algorithms in the symbol recognition software component used in the example embodiment. The computer may operate in response to its programming to proceed based on whether the level of assurance is at or above, or below the threshold. Of course this approach is an example and in other embodiments other approaches may be used.

If the level of assurance in the determined MICR values is indicated as below the threshold and/or if routing and transfer symbols are not found, the recognition subsystem through operation of the image control software component, operates to further manipulate the image. In the example transaction the computer operates to manipulate the data to essentially transpose and flip the image 180 degrees and to again read the data in the MICR line window. It should be understood that in other embodiments the data corresponding to the image may be manipulated in other ways in order to attempt to translate the image so as to find appropriate data.

The translated image data now in the window 178 may again be read and passed to the symbol recognition software component 146. This again causes the output of ASCII values based on the symbols in the window. If the MICR values read have an associated level of assurance at or above the threshold and routing and transfer symbols are present, the recognition subsystem is operative to proceed with further analysis of the image. However if the level of assurance remains below the threshold and/or there are no routing or transfer symbols, this may be an indication that the document is not valid. In some embodiments the ATM may operate to further transpose the data and conduct additional analysis. This may be particularly appropriate in situations where both sides of the document are being scanned and the document may be in different orientations. In this case the terminal processor may cause the ATM to operate to return the document to the customer and to close the transaction.

The example embodiment has a recognition software subsystem that further operates to check for the presence of magnetic ink on the document in the proper location. This is done in the example embodiments by component 145 determining the length and configuration of the magnetic profile associated with the document. This length and orientation data may be normalized in the manner of the image data based on the imposed coordinate system, and compared therewith to verify that the magnetic areas correspond to the optical data corresponding symbols in the MICR line.

It should be understood that while the example embodiment has been described as reading checks and vouchers, other embodiments may be used for reading other document types. Such other document types may include for example statements of charges such as deposit slips, utility bills, credit card bills and other statements of charges. Embodiments may further be adapted to read other or additional types of coding such as one or two-dimensional bar codes, other symbol sets, alphabets of various languages or other symbols. Embodiments may accept only one type of item, or a plurality of types of items. Further, while the example embodiment accepts envelopes, other embodiments may not accept such items, or may accept other types of items.

It should be understood that the architecture of the computers and software described is an example. Other embodiments may use different computer and/or software architectures to accomplish the functions and methods described. Further the one or more computers operating in an automated banking machine may be programmed by reading through operation of one or more appropriate reading devices, machine readable articles which comprise media with computer executable instructions that are operative to cause the one or more computers (alternatively referred to herein as processors) in the machine to carry out one or more of the functions and method steps described. Such machine readable media may include for example one or more CDs, DVDs, magnetic discs, optical disks, flash memory, tapes, hard disk drives, PROMS, memory cards or other suitable types of media.

Figure 13:
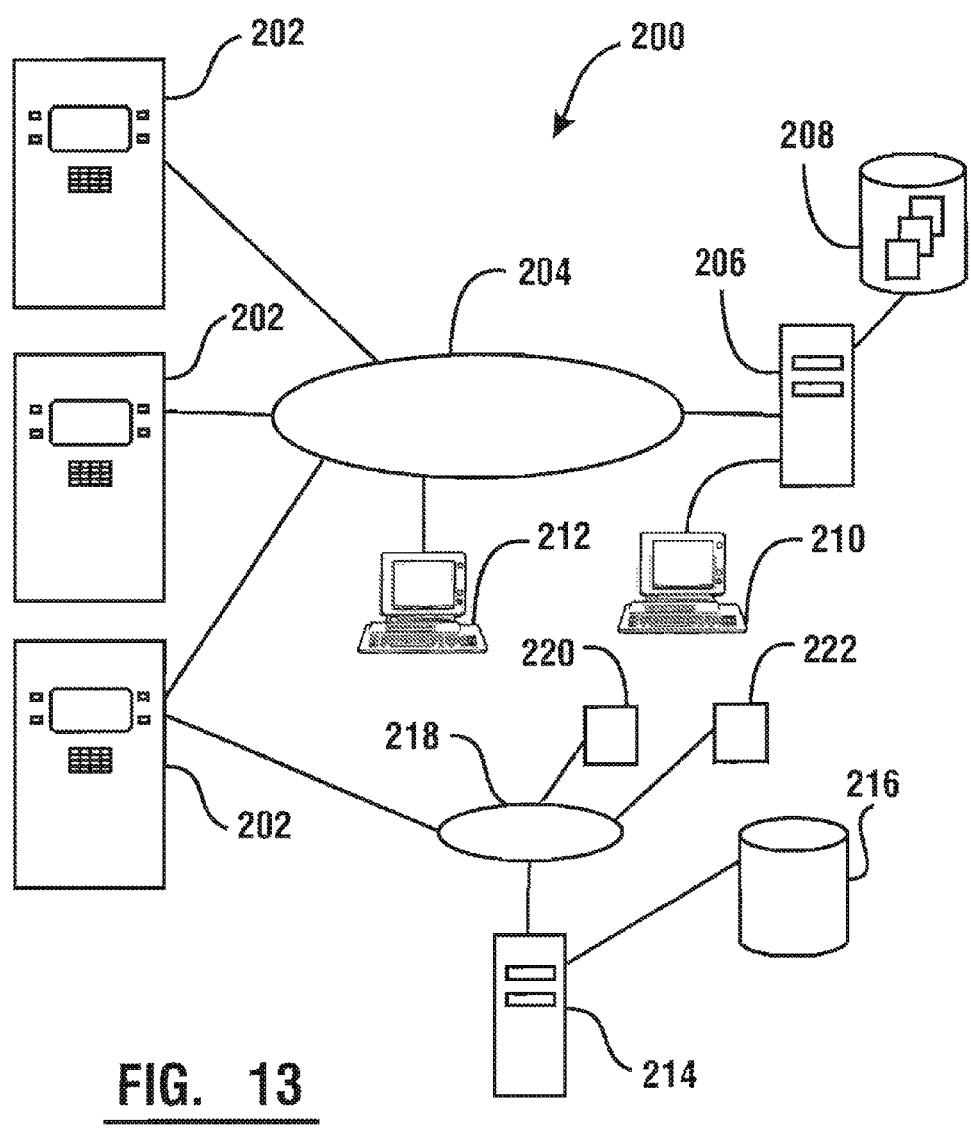
FIG. 13 is an example schematic view of an alternative system of an example embodiment including check accepting automated banking machines.

FIG. 13 shows an alternative example embodiment of a system generally indicated 200, in which check cashing is provided through automated banking machines. The system includes automated banking machines 202 which may be automated teller machines of the type previously discussed. ATMs 202 are connected through a network 204, to a host computer which is alternatively referred to as a transaction server generally indicated 206. Network 204 may comprise any of a number of public or private networks suitable for communicating between host computer 206 and the ATMs. As schematically represented in FIG. 13, host computer 206 is in operative connection with at least one data store 208 which includes various types of instructions and stored data. Host 206 is also in operative connection with a host interface terminal 210. As can be appreciated, data stores are also referred to herein as computer memories.

In the example embodiment system 200 includes at least one administrator station 212. Administrator station 212 in the example embodiment is a computer or server in operative connection with the network 204. Administrator station 212 is used by the operator of the ATMs 202 for purposes of configuring the system and monitoring transactions which occur at the ATMs 202.

Example system 200 further includes a check image server 214. As shown schematically, the check image server 214 is in operative connection with a data store 216. The check image server 214 comprises a computer that is connected to ATMs 202 through a network 218. Network 218 may be the same or different network than network 204. Other servers 220 and 222 are connected to the network 218. In the example embodiment the check image server 214 is operative to receive data corresponding to electronic images of checks that are received at the ATMs 202. The check image server 214 may be used to archive data corresponding to such images and to accomplish settlement among the various entities which hold accounts which must be credited and debited in the conduct of a check cashing transaction.

In the example embodiment of system 200, ATMs 202 are specifically operated for purposes of providing check cashing services. Such check cashing services may be provided for persons holding accounts with the operator of the system such as a financial institution. Alternatively in some embodiments ATMs 202 may be specifically operated to provide check cashing services for persons who do not hold accounts with the operator of the system but who have a need to cash checks drawn by makers who have accounts or other relationships with the operator of the system. This may be, for example, a situation where a particular entity has contracted with the operator of the system to honor checks for which the entity is a maker and which are deposited in a machine. Other embodiments may be operative to cash checks for which the particular maker of the check has an account relationship with the operator of the system. As later discussed, in some example embodiments checks may be cashed at the ATMs 202 by users who are associated with the makers of checks and who are correlated with data corresponding to such makers in one or more data stores operatively connected to the system.

Figure 14:
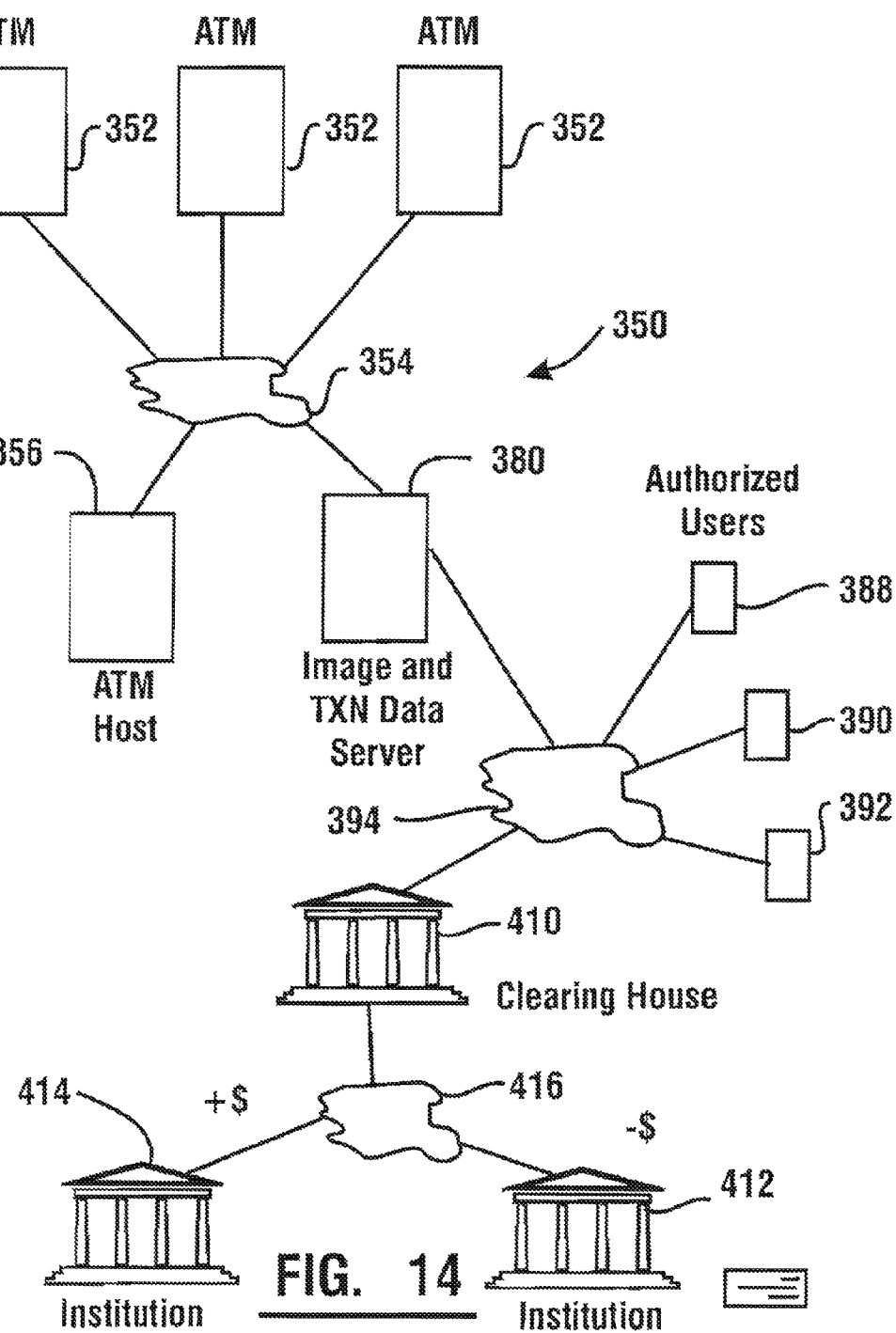
FIG. 14 is an example schematic view of an alternative system for processing check transaction data and image data related to checks received through automated banking machines.

An alternative embodiment of a system for cashing checks through ATMs and delivering images of such checks for further processing is represented by a system generally indicated 350 in FIG. 14. System 350 includes a plurality of ATMs 352 which communicate through one or more networks 354 with one or more remote computers represented as an ATM host 356. ATM host 356 communicates with the ATMs to conduct transactions generally in the manner previously described. In the example embodiment the ATM transaction host can communicate with the ATMs 352 for purposes of carrying out a plurality of transactions. These may include cash dispensing transactions that do not involve receipt of a check, deposit accepting transactions which involve receipt of deposit items such as checks, balance inquiries, account transfers and/or other transactions depending on the ATM type used.

The example system 350 differs from the systems previously described in that image data corresponding to electronic images of both the front and the back of each check presented at the machine is delivered remotely from the machine for purposes of further processing. Further processing is facilitated in the example embodiment by the ATM providing image data with transaction identifying data which can be used to facilitate the further processing of the transaction. In the example embodiment the transaction identifying data is provided by the ATM host in the message that the host sends to the ATM authorizing the acceptance of the check. This transaction identifying data may include the information that is needed for further processing of a settlement of the check. In some embodiments this enables the image messages which are delivered by the ATM, to be used to process the check electronically as a substitute for the paper document. This may also avoid the need to recover some additional transaction data from other sources or systems because such data has been associated by the ATM with the image as part of the image message. Of course this approach is an example and in other embodiments other approaches may be used.

As discussed previously and as discussed in U.S. Pat. No. 6,554,185 and U.S. Application No. 60/584,622 filed Jun. 20, 2004, which are hereby incorporated herein by reference in their entirety, example embodiments of an IDM may include an analysis module with magnetic sensing elements capable of detecting magnetic properties of checks. The presence or absence of magnetic features in different areas of the check may be evaluated to determine whether the check is authentic or a fraudulent copy. In an example embodiment, movement of the check across the magnetic sensor of the analysis module is operative to generate data corresponding to a magnetic image map of the magnetic ink printed on the check. Signals generated by the sensor which are electrical signals representative of the presence of magnetic material may be processed to derive data corresponding to a two-dimensional array of pixels, where each pixel represents a level or strength of magnetic material for the particular area on the check for which the pixel was measured.

Figure 15:
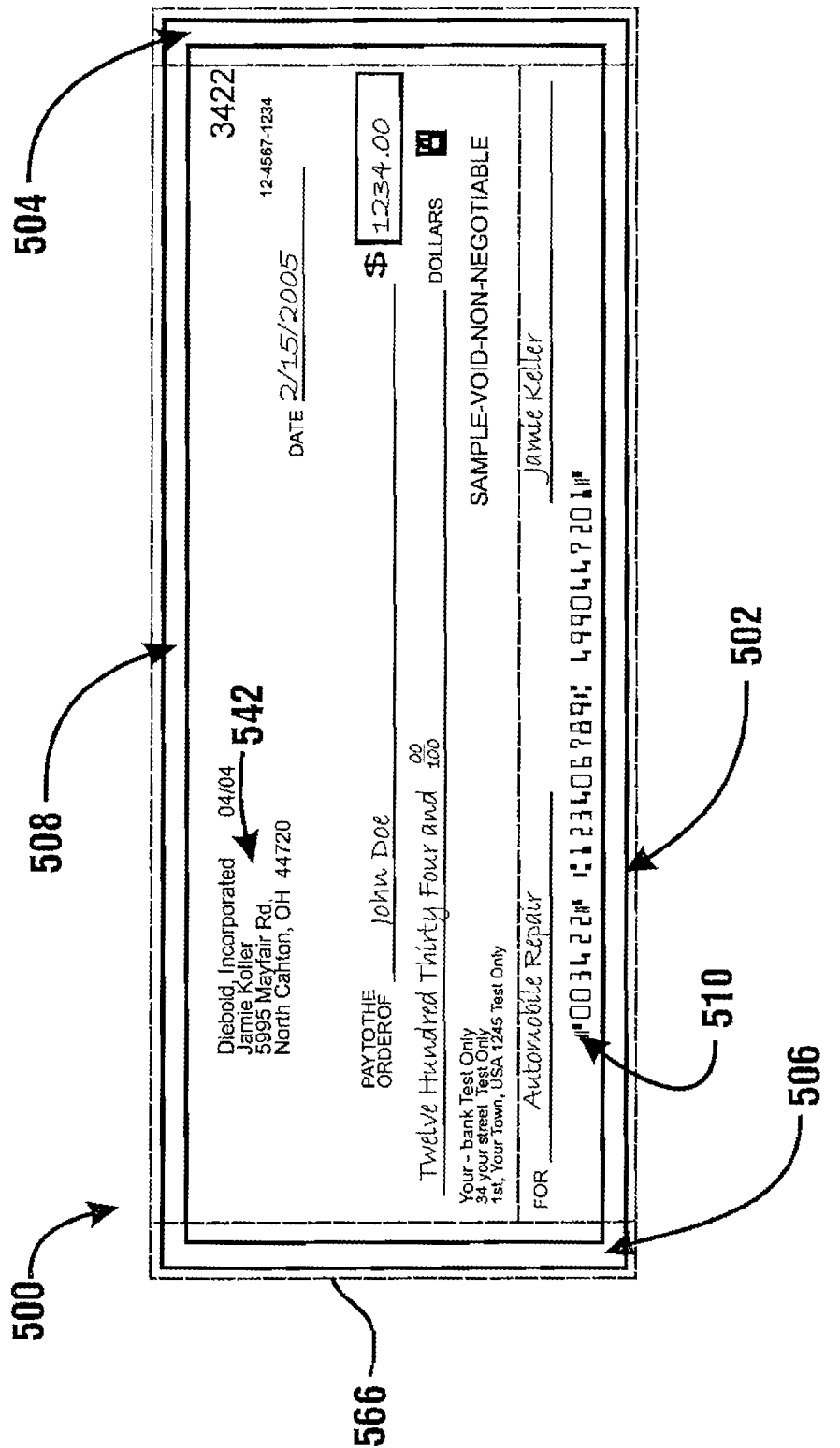
FIG. 15 shows an example of a check which is shown divided into four zones.

Different areas or zones of the magnetic image of the check may be evaluated by one or more processors for the presence or absence of magnetic ink based on the values of the pixels in the magnetic image. For example the image map of a check may be partitioned into a plurality of zones. FIG. 15 shows an example of a check 500 which is shown divided up into four zones (indicated with dashed lines). These zones include the previously described "MICR" zone 502, a leading blank zone 504, a trailing blank zone 506, and a background zone 508.

In an example embodiment, these zones may vary in location depending on the size and the orientation of the check as the check passes across the magnetic sensor. Therefore, as discussed previously, the optical image scan captured by the optical sensors of the IDM may be evaluated to determine the corresponding areas of the magnetic scan which correspond to these four zones. Also in alternative example embodiments additional zones may be evaluated including zones associated with different areas of the background zone including zones corresponding to the payee information, payee bank information, payor information, legal amount, courtesy amount, check number, signature line and memo field.

Figure 16:
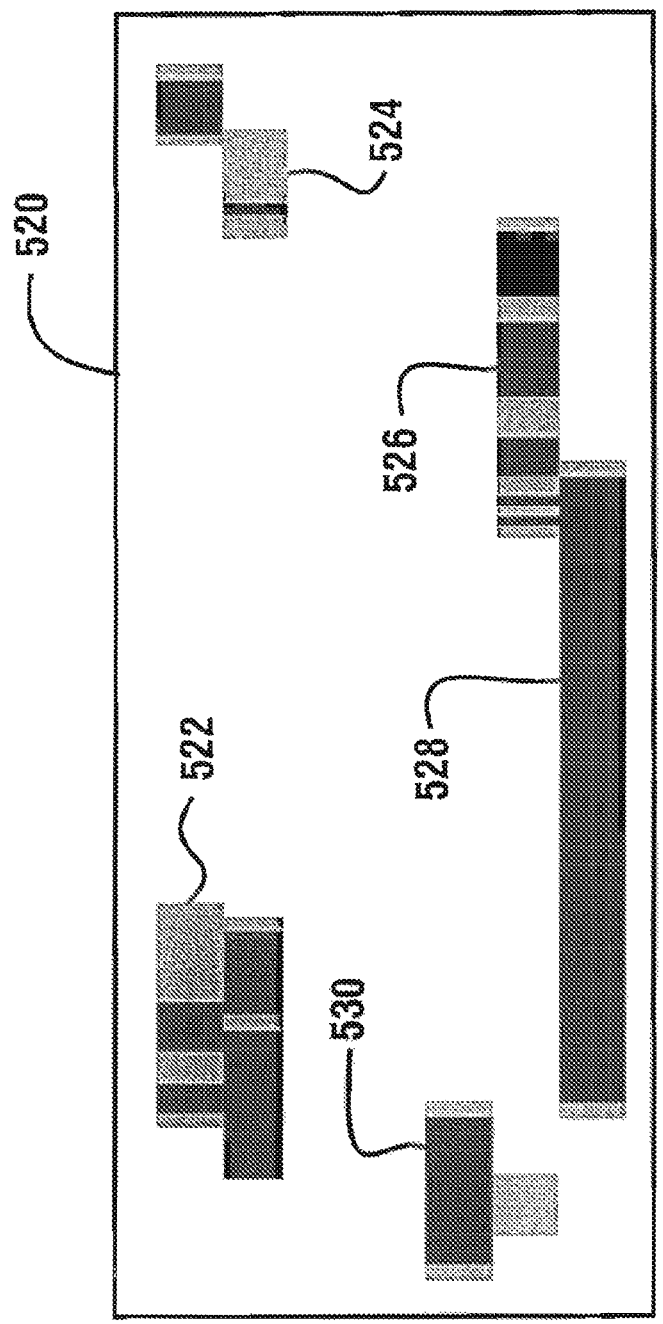
FIG. 16 shows an example visual representation of a magnetic image map for an ANSI compliant check shown in FIG. 15.

FIG. 16 shows a visual representation of data corresponding to a magnetic image map 520 for an ANSI compliant check 500 shown in FIG. 15 and scanned with an example embodiment of the IDM. Here the gray areas 522-530 represent the presence of magnetic ink on the check, with the darker areas representing a stronger magnetic flux intensity. The white areas represent areas of the check in which the measured magnetic intensity is below a threshold value.

In this example, the MICR line 528 is represented as a gray band at the bottom of the magnetic image map. The other gray areas 522, 524, 526, 530 correspond to text on the check which is printed with magnetic ink in the background zone. For example, the gray area associated with reference numeral 522 in FIG. 16 corresponds to the printed name and address of the payor which is also depicted with reference numeral 542 in FIG. 15.

Figure 17:
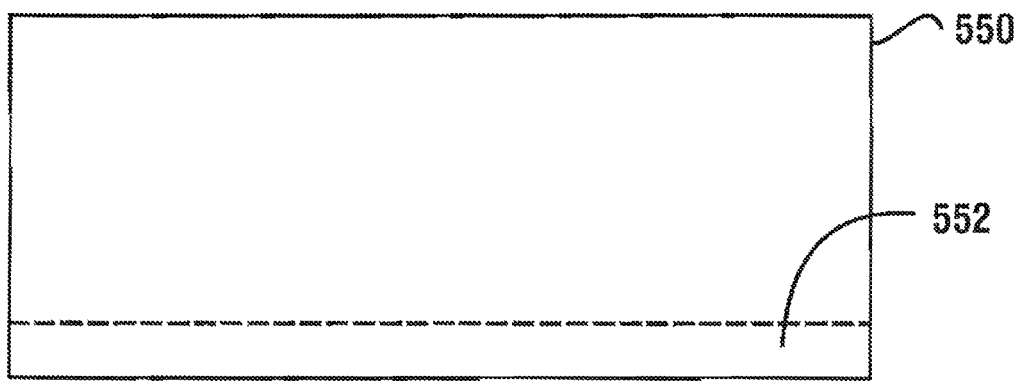
FIG. 17 shows an example visual representation of a magnetic image map for a photocopy of a check made without magnetic toner.

One possible method to produce a fraudulent check is to photocopy the check with a standard photocopier which does not include magnetic toner. The resulting copy may optically look like the original check 500 shown in FIG. 15. However, the ANSI standard requires the MICR line to be printed with magnetic ink or toner. Thus a magnetic image map of such a photocopy as produced by an example embodiment of the IDM will show the absence of magnetic ink or other material on the check. FIG. 17 shows a visual representation 550 of a magnetic image map for a photocopy of a check made without magnetic ink or toner. Here the visual representation of the magnetic image map lacks the gray areas shown in the corresponding visual representation of the magnetic image map 520 in FIG. 15 for an original or authentic check. Example embodiments of the processor of the IDM and/or ATM are operative to evaluate the data corresponding to a magnetic image map acquired by the IDM for a photocopy of a check. Based on the absence of magnetic material in the MICR zone 552 (FIG. 17), the processor may be operative to classify the check as being a possible forgery for which the check maybe returned to the user, confiscated, marked and/or flagged as being suspect.

Figure 18:
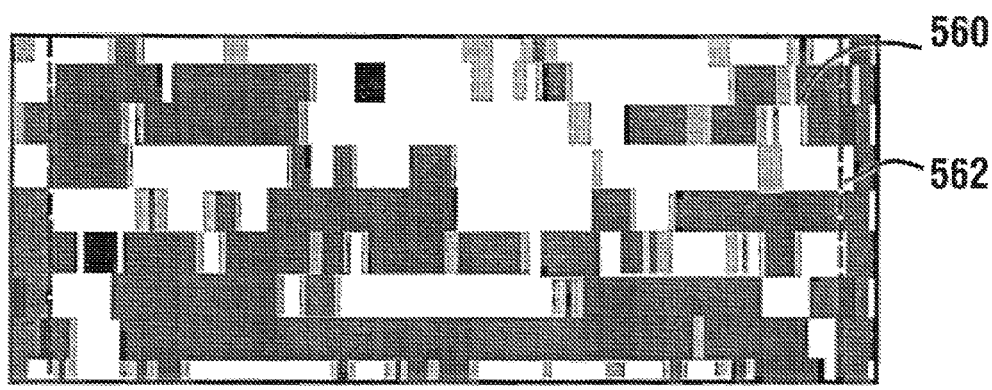
FIG. 18 shows an example visual representation of a magnetic image map for a magnetic photocopy of a check.

Another possible method to produce a fraudulent check is to photocopy the check with a photocopier which includes magnetic toner. The resulting photocopy may optically look like the original check 500 shown in FIG. 15. However, all of the text, graphics or other indicia on the check may be magnetic. FIG. 18 shows a visual representation 560 of a magnetic image map for a magnetic photocopy of such a check. Here the visual representation of the magnetic image map includes substantially more gray areas compared to visual representation of the magnetic image map 520 shown in FIG. 15 for an original or authentic check.

Based on statistics, authentic checks often do not include magnetic material in the trailing and leading blank zones 504, 506 (FIG. 15). However, as shown in FIG. 18, a magnetic image map of a magnetic photocopy of this check, may show the presence of magnetic material in the trailing and leading blank zones. For example, this may be caused by the cosmetic border 566, shown in FIG. 15 on the original check being reproduced in the magnetic photocopy with magnetic toner. Referring back to FIG. 18, responsive to the detection of magnetic material in the leading blank zone 562 and/or the trailing blank zone 564, the processor may be operative to classify the check as being a possible forgery for which the check may be returned to the user, confiscated, marked and/or flagged as being suspect.

As will be discussed in more detail below, other characteristics such as optical characteristics of the check may be evaluated through operation of one or more processors in addition to the magnetic image map when validating a check. Also, the example embodiments of the IDM may be configurable as to the degree of sensitivity for which checks are evaluated. For example one configurable setting associated with the IDM may cause the method of classifying checks to be less sensitive by evaluating only a limited number of features or characteristics of the check, while a more sensitive configurable setting may cause more features or characteristics of the check to be evaluated. Configurable sensitivity settings enable the owner or operator of the ATM which includes the IDM to configure the IDM to their preferred level of risk for accepting check deposits. For example a less sensitive setting of the processing and analysis of the data obtained through the IDM, may be more likely to accept authentic checks which do not comply with the ANSI standards or statistically normal checks, at the expense of increasing the risk that fraudulent checks will be accepted. Whereas, a relatively more sensitive setting of the processing and analysis of the IDM may have a lower risk of accepting fraudulent checks, at the expense of rejecting a relatively higher percentage of authentic checks.

For example, a relatively less sensitive setting of the IDM, may cause the processor which is in operative connection with the IDM to only validate whether any magnetic ink is present on the check, while a relatively higher sensitivity setting may validate whether the MICR line is magnetic. In addition a further relatively higher sensitivity setting associated with the IDM may cause the processor associated with the IDM to evaluate both the presence of magnetic ink and the absence of magnetic ink in one or more zones of the check when determining whether to reject a check. For example for a check to be determined as valid or acceptable to deposit, the processor of the IDM may validate that the magnetic material is present in the MICR zone, absent from the MICR clear band(s), and absent from the leading and/or trailing blank zones of the check.

In example embodiments of the IDM, the data acquired from the magnetic sensor may need to be processed in order to acquire information which accurately reflects the location of magnetic material on the check. For example, the physical transport of the check across the magnetic sensor may produce a significant amount of vibration in the check and/or magnetic sensor. The vibrations may be caused by a motor, a roller, and/or the impact of the check hitting and leaving the sensors in the IDM. Such vibrations may interfere with the ability of the sensor to accurately produce electrical signals that correspond to data representative of the magnetic properties across the surface of the check. In addition, different authentic checks may have magnetic ink printed thereon which have significantly different levels of magnetic flux as measured by the magnetic sensor of the IDM.

In example embodiments, these variations in the magnetic properties of the check and the variation in sensor sensitivity caused by the vibration of the check may decrease the accuracy of the analysis carried out in connection with the IDM unless the data acquired from the sensor is processed appropriately. The following example describes an example embodiment for a method of processing the data acquired by the magnetic sensor to enable the processor associated with the IDM to more accurately evaluate the magnetic image scans of a check.

Figure 19:
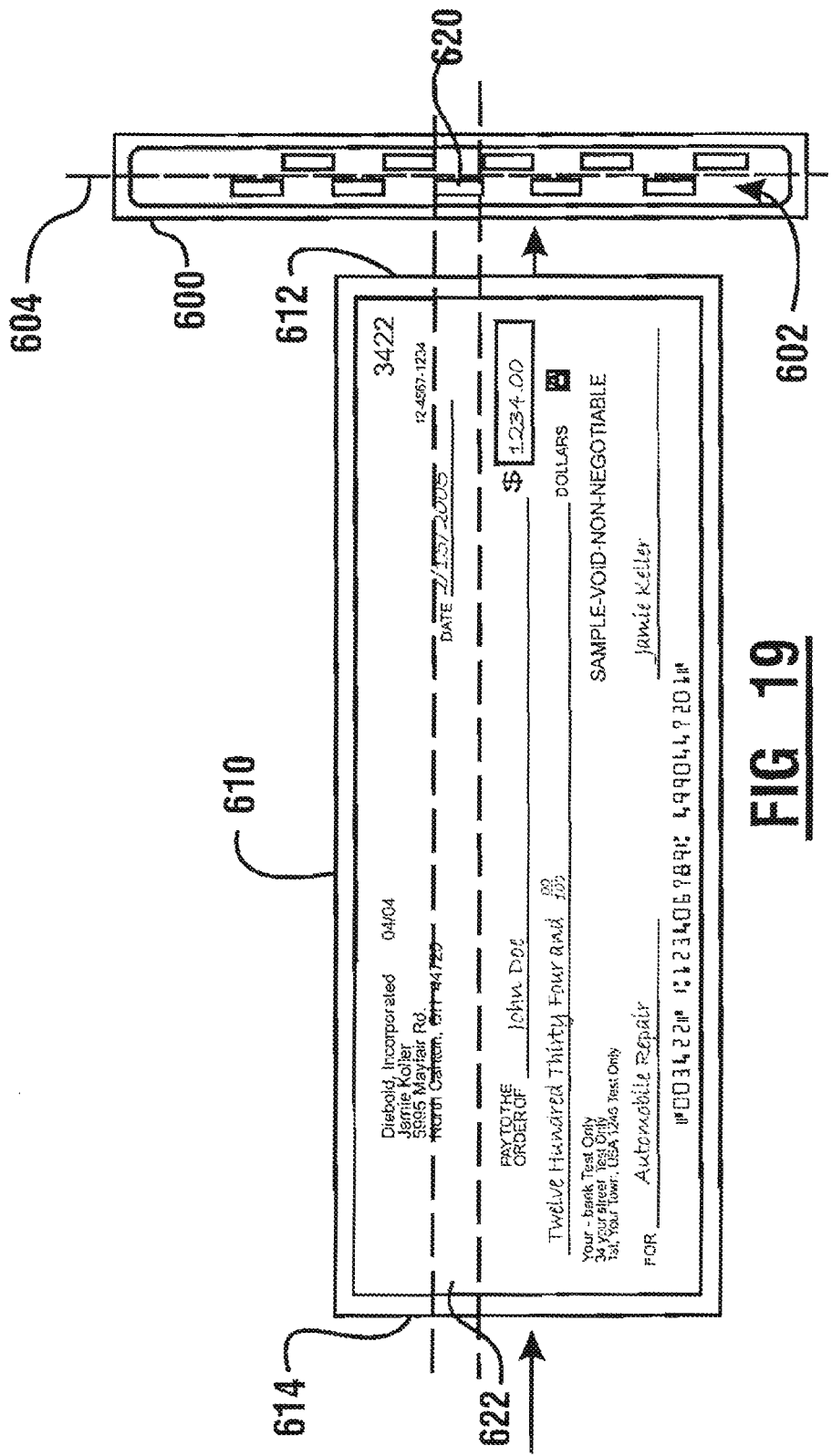
FIG. 19 shows an example embodiment of a magnetic sensor for the deposit accepting apparatus.

FIG. 19 shows schematically an example embodiment of a magnetic sensor 600. Here the sensor includes a plurality of sensor elements 602 arranged in two vertically offset columns. As the IDM transport moves a check 610 across the magnetic sensor 600, a circuit associated with the magnetic sensor is operative to measure electrical signals representative of the level of magnetic flux detected by each sensor element during the time period the check transverses the sensor. The circuit which in some embodiments may include one or more processors, is operative to perform analog/digital conversion of the signals to produce a plurality of data sets representative of sensed magnetic levels. For each sensor element (e.g., element 620), the data sets correspond to relative levels of magnetic flux for a horizontal band (e.g., band 622) that spans the width of the check from at least the leading edge 612 to the trailing edge 614 of the check.

In example embodiments, an example magnetic sensor may have a half-bridge structure with (strong) permanent magnet backing (bias). The magnetic sensor may be a differential sensor with an output (voltage) proportional to the magnetic difference under the two magneto-resistive sections from the half-bridge. In an example embodiment the sensor may have ten sensor elements (also referred to herein as channels) each being 10 mm wide and covering a total width of 100 mm. Thus along a centerline of the sensor 604 there may be no gap between consecutive sensing channels. As shown in FIG. 19, the odd and even channels alternate across the centerline. This zigzagged offset may require a software correction when piecing together a magnetic image scan and/or performing noise reduction algorithms on the sensor data. Of course this structure is exemplary and in other embodiments other structures and circuitry may be used.

In some example embodiments, the electrical signals generated by the sensors may be processed through circuitry which includes a processor and which includes an A/D conversion which produces a series of 14,000 signal samples for each sensor element as the check passes across the sensor. The resulting signal sample data may be expressed and considered for explanatory purposes as a 10 by 14,000 matrix of sensor signal data. This matrix may correspond to a two-dimensional area which is larger than the two-dimensional surface area of a check. For example, in an example embodiment the matrix may correspond to an area of about 10 cm by 28 cm (Height by Width). Because a standard sized check may have a much smaller size (e.g. 7 cm by 19 cm), one or more edges of the matrix may include data values captured when no portion of the check was adjacent the sensor.

Because of Op Amp offset (and drift), a baseline correction (or offset removal) calculation may be performed in an exemplary embodiment for each element in the matrix. In this described embodiment, each sensor element (or channel) may be associated with a different Op Amp and thus a different offset value ($\mu$). Thus for each row in the matrix, a different offset value associated with that row may be subtracted from and/or added to each of the 14000 data values in the row. In this described example embodiment an offset value for each of the ten rows may be determined by the associated circuitry calculating the average or mean of all of the data values in the row. In some example embodiments, the matrix after offset removal and/or other calculations may be comprised of non-negative values which range from 0 to 128.

In this described example embodiment, the matrix may be mathematically manipulated through operation of the circuitry in a manner that may be considered horizontally contracted to generate a relatively smaller matrix with 280 data elements (referred to herein as pixels) in each of the ten rows. For example each set of 50 consecutive data elements in a given row of the matrix may be averaged to produce a value for a pixel. After contraction, the original matrix is reduced from 10 by 1400 data elements to 10 by 280 pixels.

Given the physical dimensions of the exemplary sensor, the transport speed of the check and the sample rate of the circuit which acquires data values from the sensor elements, in this described example embodiment, a pixel may correspond to an area on the check with magnetic presence of 1 by 10 mm$^2$ (orientated 10 mm in vertical height and 1 mm in horizontal length with respect to the check shown in FIG. 15). For example, a check with a 72 mm vertical height and 152 mm horizontal width may be represented by 7 by 152 pixels. The maximum capacity of the described 10 by 280 pixel matrix may accommodate a check as large as 100 mm by 280 mm. However, in other configurations of the IDM, other sizes of the pixels and/or sensor may be used. In this described example embodiment, the contractions of the matrix through operation of the associated circuitry introduces low-pass filtering due to the averaging of the 50 data elements per pixel.

As discussed previously, the mechanical vibration caused by the transport of the check across the exemplary magnetic sensor may introduce considerable noise. However, this vibration generally effects the plurality of sensor elements of the magnetic sensor in the same manner. As a result the vibration waveform which introduces noise into the sensor element signals is substantially similar for each sensor element. Therefore as used herein such vibration induced noise present in each of the 10 rows of the above described magnetic image map matrix is refereed to as a common mode noise.

The true magnetic signals which comprise electrical signals corresponding to the magnetic ink on the check in an exemplary embodiment are in general riding on top of the common mode noise and have a significantly higher amplitude than the noise floor.

An example embodiment of the IDM includes circuitry that is operative to take advantage of these characteristics of the vibration induced noise in the magnetic signals to further process the corrected matrix described above to remove common mode noise. For example the above described contracted magnetic image map matrix may comprise data that can be represented as shown in Equation 1:

$$X = \begin{bmatrix} X_{1,1} & X_{1,2} & \ldots & X_{1,280} \\ X_{2,1} & X_{2,2} & \ldots & X_{2,280} \\ \vdots & \vdots & & \vdots \\ X_{10,1} & X_{10,2} & \ldots & X_{10,280} \end{bmatrix} \quad \text{EQ1}$$

The example embodiment may derive an estimate for a common mode noise floor (F) from the average of each column vector in the matrix (X). For example, the circuitry may operate to store that data in one or more data stores and a processor of the circuitry may calculate for each column of the matrix (X) a common mode noise floor value (F) according to Equation 2 as follows:

$$F_j = \frac{1}{10} \sum_{i=1}^{10} m_{i,j} \quad \text{EQ2}$$

Here the subscript (i) represents rows 1-10 of the matrix (M) and the subscript (j) represents the 1-280 columns of the matrix (X). According to Equation 2, the common mode noise floor value (F) for each column (j) corresponds to the average or mean of the ten pixels values (m) in the column.

Then through operation of the circuitry for each pixel (m) in the matrix, the value of the pixel minus the corresponding common mode noise floor value (F) for the column (j) in which the pixel resides may be compared to a common mode noise hysteresis threshold value ($T_h$) as shown in Equation 3:

$$X_{i,j} = \begin{cases} m_{i,j} \times G_L & \text{if } m_{i,j} - F_j < T_H \\ m_{i,j} \times G_H & \text{if } m_{i,j} - F_j \geq T_H \end{cases} \quad \text{EQ3}$$

Here, if the difference between each pixel value and the corresponding common mode noise floor value (F) for the corresponding column is less then the hysteresis threshold value ($T_H$) then the pixel value in the matrix (X) is set through operation of the circuitry to a new value corresponding to the pixel multiplied by a low gain parameter ($G_L$). However, if the difference is equal to or greater than the hysteresis threshold value ($T_H$) then the pixel value is set through operation of the circuitry to a new value corresponding to the pixel multiplied by a high gain parameter ($G_H$). In this described example embodiment the hysteresis threshold value, low gain parameter ($G_L$), and high gain parameter ($G_H$) are configurable parameters in the program instructions associated with the circuitry of the IDM. Example values for these parameters may include: $T_H$=4.0; $G_L$=0.0; and $G_H$=1.0.

In example embodiments after the magnetic image scan matrix has been processed through operation of the circuitry to minimize the effects of common mode noise, calculations involving passing the matrix through a zero-phase low pass filter may be performed. In this described example embodiment, the filter may be applied through operation of the circuitry to each of the ten rows of the matrix (X) to produce another matrix (Y) according to Equations 4-6 as follows:

$$Y = \begin{bmatrix} Y_{1,1} & Y_{1,2} & \ldots & Y_{1,280} \\ Y_{2,1} & Y_{2,2} & \ldots & Y_{2,280} \\ \vdots & \vdots & & \vdots \\ Y_{10,1} & Y_{10,2} & \ldots & Y_{10,280} \end{bmatrix} \quad \text{EQ4}$$

-continued $$Y_{i,j} = \frac{1}{2w+1} \sum_{k=j-w}^{j+w} X_{i,k} \text{ for } j > w \text{ or } 280 - j > w \qquad \text{EQ5}$$

$$Y_{i,j} = \frac{1}{2\delta+1} \sum_{k=j-\delta}^{j+\delta} X_{i,k} \text{ for } \delta = -j, \qquad \text{EQ6}$$

$$j \leq w \text{ or } \delta = 280 - j, 280 - j, 280 - j \leq w$$

Here the subscript (i) represents rows 1-10 of the matrix (Y) and the subscript (k) represents the 1-280 columns of the matrix (Y). These calculations represent a moving average with a window of length 2*w+1, where w is the half window width. The average is calculated through operation of the circuitry by adding the current pixel (at $X_{i,j}$) and a predetermined number (w) of pixels before and a predetermined number (w) of pixels after the current pixel. This sum is then divided by the sum of: 2w+1. However as shown in Equation 6, when the current pixel is equal to or less than the predetermined number of pixels (w) from the edges of the matrix, the window width shrinks in size according to 2δ+1. In the described example embodiment the half window width number may be a configurable number of pixels in the IDM (e.g., w=3). Of course this approach is exemplary.

Figure 20:
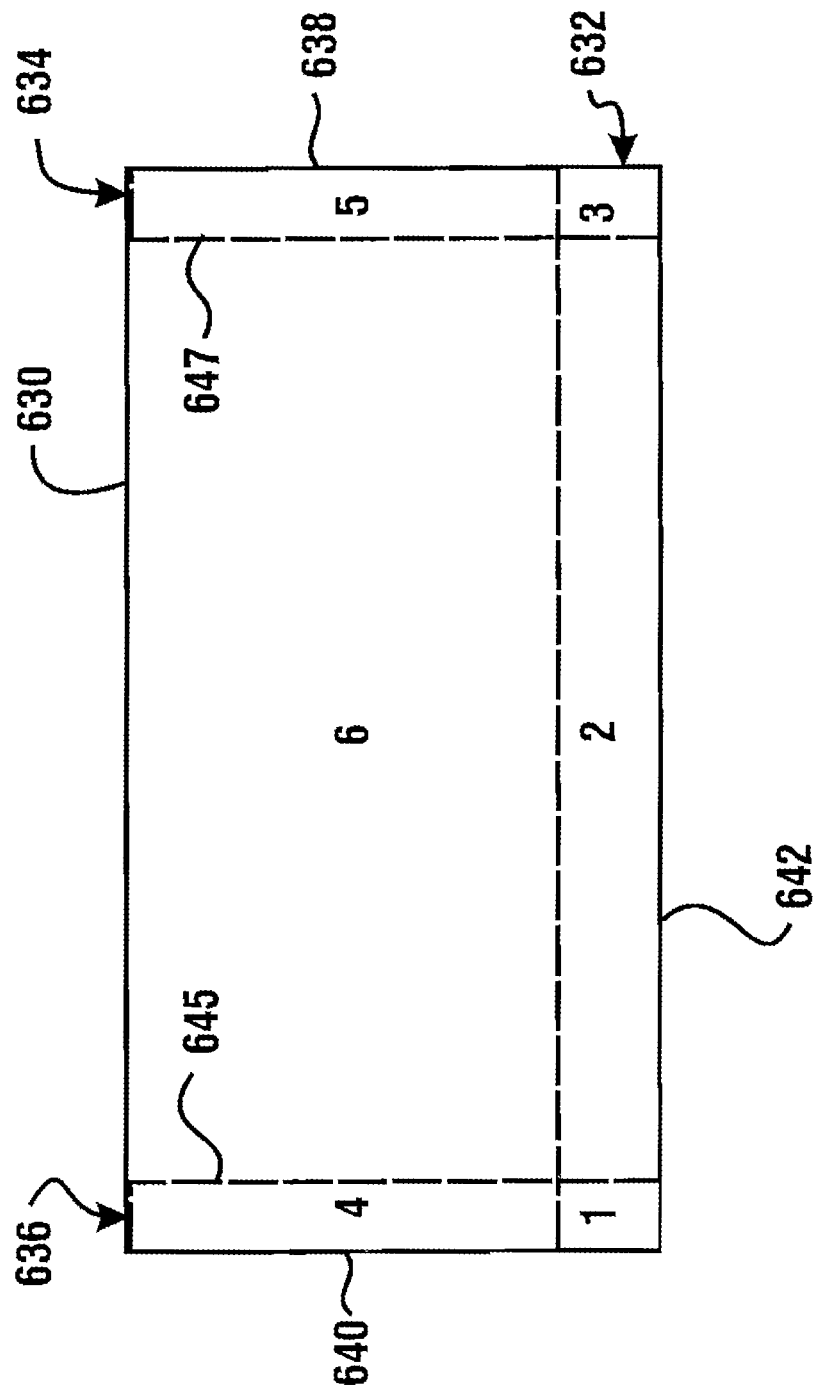
FIG. 20 shows an example method of dividing a check into six zones (zones 1-6).

FIG. 20 shows a further example method wherein circuitry operates in a manner that conceptually divides a check 630 into six zones (zones 1-6) for purposes of determining whether a check is valid or potentially fraudulent. Here at least zone 2 and in some embodiments, the combination of zones 1, 2 and 3 correspond to the MICR zone 632. In this described example embodiment the processor of the circuitry operates to identify the area of the check which falls within 16 mm or some other predefined distance from the bottom edge 642 of the check as the MICR zone. The other zones 4, 5, and 6 form the check body or non-MICR zone with its height being the check height less 16 mm or other predetermined length for the MICR section.

In addition in the exemplary approach the combination of zones 5 and 3 may correspond to a leading blank zone (634) and the combination of zones 4 and 1 correspond to a trailing blank zone (636). In this described example embodiment the processor of the circuitry identifies the area of the check which falls within 5 mm or some other predefined distance from the leading edge 638 of the check as the leading blank zone. Likewise, the processor may identify the area of the check which falls within 5 mm or some other predefined distance from the trailing edge 640 of the check as the trailing blank zone.

In this described example embodiment, for a valid check the processor of the circuitry may be operative to determine that the MICR symbols have a magnetic presence as detected in the magnetic image scan matrix which falls in zone 2 (e.g within 16 mm of the bottom edge). Also, the processor may be operative to determine that a check is potentially a fraudulent copy by determining that the magnetic image scan matrix shows the presence of a magnetic signal in the leading and/or trailing blank zones (e.g., within 5 mm of the leading and/or trailing edges).

In addition an example embodiment may have circuitry that operates using fuzzy logic rules for weighing the relevance of pixels in the leading and trailing blank zones. For example, pixels in columns of the matrix corresponding to portions of the check closest to the trailing and leading edges of the check may be assigned greater significance for purposes of analysis than pixels in columns of the matrix corresponding to portions of the check adjacent the interfaces (645, 647) between the leading and trailing blank zones and zone 6.

For example, in one example embodiment, the columns of the magnetic image scan matrix which correspond to the leading and trailing blank zones may be identified by the processor of the circuitry and the corresponding pixels in those columns may be multiplied by weighing factors depending on their respective distance from the corresponding leading or trailing edges of the check. In an example embodiment of the IDM with a check transport speed of about 0.5 mm/ms, the leading and trailing blank zones may include about five matrix columns each. In one example, the weighing factors may correspond to: 1, 1, 1, 0.5, 0.25. These five factors are multiplied by the pixels in the corresponding five columns for each of the leading and trailing zones in the order shown progressing from high to low values respectively for the corresponding columns which progress inwardly from the edge of the check to adjacent zone 6.

By having the processor of the circuitry associated with the IDM assign (through weighing factors) less significance to pixels in the leading and trailing blank zones adjacent zone 6, the accuracy of the IDM may be increased in cases where valid checks include stray magnetic ink near the leading and trailing blank zones. In alternative example embodiments, more than 5 pixels in each row adjacent the edges of the check may be used. For example in further example embodiments, eight pixels in from each edge of the check may be multiplied by weighing factors such as (1, 1, 1, 1, 0.5, 0.25, 0.125, 0.0625).

In the example embodiment, the processor of the circuitry is operative in accordance with its programming to compare pixels in the matrix to a magnetic presence threshold ($T_P$). If the pixel value is at or above the magnetic presence threshold ($T_P$), the pixel may be regarded as being "dirty" or as having a magnetic presence. If the pixel value is below the magnetic presence threshold ($T_P$), the pixel may be regarded as being "clean" or as not having a magnetic presence. An example magnetic presence threshold ($T_P$) used to determine whether pixels are dirty or clean may correspond to a value of $T_P=10$. Thus pixels with values 10 or greater may be considered dirty and pixels with values lower than 10 may be considered clean. In the example embodiment, the magnetic presence threshold ($T_P$) may be configurable in the programming of the circuitry associated with the IDM. When weighing factors are used, the weighing factors may be multiplied by the pixel values through operation of the circuitry before the pixel values are compared to the magnetic presence threshold ($T_P$).

In an example embodiment, when a zone has a total number of dirty pixels which is at or greater than a predetermined threshold for that zone, then the entire zone for that check may be considered as being dirty. For example with respect to the leading and trailing blank zones (referred together as the blank zone), if the blank zone has a total number of dirty pixels at or above a blank zone threshold ($T_{BD}$), then the blank zone is considered to be dirty. If the total number of dirty pixels is below the blank zone threshold ($T_{BD}$), then the blank zone is considered to be clean.

In an example embodiment, the blank zone threshold ($T_{BD}$) may be a configurable parameter in connection with the associated analysis circuitry. In addition, the blank zone threshold ($T_{BD}$) may also vary depending on the size of the check detected by the IDM. For example, for a relatively larger business check (vertical height greater than 68 mm for example) the processor may operate in accordance with its programming to use a blank zone threshold such as $T_{BD}=18$. However for a relatively smaller personal check (vertical height less than or equal to 68 mm for example) the processor may use a relatively smaller blank zone threshold such as $T_{BD}=15$.

In addition to the leading and trailing blank zones, the processor may also operate to classify the pixels in zone 6 or the background zone as having either dirty or clean pixels by comparing the pixels to the magnetic presence threshold ($T_P$) value. Here if zone 6 has a total number of dirty pixels at or above a zone 6 threshold ($T_{Z6D}$), then zone 6 is considered to be dirty. If the total number of dirty pixels is below the zone 6 threshold ($T_{Z6D}$), then zone 6 is considered to be clean. In an example embodiment, zone 6 threshold ($T_{Z6D}$) may be a configurable parameter with a default value such as $T_{Z6D}=25$.

In example embodiments, the classification by the circuitry of zone 6 as dirty does not necessarily indicate that the check is a copy. As discussed previously, a valid check may also include magnetic ink in zone 6 of a check. However, the presence of magnetic material in zone 6 may indicate that the current check has a relatively higher probability of being a copy, which among other factors evaluated by the processor may cumulatively result in the check being classified as a potentially fraudulent copy.

Figure 21:
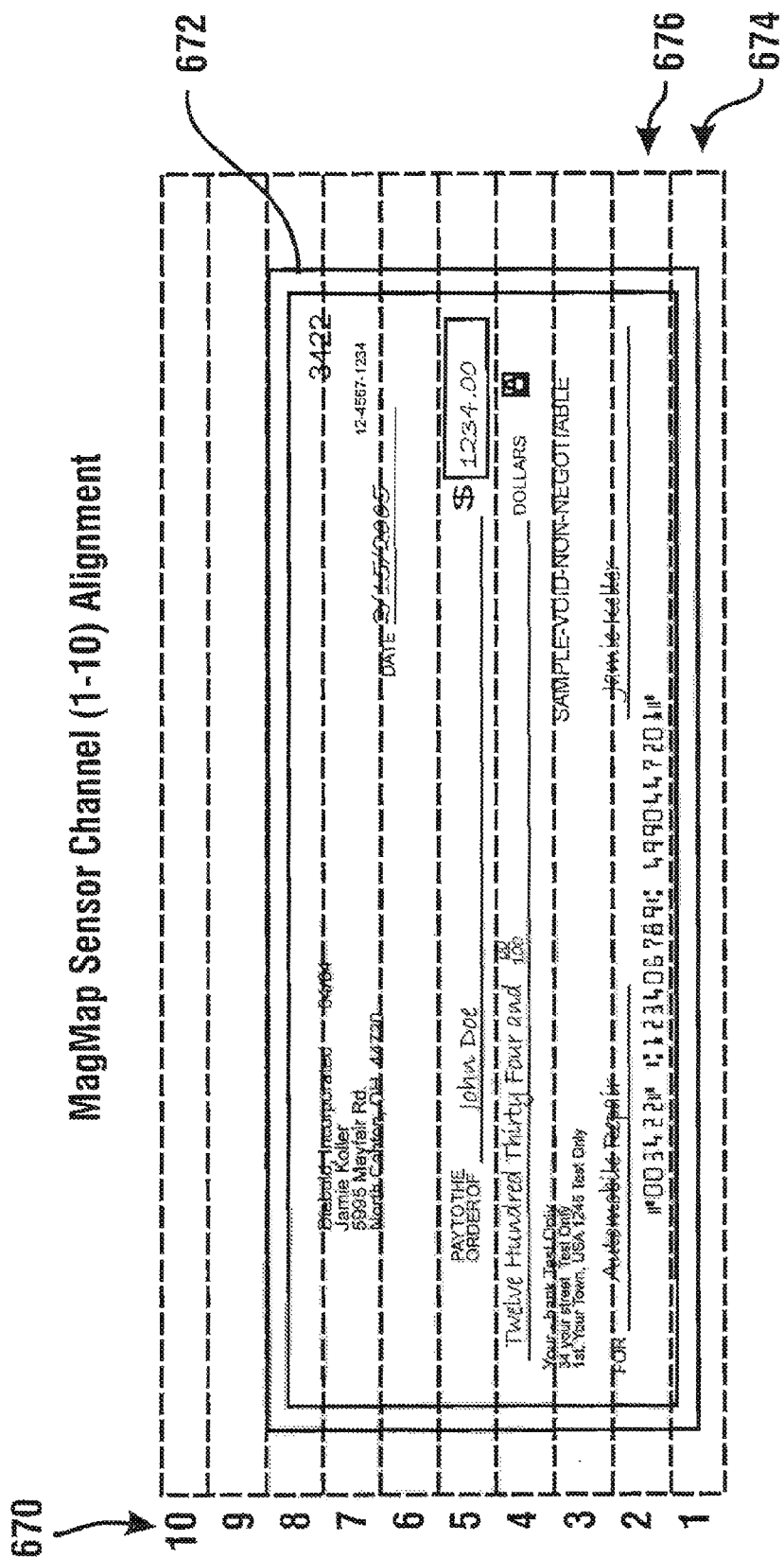
FIG. 21 shows an example of scanning paths for the ten different magnetic sensing elements or channels of the example magnetic sensor superimposed on a check

As discussed previously, the circuitry associated with the exemplary IDM is operative to determine if the MICR zone includes a magnetic presence. This determination may also be made by determining the number of pixels in the MICR zone which are at or above the magnetic presence threshold ($T_P$). FIG. 21 shows an example of scanning paths for the ten different magnetic sensing elements or channels 670 of the example magnetic sensor superimposed on a check 672. Each of the ten sensor channels correspond to the 10 rows of the above described magnetic image scan matrix. The pixels in the first two channels 674, 676 (or rows) adjacent the bottom edge of the check is used to determine if the MICR line includes a magnetic presence and whether or not the MICR zone is dirty or clean.

As shown in Equation 7, the processor is operative to calculate for each column of the matrix, the mean square sum (S) of pairs of pixels (P1) and (P2) in the column which are from the first and second channels (674, 676) respectively of the sensor (or rows of the matrix).

$$S=\sqrt{P_1^2+P_2^2} \qquad \text{EQ7}$$

Here S corresponds to the combined MICR pixel for the two rows or channels adjacent the MICR zone. If the pixel for a given row from the second channel ($P_2$) has a value of zero and the combined MICR pixel (S) for the row is greater than the presence threshold ($T_P$), then the combined pixel is considered to be a dirty pixel and is not used to determine if the MICR line is present. However, if the value of the pixel in the second channel ($P_2$) is not equal to zero and the combined MICR pixel (S) for the given row is greater than the presence threshold $T_P$, then the combined pixel (S) is considered to indicate that MICR is present.

If the total number of combined pixels in the MICR zone which indicate that MICR is present is equal to or greater than a MICR presence threshold ($T_{MP}$) than the MICR line may be classified as being present. Whereas if the total of the MICR present pixels is less than the MICR presence threshold ($T_{MP}$) than the MICR line may be considered absent. In an example embodiment, the MICR presence threshold ($T_{MP}$) may be a configurable parameter of the IDM with a default value such as $T_{MP}=40$.

A determination that the MICR line is present may weigh in favor of the check being valid. However, in addition to determining whether the MICR line is present, the processor may also determine whether the MICR zone is dirty. For example if the total number of dirty pixels in the MICR zone is greater than or equal to a MICR dirty threshold ($T_{MD}$), then the MICR zone is considered to be dirty. A dirty MICR zone is a strong indicator that the check is a copy. In an example embodiment, MICR dirty threshold ($T_{MD}$) may be a configurable parameter through the programming executed through operation of the circuitry with a default value such as $T_{MD}=5$. In this described example embodiment, a determination as to whether MICR pixels are clean or dirty may only be performed on MICR right checks. All MICR pixels may be considered to be clean for MICR left checks.

In an example embodiment, the processor of the circuitry may classify a check as good or a potential fraudulent copy responsive to a table or set of rules which define whether the MICR line is present or absent and defines for each zone whether the zone includes dirty or clean pixels. FIG. 22 shows an example of such a table 650.

In further example embodiments, the processor may be operative to evaluate the presence or absence of dirty or clean pixels in each of the zones, and other characteristics of the pixels in the magnetic image scan matrix to derive a confidence level for the check ranging from high to low. Here a high confidence level indicates a high probability that the check is valid and a low confidence level indicates a low probability that the check is valid. For example as shown in the table in FIG. 22 (at the row referenced with reference numeral 651), a check with: a MICR line present in the MICR zone, clean pixels in the leading and trailing zones, and a clean zone 6 may correspond to a high confidence level that the check is good. As a result the processor may classify the check as being good. However, if such a check has even one dirty pixel in the zone 6, the confidence level may drop to a medium level (as shown in the row referenced with reference numeral 652). Depending on the sensitivity setting of the IDM, such characteristics may still result in the check being classified as being good as long as the blank zone and MICR zone have clean pixels and the MICR line is present in the MICR zone.

However, in further example embodiments, the processor may be operative in accordance with its programming to evaluate other characteristics of the pixels in zone 6 or elsewhere to determine a confidence level for a check. For example, if the majority of zone 6 includes dirty pixels, whereas valid checks statistically have a reactively lower number of dirty pixels or lower intensity dirty pixels, then the processor may be operative to assign a low confidence level to the check even though magnetic ink is allowed in zone 6 of valid checks.

In example embodiments, the rules represented in the table 650 shown in FIG. 22 or alternative sets of rules for different and/or additional types of zones of the check may be implemented in the programming associated with the processor to calculate the confidence level. The programming associated with the IDM circuitry may then include a configurable sensitivity setting which is compared to a determined confidence level for a check to determine whether the check is good or is a copy. Also, in further example embodiments, information obtained regarding the magnetic image map may be combined with magnetic symbol recognition of the MICR line symbols, optical features of the check, optical symbol recognition (OCR) information obtained from the check, and/or other information obtained from the check for use with determining a confidence level for the check.

In example embodiments, responsive to operation of at least one processor, the ATM may transfer image data corresponding to optical scans (front and back) of the check to a server remote from the ATM. The IDM initially may generate grayscale images of the front and back of the check. However, the server which receives electronic images of the check, may prefer the images to be saved in a black and white format which may have a smaller file size. As a result, the processor of the circuitry in the ATM may be operative to convert each grayscale image to a black and white equivalent based on a threshold that is set as the dividing line for assessing grayscale values as either black or white. In an example embodiment, the above described tests of the optical image scan may be performed on the grayscale image, the black and white image, or both types of images.

In one example embodiment, the processor may be operative to generate a plurality of different black and white images from each scanned grayscale image. Each black and white image may be generated responsive to a different threshold value for determining whether to convert a grayscale pixel to either a white or black pixel. Each of these different black and white images may be evaluated based on one or more of the previously described tests. The thresholds may be determined based on stored values in a database, or based on a range of sensed grayscale values in the image, for example. The processor may then operate to select the black and white image which has the highest relative confidence level to transfer to a server associated with the ATM. A high confidence level in exemplary embodiments may be based on, for example, a percentage range of pixels that is generally light or dark within a usable check image. The image that best falls within the center of this range may be one selected through operation of the processor. Of course this approach is exemplary.

In example embodiments, the at least one processor may be operative in accordance with its programming to detect the location of the magnetic MICR line (whether on top or bottom of a document and/or whether adjacent an upper or lower edge of the document). Responsive to this determined location of the MICR line, the at least one processor is operative to set the likely orientation of the check for purposes of evaluating optical characteristics of the check as described previously. However, in documents without known or consistent magnetic features such as a MICR line, the orientation of the document may not be determinable based on a magnetic scan. In such cases, the at least one processor may operate to determine the orientation of the document by evaluating a specific field (e.g., account number field) on the document with symbols of a particular font type. The processor may use data corresponding to a template stored in a data store to define a window on the image where the given field is expected to be located. The template may also have associated data that defines the font type expected to be present in the window, a minimum/maximum number and/or specific types of symbols (e.g., ":" or "<" symbols) expected to be present in the window, and/or other characteristics or tests used to determine a confidence level for the field being evaluated.

In this described embodiment, both a top and a bottom faces of the document are optically scanned. The pixels in a field of one of the scanned images (e.g., the top scan) of the document may be evaluated through operation of a processor which operates in accordance with its programming to first assume the document was in a first orientation when scanned. Such an assumed orientation may correspond to the side of the document containing the field to be evaluated being orientated face up and rotated in a particular manner. In some example embodiments the first orientation corresponds with the face up, right side up orientation shown in FIG. 40. Of course this approach is exemplary. For the assumed first orientation, if the confidence level resolved by the processor for the field is above a predetermined threshold and/or one or more other tests are consistent with the field having symbols specified by the template, then the processor is operative to process the images as described previously based on the document being determined to be in the first orientation.

However, if a determined confidence level for the field is below a predetermined threshold and/or one or more other tests are inconsistent with the field having symbols specified by the template, the processor may be operative to reevaluate the data corresponding to the field in the previously evaluated scanned image (e.g., top scan) and process the image data based on the document being in a second orientation, such as being rotated 180° with respect to the first orientation. In some example embodiments the processor may operate in accordance with its programming such that the second orientation may correspond to the face up, upside down orientation shown in FIG. 41. For the second orientation if a determined confidence level as determined responsive to operation of the process or for the field is still below a predetermined threshold and/or one or more other tests are inconsistent with the field having symbols specified by the data included with the template, the processor may be operative to reevaluate the data comprising the image to evaluate data corresponding to the field in the other one of the scanned images (e.g., bottom scan). The processor may evaluate the image data based on the document being in a third orientation such as when the document is oriented face down. In some example embodiments the third orientation may correspond to the face upside down, right side up orientation shown in FIG. 42. For the third orientation if a determined confidence level as determined by the processor for the field is still below a predetermined threshold and/or one or more other tests are inconsistent with the data that corresponds to the field in the current assumed orientation having symbols specified by the template, the processor may be operative to reevaluate the data based on the field in the previously evaluated scan image (e.g., bottom scan) assuming the document was in a fourth orientation such as when the document is face down and rotated 180° with respect to the third orientation. In some example embodiments the fourth orientation may correspond to the face upside down, right side up orientation of FIG. 43. For each of these different orientations, if the confidence level as determined by the processor that the desired field has been located is below a predetermined threshold and/or one or more other tests are inconsistent with the field having symbols specified by the template, the document may be rejected and returned to the customer. Of course this approach is exemplary and in other embodiments other approaches may be used, such as to repeat the steps or to attempt to apply data corresponding to another template to the image data.

In this described embodiment, the processor is operative in accordance with its programming to store data of received documents in an associated data store and determine through analysis of stored data when a predetermined number of documents being scanned are consistently or/are predominantly in the second or other orientation rather then the first orientation. In response to this detection, the processor may be operative in accordance with its programming to begin testing data corresponding to subsequent images assuming the documents being scanned are initially in the second or other orientation rather than the first orientation. Of course this approach is merely exemplary.

Figure 23:
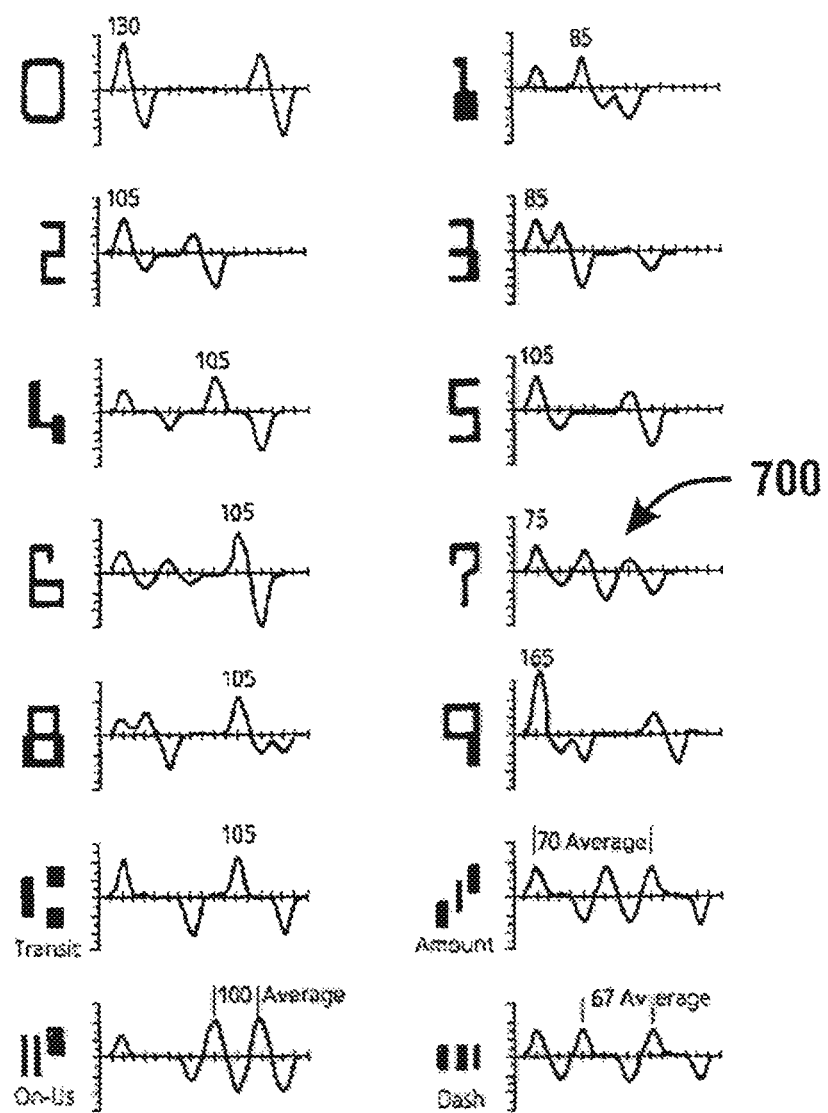
FIG. 23 shows an example of the U.S. standard MICR E-13B font symbols and their corresponding electrical signal magnetic waveforms.

In example embodiments, the magnetic sensor may be used to read the numeric symbols and/or other symbols which are present in the MICR line. In some embodiments the magnetic sensor may correspond to a magnetic read head which generates electrical signals responsive to magnetic indicia moving adjacent thereto. Of course this type of sensor is exemplary of sensors that may be used. In one example embodiment, as each symbol of the check moves horizontally across the sensor, an electric signals are output which comprise a waveform. The waveform varies responsive to the variation in density of magnetic ink from the leading edge of each MICR symbol to the trailing edge of the symbol. FIG. 23 shows an example of different numeric symbols (0 through 9) and non-numeric symbols (Transit, Amount, On-Us, and Dash) for the U.S. standard MICR E-13B font and visual representations of their corresponding magnetic waveforms as generated by an example embodiment of the magnetic sensor.

In some example embodiments a document with MICR symbols may have magnetic sensor outputs digitally sampled through operation of a magnetic reading device and appropriate circuitry. The circuitry may include for example, analog to digital converters and one or more processors with associated stored program instructions. In an exemplary embodiment the document may be within an ATM and be moved in a transport of a check acceptor with a transport speed of about 500 mm/sec. At that transport speed the sampling interval of an exemplary embodiment may be about 63.5 μs. In some example embodiments with about a 0.125 (±0.01) inch symbol spacing (as defined in ANSI X9.27), there may be about 100 (±8) samples taken for each E13B symbol. Sampled signal data taken from the original magnetic waveform may be defined as the raw signal $\{u\}=\{u_0, u_1, u_2, \ldots u_{n-1}\}$. In some example embodiments each sample may be an eight bit unsigned integer. In some example embodiments the data byte series with a fixed sampling interval of 63.5 μs may have a data series that may have a length denoted as N. In some example embodiments the raw signals may be the magnetic sensor outputs may be pre-amplified or filtered before being converted through an analog to digital converter and other appropriate circuitry to into the raw digital samples $\{\mu\}$.

In some example embodiments the average μ of the raw signal may be calculated through operation of at least one processor as in Equation 8.

$$\mu = \frac{1}{N}\sum_{i=0}^{N-1} u_i \quad \text{EQ8}$$

In some example embodiments the standard deviation σ may be calculated through operation of at least one processor as in Equation 9.

$$\sigma = \sqrt{\frac{\sum_{i=0}^{N-1}(u_i - u)^2}{N-1}} = \sqrt{\frac{\sum_{i=0}^{N-1} u_i^2 - N\cdot\mu^2}{N-1}} \quad \text{EQ9}$$

In some example embodiments the processor may operate in accordance with its programming such that the raw data series $\{\mu\}$ is baseline corrected. In a graphical representation of the steps executed by the processor the baseline correction may be considered as helping to more accurately center possible positive and negative peaks of the sampled magnetic waveform on the Y axis. In some example embodiments the baseline correction may be based on the average μ as calculated in Equation 8. In some embodiments the average may be recalculated for each sample being baseline corrected. In yet other example embodiments a fixed number of raw samples may be baseline corrected and then a new average μ may be calculated to be used for subsequent base line corrections. Of course these approaches are exemplary.

Figures 37, 38:
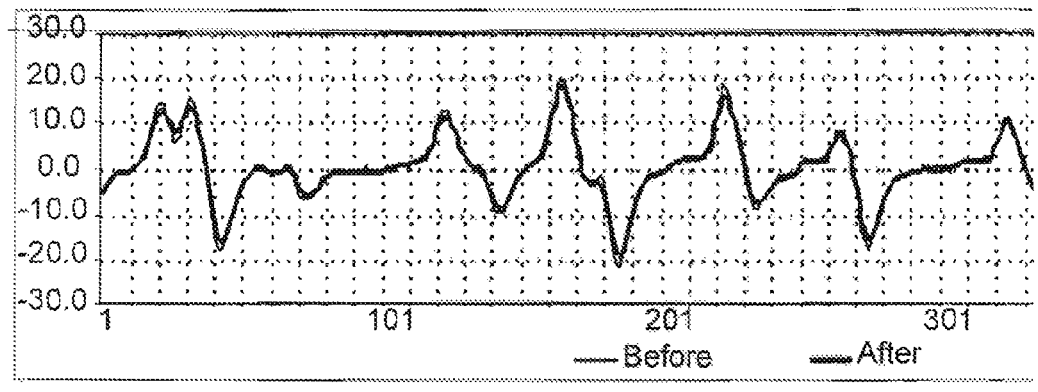
FIG. 37 shows a graphical representation of an example magnetic waveform after offset correction and high frequency noise filtering.
FIG. 38 shows steps in an example standard cross correlation matrix for the E-13b MICR font.

After baseline correction, the at least one processor operates to use the raw data series $\{u\}$ to resolve the corrected data series $\{x\}=\{x_0, x_1, x_2, \ldots, x_{N-1}\}$ where $x_i=u_i-\mu$. High frequency noise may be present and impact the sample magnetic waveform due to motor noise from motors operating within the ATM. In some example embodiments the corrected data series $\{x\}$ may be input to circuitry which includes a filter function operative to boost the signal to noise ratio by attenuating high frequency noise. The output of the circuitry including the filter function may be defined as the series $\{y\}$. In some example embodiments circuitry including a low pass filter may be used to filter out only the high frequencies. In some example embodiments an infinite impulse response (IIF) filter may be used to filter the series $\{x\}$. In some example embodiments circuitry including a Bessel filter may be used. In yet other example embodiments a $10^{th}$ order Bessel filter may be used to filter the corrected data series $\{x\}$. In some example embodiments the filter corner frequency may be set to about 8% of the sampling frequency. In some example embodiments the Bessel filter may have a corner (cutoff) frequency set at 1259.84 Hz, which is 8% of the sample frequency of 63.5 μs. FIG. 37 shows a graph representing the filter output $\{y\}$ for an example magnetic waveform. Some of the high frequency peaks may have some attenuation do to the filtering through the circuitry in operative connection with the magnetic read head.

In some example embodiments the Bessel filter may comprise a recursive filter. A Bessel filter with a gain G=17114.10772 may be expressed as in Equation 10.

$y[n]=((1*x[n-10])$ $+(10*x[n-9])$ $+(45*x[n-8])$ $+(120*x[n-7])$ $+(210*x[n-6])$ $+(252*x[n-5])$ $+(210*x[n-4])$ $+(120*x[n-3])$ $+(45*x[n-2])$ $+(10*x[n-1])$ $+(1*x[n-0])$ $+(-0.0005222117*y[n-10])$ $+(0.0090729955*y[n-9])$ $+(-0.0730293973*y[n-8])$ $+(0.3598632735*y[n-7])$ $+(-1.2073089239*y[n-6])$ $+(2.8966760837*y[n-5])$ $+(-5.0677050314*y[n-4])$

+(6.4412468866*y[n−3])

+(−5.7663157314*y[n−2])

+(3.3481883790*y[n−1]))/G;  EQ 10

In some example embodiments the circuitry may operate such that after the raw magnetic waveform has been baseline corrected and filtered, a zone of the filtered data stream {y} may be selected through operation of at least one processor. The zone may be defined as a sub series of consecutive data samples from the data stream {y}. In some example embodiments the zone may be a special zone centered around a determined peak value of the sampled signal data. In some examples the zone may contain five sample values on each side of the peak. In some example embodiments a zone centered at a peak may be represented by the value hw where hw is the zone half width value. In some embodiments hw=5 so that the zone length is 2*hw+1=11. In some example embodiments a zone with hw has 11 data stream {y} values. The weight, cut, cut series and anchor depth for a zone may be calculated through operation of at least one processor using the data stream {y} values as will be discussed later. The at least one processor operates in an exemplary embodiment to generate a data value corresponding to the zone associated with each peak.

The exemplary filters that have been discussed comprise digital filters, but in other embodiments other types of filtering may be used. The filter or filters may be analog filters, passive or active, pipelined, switch capacitor, or any other suitable filter. In some embodiments the filtering of the raw magnetic signal may use a combination of different filters.

In one example embodiment, to magnetically recognize the particular MICR symbols, each detected magnetic waveform for each of the MICR symbols may be evaluated through operation of at least one processor to identify peaks in the corresponding sensed magnetic waveform generated responsive to signals from one or more magnetic sensors. Characteristics of each of the peak positions (as described below) may be determined to cause at least one processor to resolve a feature vector ($\vec{v}$). Different peak values of the same magnetic waveform may correspond to different elements of a feature vector. Each detected MICR symbol may in a graphic representation have a set of peaks which determine the feature vector elements, and therefore a different feature vector. The peaks may be positive peaks or negative peaks, therefore the feature vector element values may be positive or negative. In an exemplary embodiment each of the feature vectors may be comprised of eight peak values. Each peak value may correspond to a peak amplitude value which corresponds a feature vector element value. The processor may operate to compare each sampled feature vector for the sensed MICR symbol to a standard feature vector for each of the fourteen standard MICR E-13b symbols. The processor operates such that the standard E-13B symbol which has the highest correlation to the detected waveform may be identified as the recognized symbol for the detected magnetic waveform. FIG. 24 shows an example of a table of the MICR E-13b symbols (column labels) and their corresponding determined peak features which comprise their respective feature vector. Here the values associated with the peaks for each symbol are shown in order of their detection in time from the top of the table to the bottom in each column of the table. In some example embodiments the peaks may correspond to eight fixed locations equally spaced transversely across each symbol. In some example embodiments the locations may be equally spaced apart in a time domain based on a constant speed of the document including the symbol moving past the magnetic sensor. Of course this approach is exemplary and in other embodiments other approaches may be used. This includes correlation with document position through sensing position of the document relative to the magnetic sensor, for example.

Figures 30, 31:
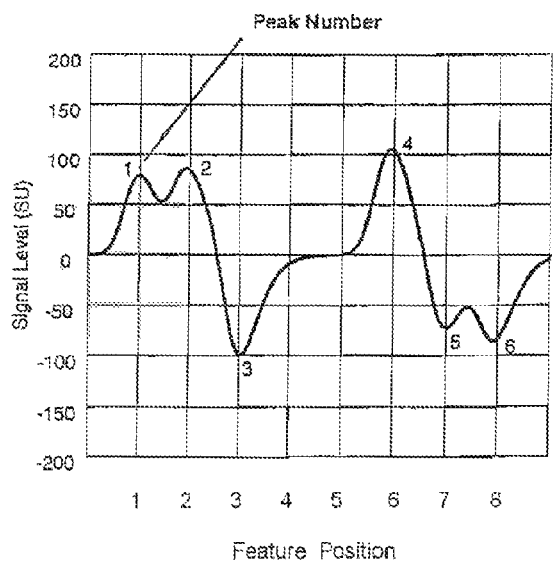
FIG. 30 shows an example magnetic MICR waveform with eight sample locations.
FIG. 31 shows an example standard feature vector matrix for the CMC-7 MICR font.

FIG. 30 shows an example graphic representation magnetic waveform that may correspond to the MICR E-13B symbol representing the number "8." The example waveform shown in FIG. 30 graphically shows the eight feature vector locations equally spaced apart. FIG. 30 graphically shows positive peaks at feature position 2, 3, and 6 and negative peaks are shown at vector feature positions 3, 7 and 8. There are no peaks at vector positions 4 and 5 where the magnetic waveform is essentially zero. The feature vector element values in FIG. 30 as represented in this graphic coordinate system correspond to the value $\vec{v}_8=(79,86,-99,0,0,105,-73,-86)^T$ which corresponds to the symbol for the number "8." It should be understood that these values are exemplary based on the coordinate system applied, and in other embodiments other values may be used to represent the relative magnitudes of the resolved data values.

In another example embodiment, to magnetically recognize the MICR symbols, each detected magnetic waveform for the MICR symbols are evaluated through operation of at least one processor of the circuitry associated with the IDM to conduct calculations that essentially identify peaks in the magnetic waveform. The relative distances between the immediately adjacent peaks is then determined. Characteristics of the distances between each adjacent peak (as described below) may be determined to form a feature vector ($\vec{v}$) where each feature vector element corresponds to a physical distance on the check between adjacent signal peaks. Each detected symbol will have a different set of distances between adjacent peaks and thus a different feature vector. The distances between each peak may be characterized as either a long "L" or a short "S" distance. The relative distances between adjacent positive peaks may correlate to the distance between negative peaks. Each of the feature vectors in an exemplary embodiment may be comprised of six elements and thus six peak distance values. When the feature vector is comprised of six peak distance values, the MICR waveform may be comprised of seven peaks.

In some embodiments the predetermined feature vector for the detected symbol may be analyzed through operation of the circuitry for correlation with the feature vector for each of the fifteen standard MICR CMC-7 symbols. The standard MICR CMC-7 symbol which has the highest correlation and generally corresponds to the sample feature vector for the detected waveform as determined through operation of a processor in the circuitry is identified as the recognized symbol for the detected magnetic waveform. FIG. 31 shows an example of a table of the MICR CMC-7 symbols (column labels) and their corresponding distances between peaks (element values) which comprise their respective predetermined symbol feature vector. In this example table the short distance between peaks is represented by the distance value of "10" and the long distance between peaks is represented by the distance value "15." Of course these values are exemplary and in other embodiments other values that correspond to distances may be used. Here the values associated with the peak distances for each symbol are shown in order of their position with respective adjacent peak distance values from the top of the table to the bottom in each column of the table. In some example embodiments seven valid peaks may be detected for a valid CMC-7 MICR symbol. In some example embodiments the seven valid peaks would correspond with six valid distances between peaks corresponding to feature vector elements. Notice that each feature vector for a MICR CMC-7 symbol in FIG. 31 always has exactly four short distances and two long distances between adjacent peaks and this may be useful when detecting missing or extra peaks which is discussed later.

Notice in the example vector table of FIG. 31 for the CMC-7 magnetic symbols, that if any of the feature vectors element values are reversed (the vector element values flipped) that the reversed feature vector will correspond to another different valid feature vector. For example, take the vector for "1" which is $\vec{v}=(15\ 10\ 10\ 10\ 15\ 10)$. If this vector is reversed the vector becomes $\vec{v}=(10\ 15\ 10\ 10\ 10\ 15)$ which corresponds to "T." Because every vector has a corresponding vector when read in reverse, the detection of whether a check is upside down and being read in reverse requires additional analysis, as will be discussed later.

Figure 33:
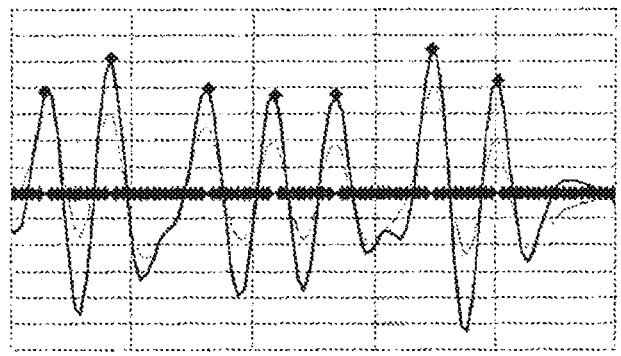
FIG. 33 shows an example magnetic MICR waveform with 7 positive peaks.

FIG. 33 shows an example of a graphical representation of a magnetic waveform that corresponds to output signals of an exemplary sensor sensing the MICR CMC-7 symbol representing the number "8." Example FIG. 33 graphically shows the seven detected positive peak values. The example magnetic waveform in FIG. 33 shows a long distance between positive peaks 2-3 and 5-6. The example in FIG. 33 shows short distances between positive peaks 1-2, 3-4, 4-5 and 6-7. Notice that in this embodiment the negative peaks are not needed and only the positive peaks are used to measure distances between peaks to derive the feature vector. Additionally the negative peaks may correspond to the same feature vector. Alternatively, in some embodiments only the negative peaks may be used to determine the distance between peaks to determine the elements of a corresponding feature vector. Because in this embodiment the negative and positive peaks may each be used to determine the same feature vector, this redundancy may be used by the circuitry to determine which peak is invalid when more than 7 peaks are detected or may be used by the circuitry to find missing peaks as discussed later. The feature vector element values in FIG. 33 correspond to the value for the number "8" $\vec{v}_8=(S=10\ L=15\ S=10\ S=10\ L=15\ S=10)^T$.

Figure 34:
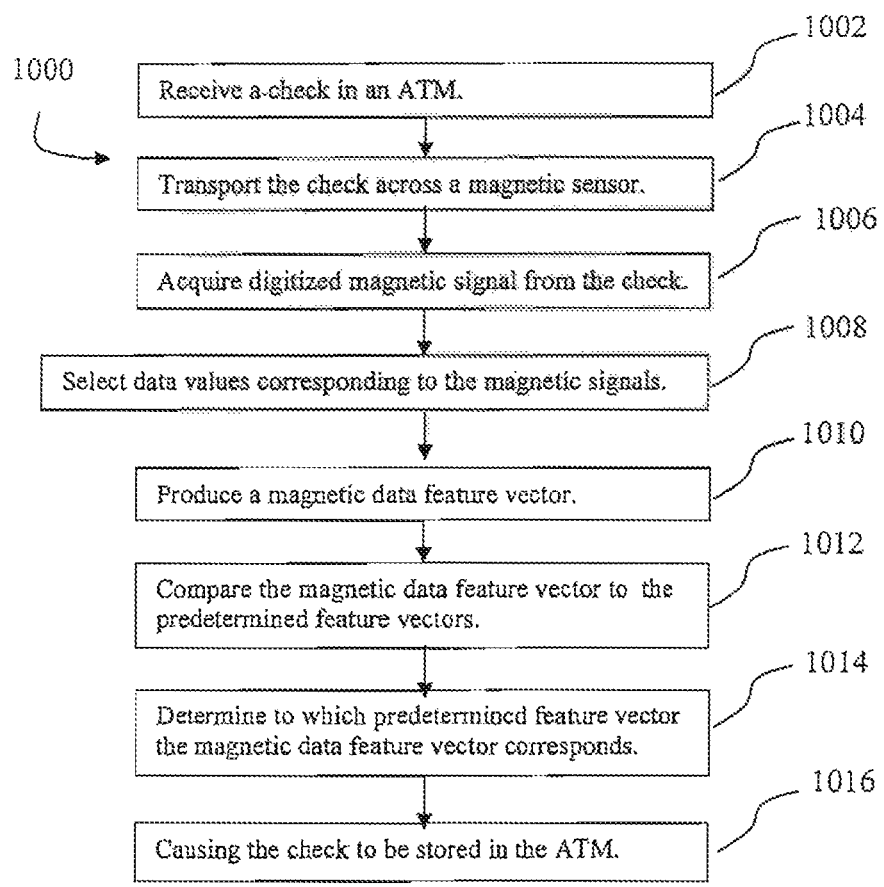
FIG. 34 shows steps of an example method to determine what MICR symbol is represented in a magnetic waveform using feature vectors.

FIG. 34 shows schematically steps in an example method 1000 for detecting MICR symbols using feature vectors. The method is carried out by an ATM responsive to computer executable instructions carried out by at least one processor in the ATM. The computer executable instructions may reside on suitable media such as a hard drive, flash memory, CD, DVD, or other form of volatile or non-volatile computer memory. The method begins at step 1002 where a check may be received at an ATM. In some example embodiments, documents that contain MICR symbols other than a check may be received. The check may be received by a suitable check acceptor. Next at step 1004 the check is transported into the ATM by one or more suitable transport devices. While the check is being transported it may be moved adjacent to one or more sensors capable of detecting magnetic ink. At step 1006 magnetic signals are acquired from the check. In some embodiments the signals generated by the magnetic sensor may comprise an analog electrical signal. This signal may be converted through appropriate circuitry such as circuitry including an analog to digital converter through a corresponding digital signal. The magnetic signals may be digital signals derived from samples of the signals detected with the one or more magnetic sensors in step 1006 or may be digital signals directly sampled by the sensors in step 1006. In some example embodiments the sampled digital signal data may correspond to values for a MICR symbol that has been sampled about 100 times while the sensor is sensing the particular symbol. Of course this approach is exemplary.

In some example embodiments the sampled digital signal data may be analyzed and used to generate a plurality of data values, each of which correspond to a magnetic peak waveform peak. The peak value may correspond to an area of the waveform that has been sampled through operation of the circuitry of the machine about 11 times. Such sampled signal data values are stored in memory as appropriate for analysis. Next, at step 1008 data values are generated from the signals acquired in step 1006. The generated data values correspond to the sensed MICR symbol. The data values may be a subset of the digital signals. In some example embodiments the data values may correspond to magnetic signal waveform peaks and may correspond to the amplitude of those peaks. The generated data values may alternatively be based on a function of the sampled signal data in the area of each peak. The generated peak data values are also stored as appropriate. At step 1010 the at least one processor operates to calculate a sample magnetic data feature vector is produced corresponding to the data values generated in step 1008.

In some embodiments the elements of the sample magnetic data feature vector may correspond to magnetic waveform peak values which correspond to the maximum amplitudes. In some example embodiments the sample magnetic feature vector element values may be positive or negative corresponding to positive or negative peaks. In other example embodiments the magnetic data feature vector elements and the predetermined feature vector elements may correspond to fixed locations where a MICR symbol may have been sampled. These may or may not necessarily correspond to peaks. In some example embodiments the fixed locations across each MICR symbol may be eight fixed locations as shown in FIG. 30. In some example embodiments the eight locations are about equally spaced apart in the time domain based on constant relative speed between the document bearing the MICR symbol and the magnetic sensor. In some example embodiments the feature vector may correspond to a symbol in the E-13B font.

In some example embodiments the magnetic data feature vector element values may correspond to the distance between adjacent peaks. In yet other example embodiments the magnetic data feature vector element values may correspond to the distance between adjacent peak for fixed number of peaks. In some example embodiments the fixed number of peaks may be seven with six distance elements in the magnetic data feature vector. In some example embodiments the feature vector may correspond to a symbol in the CMC-7 font. In some example embodiments the distance between peaks may correspond to the distance between positive peaks or the distances between the negative peaks.

The exemplary method continues in step 1012 where the resolved magnetic sample data feature vector is compared through operation of at least one processor to data in at least one data store corresponding to each of a plurality of predetermined symbol feature vectors each one of which corresponds to one MICR symbol. A suitable comparison may be performed responsive to operation of a processor that may be operative to determine which one of the predetermined sample feature vectors, the sensed magnetic data sample feature vector corresponds. In some example embodiments the vectors may be compared using a Pearson correlation. At step 1014 a determination is made as to which predetermined symbol feature vector the magnetic data sample feature vector generally corresponds. In some embodiments in step 1012 the magnetic data feature vector may be compared to each of a predetermined set of standard MICR symbol feature vectors using a Pearson correlation. In some embodiments the determination in step 1014 may be responsive to a Pearson determination. The at least one processor may also operate in accordance with its programming to identify the beginning and end of each of the MICR symbols based on resolved signal gaps and/or signal fluctuations that are identifiable as associated with areas between the symbols. The processor operates responsive to determining that the sample feature vector generally corresponds to one predetermined symbol feature vector, to generate symbol data. The symbol data corresponds to the symbol represented by the predetermined symbol feature vector and the symbol sensed on the check. The processor then operates to store the symbol data for use on the check. The processor then operates to store the symbol data for use in accordance with the programming associated with at least one processor of the machine. For example, such use may include incorporating signal data in a message sent by the machine to a remote computer for purposes of carrying out a transaction.

In response to determining one MICR symbol with a sufficient degree of correlation, the exemplary at least one processor then operates in accordance with its programming to analyze additional sensed data corresponding to other symbols. The process steps 1008, 1010, 1012 and 1014 are repeated to determine all of the MICR symbols read from the check.

The at least one processor then operates in accordance with its programming to determine if all of the MICR symbols on the check could be successfully determined. If all of the MICR data could be read and resolved, the at least one processor may operate in accordance with its programming to determine if the check can be accepted by the machine. This may include for example, the machine operating to forward at least a portion of the MICR data with other data such as the check amount, card data and PIN data input by the ATM user, and other data from the ATM to a remote computer. The remote computer may operate in accordance with its programming and data stored in connection with the remote computer to determine if the check should be accepted. The remote computer may then operate to send at least one message to the ATM. The message includes data corresponding to whether or not the check should be accepted. If so, the at least one processor in the ATM may operate to cause the check to be stored in the ATM. This is indicated by a step 1016. If all the MICR symbols on the check could not be resolved, or the remote computer determines that the ATM should not accept the check, the at least one processor may operate to cause the ATM to return the check to the customer. Of course these approaches are exemplary and in other embodiments other approaches may be used.

Figure 25:
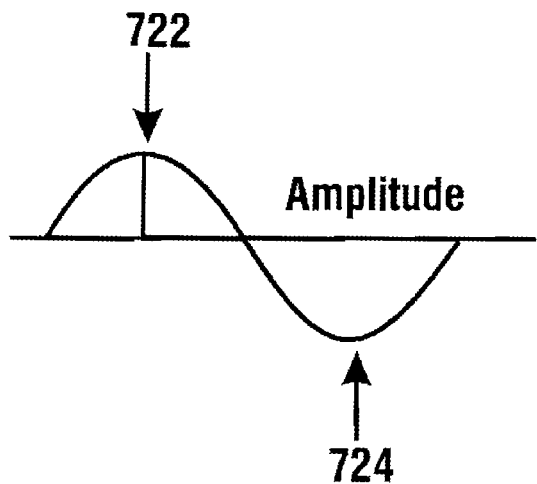
FIG. 25 shows a portion of a graphical representation of an example detected waveform for a detected MICR symbol with two peaks.

In an example embodiment, the peak detection may begin through operation of the at least one processor identifying data corresponding to the amplitude and its associated time along the magnetic waveform for all potential minimum and maximum peaks in the waveform for a detected symbol. FIG. 25 shows a portion of an example detected magnetic waveform for a detected MICR symbol including two peaks (722, 724).

Detected magnetic waveforms may include thin spikes which may be recognized as peaks but are actually the result of transient noise (spikes). The presence of such peaks may distort the feature vector for a given symbol making it difficult to accurately recognize the symbol. However, true peaks may have a substantial area under the curve of the peak compared to transient noise spikes. Thus the example embodiment includes at least one processor that is operative to determine a weight value for each peak which corresponds to an area under the curve of the peak. Only peaks which have a weight above a predetermined threshold may be classified as true peaks for purposes of determining the values of the feature vector for a detected MICR symbol.

In an example embodiment, the weight for each peak may be calculated by a processor integrating the portion of the magnetic waveform which corresponds to the peak. Equation 11 shows an example of the calculation used to determine the weight (w) of a peak found at time (x) for the detected magnetic waveform of a MICR symbol on a check.

$$w(x) = \int_{x-hw}^{x+hw} f(t)\,dt \quad\quad \text{EQ11}$$

Figure 26:
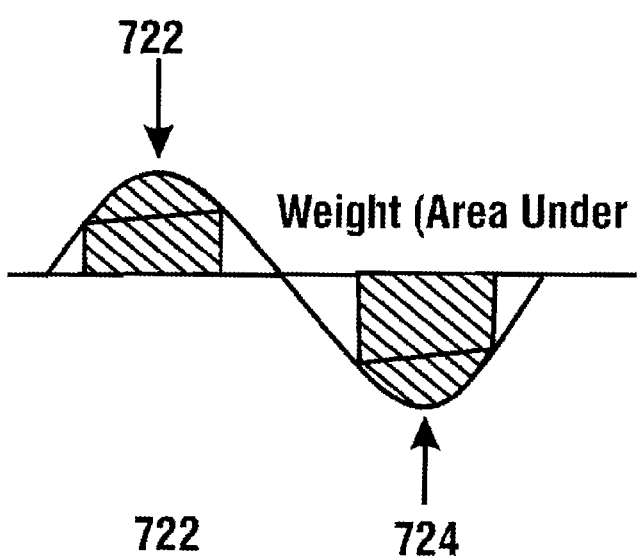
FIG. 26 shows shaded areas in a waveform which correspond to calculated areas or weights determined for the peaks in the waveform.

Here f(t) is the detected magnetic waveform and hw is the same half window width discussed earlier. The shaded areas shown in FIG. 26 show an example of the calculated areas or weights determined for the peaks 722, 724

Although the weight of a peak may be used to distinguish true peaks from transient noise spikes, the weight of a peak may be very sensitive to baseline (offset) drift by the magnetic sensor. As a result a relatively "flat" peak due to baseline drift could have a significant weight value, while a true peak with low amplitude (like the fifth peak in E13B symbol "7" (generally shown with reference numeral 700 in FIG. 23) may have a very small weight.

In other sample embodiments the weight of a peak may be calculated from digital samples taken from a magnetic waveform. In some example embodiments the digitally sampled signals may be represented by $y_i$. In some example embodiments the weight of a peak centered at $y_i$ is represented by $w_i$ where the weight of the left side of a peak is represented by $w_{i,\,left}$ and is calculated according to Equation 12.

$$w_{i,left} = \sum_{j=i-hw-1}^{i-1} y_j \;\bigg|\; \text{if } y_j \text{ has same polarity as } y_i \quad\quad \text{EQ12}$$

where hw represents the peak half width discussed earlier such that there are exactly hw magnetic samples before and after the identified peak. The weight of the right side may be represented by $w_{i,\,right}$ and is calculated according to Equation 13.

$$w_{i,right} = \sum_{j=i+1}^{i+hw} y_j \;\bigg|\; \text{if } y_j \text{ has same polarity as } y_i \quad\quad \text{EQ13}$$

If the peak is a positive peak the peak weight may be calculated according to Equation 14.

$$w_i = 2 \cdot \min(w_{i,left}, w_{i,right}) + y_i \quad\quad \text{EQ14}$$

If the peak is a negative peak, the peak weight may be calculated according to Equation 15.

$$w_i = 2 \cdot \max(w_{i,left}, w_{i,right}) + y_i \quad\quad \text{EQ15}$$

In some example embodiments the weights of a peak may be calculated through operation of at least one processor and used as element values in a feature vector corresponding to a magnetic waveform representing a MICR symbol. The feature vector with elements corresponding to peak weight values may then be compared for correlation through operation of a processor with data corresponding to a predetermined set of correlation vectors of a MICR font. Based on the results of the correlation a particular MICR symbol is identified as corresponding to the magnetic waveform. The processor then provides at least one output corresponding to the determined symbol.

In some example embodiments the feature vector may have eight elements where the elements correspond to a possible magnetic waveform peak location. The feature vector $\vec{v}_x$ with eight elements representing eight possible peak locations may be represented by Equation 16.

$$\vec{v}_x = (p_1 p_2 p_3 p_4 p_5 p_6 p_7 p_8)^T \qquad \text{EQ16}$$

The possible peaks may be represented as $p_k$ and the weight of a possible peak may be represented in Equation 17 as $w_i$.

$p_k = 0$ if no peak found at position $k$ $p_k = w_i$ if a peak found at position $k$ \qquad EQ17

The weight values of possible peaks in $\vec{v}_x$ in may be calculated as in any of the methods described earlier.

Figure 35:
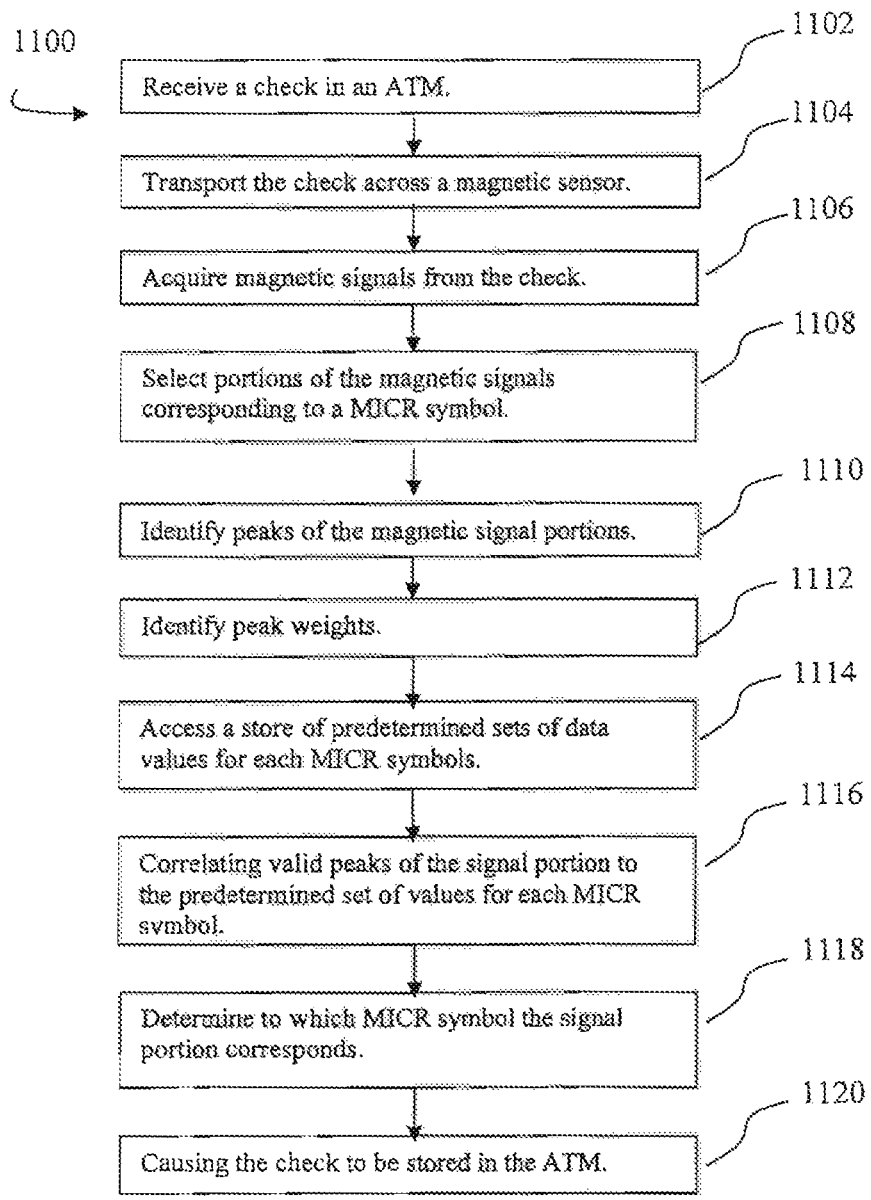
FIG. 35 shows steps in an example method to determine what MICR symbol is represented in a magnetic waveform using peak weights.

An example embodiment of a method 1100 of using peak weights to detect MICR symbols from a magnetic waveform is shown in FIG. 35. The method is carried out by an ATM responsive to at least one processor executing computer executable instructions. The method begins at step 1102 where a check is received in an ATM. In some example embodiments documents that contain MICR symbols other than a check may be received. Next at step 1104 the check is transported into the ATM by one or more suitable transport devices. While the check is transported it may be moved adjacent to one or more sensors such as read heads capable of detecting magnetic ink. At step 1106 magnetic signals are acquired from the check. The magnetic signals may be digital signals derived through operation of suitable circuitry from signals detected with the one or more sensors in step 1104 or may be digital signals directly sampled by the sensors in step 1104.

Next, at step 1108 a portion of the digital signal acquired in step 1106 is selected that corresponds to a MICR symbol responsive to operation of a processor. At step 1110 the peaks of the portion of magnetic signal selected in step 1108 are determined. The peak weights are determined in step 1112. The peak weights may be determined through operation of a processor by any of the earlier discussed methods of calculating peak weight. In some example embodiments once the peak weights are determined, the weight values may be used by the processor operating in accordance with its programming to determine which peaks qualify as valid peaks, and only valid peaks may be used in any further determinations. At step 1114 the processor accesses data in a data store comprising a predetermined set of data values for each of the plurality of MICR symbols. In some example embodiments the sets of data values may correspond to peak amplitude values and in other example embodiments may correspond to peak weight values. In some example embodiments the sets of data values may correspond to feature vector element values. The data representing the magnetic signal portion may be compared through operation of a processor for correlation with each of the predetermined sets of data accessed in step 1116 and a determination may be made in step 1118 as to which MICR symbol the magnetic signal portion corresponds. The determination in step 1118 may correspond to how well the sample data values correlate to the predetermined sets of data values accessed in step 1114. The determination of the type of sensed MICR symbol is made by the processor based on the sample data values generally corresponding to one of the sets of predetermined data values for the type of MICR symbol.

In some embodiments weight of a peak may be sensitive to baseline shift in the sensed data. As graphically represented, a cut related to the area enclosed by a curve and the cord that "cuts" across the base of the peak may be generally independent of baseline shift. In some example embodiments a cut function may be calculated through operation of a processor which corresponds to a modified area under the waveform curve. In some example embodiments the cut may be used to more accurately distinguish smaller true peaks from peaks produced by baseline drift. An example of a cut function $c(x)$ is shown in Equation 18.

$$c(x) = w(x) - h[f(x-h) + f(x+h)] \qquad \text{EQ18}$$

Figure 27:
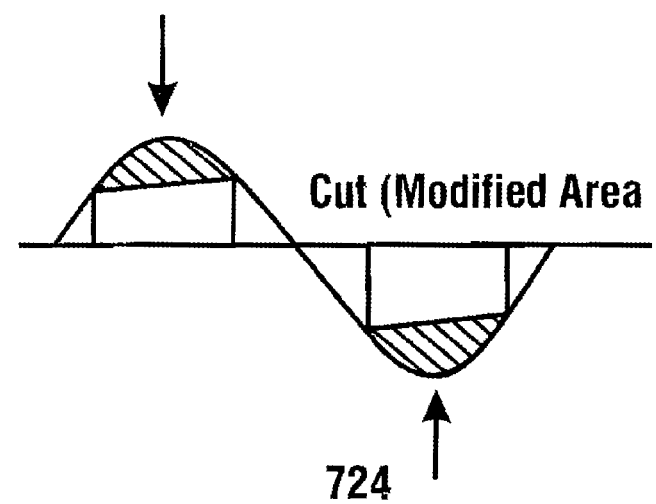
FIG. 27 shows shaded areas in a waveform which correspond to calculated cut areas or modified weights determined for the peaks in the waveform.
Figure 28:
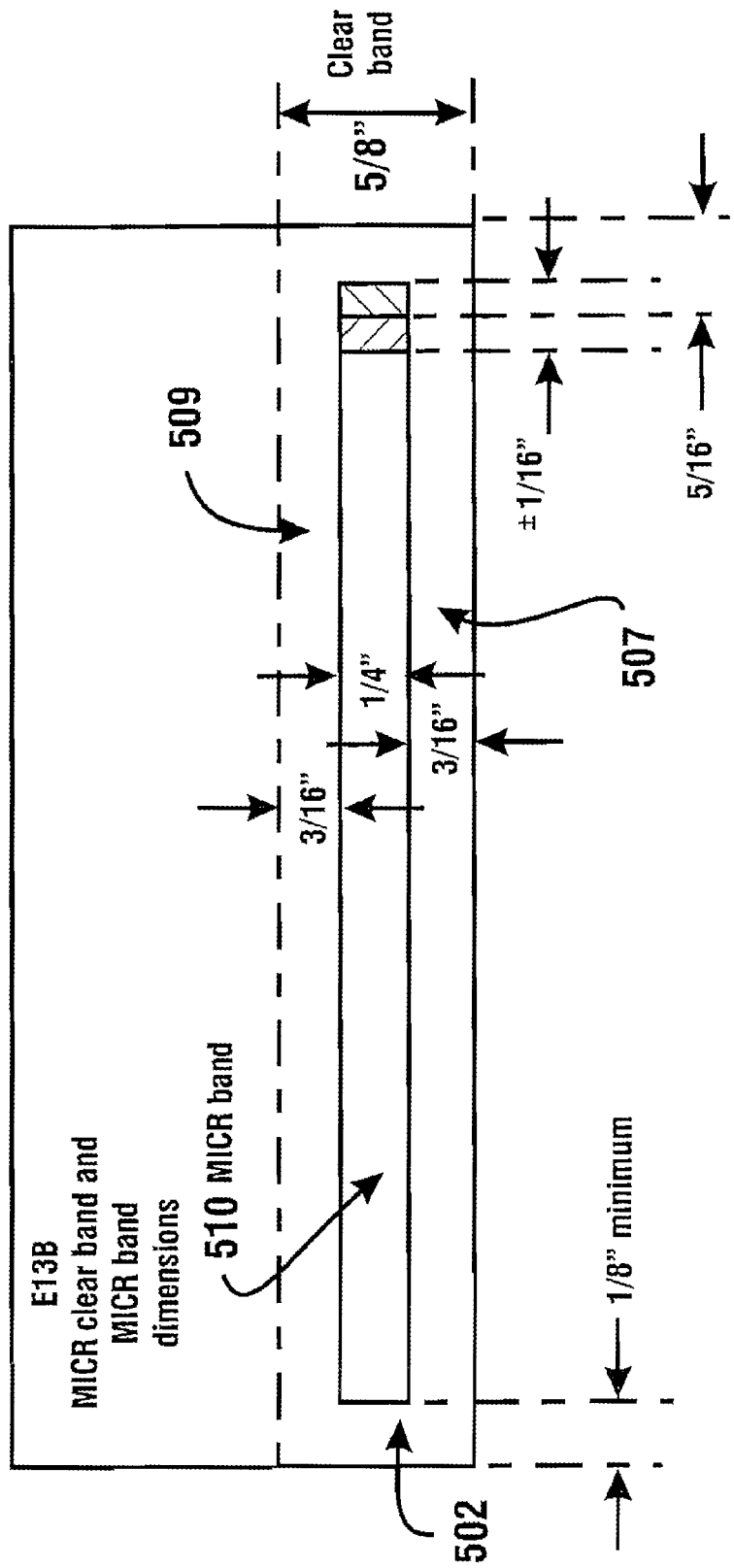
FIG. 28 shows an example of the MICR zone of a check.
Figure 32:
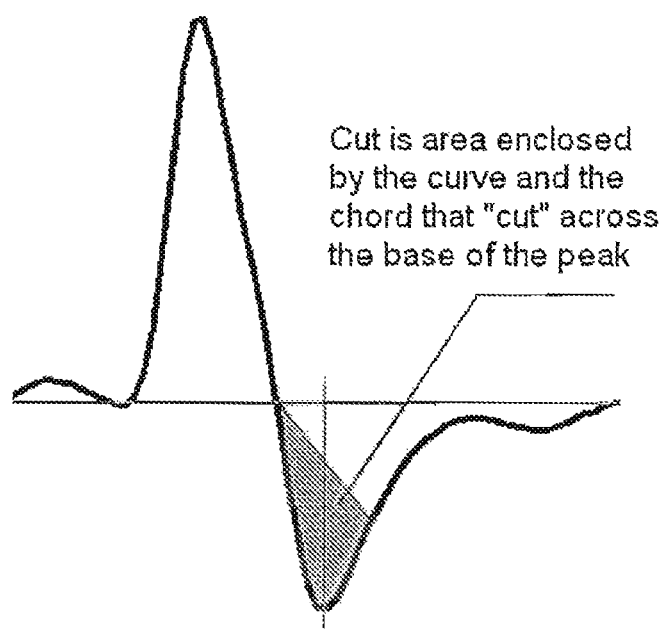
FIG. 32 shows an example cut of a peak.

The shaded areas shown in FIGS. 27 and 32 show examples of the cut areas $c(x)$ or modified weights determined for the peaks 722, 724. In an example embodiment, cut area values above a predetermined threshold may be used by a processor to make a determination as to which peaks in a detected waveform curve are to be used to form a feature vector for the MICR symbol. In some example embodiments the cut of a peak and the weight of a peak may be both calculated, and both may be factored into a calculation made by a processor in determining if the peak is a valid peak to use to form an element in a feature vector.

In some example embodiments the cut series may be useful in determining whether a sensed peak is valid or invalid. The cut series may be defined to be the difference between the area under the curve around a peak and the product of the average of the endpoints and distance from the peak center to the endpoints. If the sum series, $s_i$, is defined as in Equation 19 as being the sum of the sub series of $\{y\}$ from the first index j up to i, then the cut series may be defined as in $$s_i = \sum_{j=0}^{i} y_j \qquad \text{EQ19}$$

Equation 20 (where L=2*hw+1) or alternatively as in Equation 20A where hw is again the half width of the window or the distance from a peak center to the distance hw on either side of the peak center. In some example embodiments when a peak is sampled eleven times (at five locations on each side of peak) and once at the peak center, L=11 and hw=5.

$$c_i = s_{i+hw} - s_{i-hw-1} - (y_{i-hw} + y_{i+hw}) \cdot \left(\frac{L}{2}\right) \qquad \text{EQ20}$$

$$c_i = s_{i+hw-1} - (y_{i-hw} + y_{i+hw})(hw + 0.5) \qquad \text{EQ20A}$$

In some example embodiments it may be useful to determine the anchor depth of a peak before making the calculation to determine which peaks are valid peaks. The anchor depth is related to how deep rooted (or anchored) the peak is. In some example embodiments the anchor depth may be determined through operation of a processor by determining the magnitude of the value of a magnetic waveform at distance hw on each side of the center of the peak, wherein the anchor depth is defined as the smaller magnitude of the two magnetic values at a distance hw on each side of the center of the peak. For example for hw=5, then if y(i−5)=−12 and y(i+5)=−10, then the anchor depth will be 10, which is the lesser of the two amplitudes.

Figure 36:
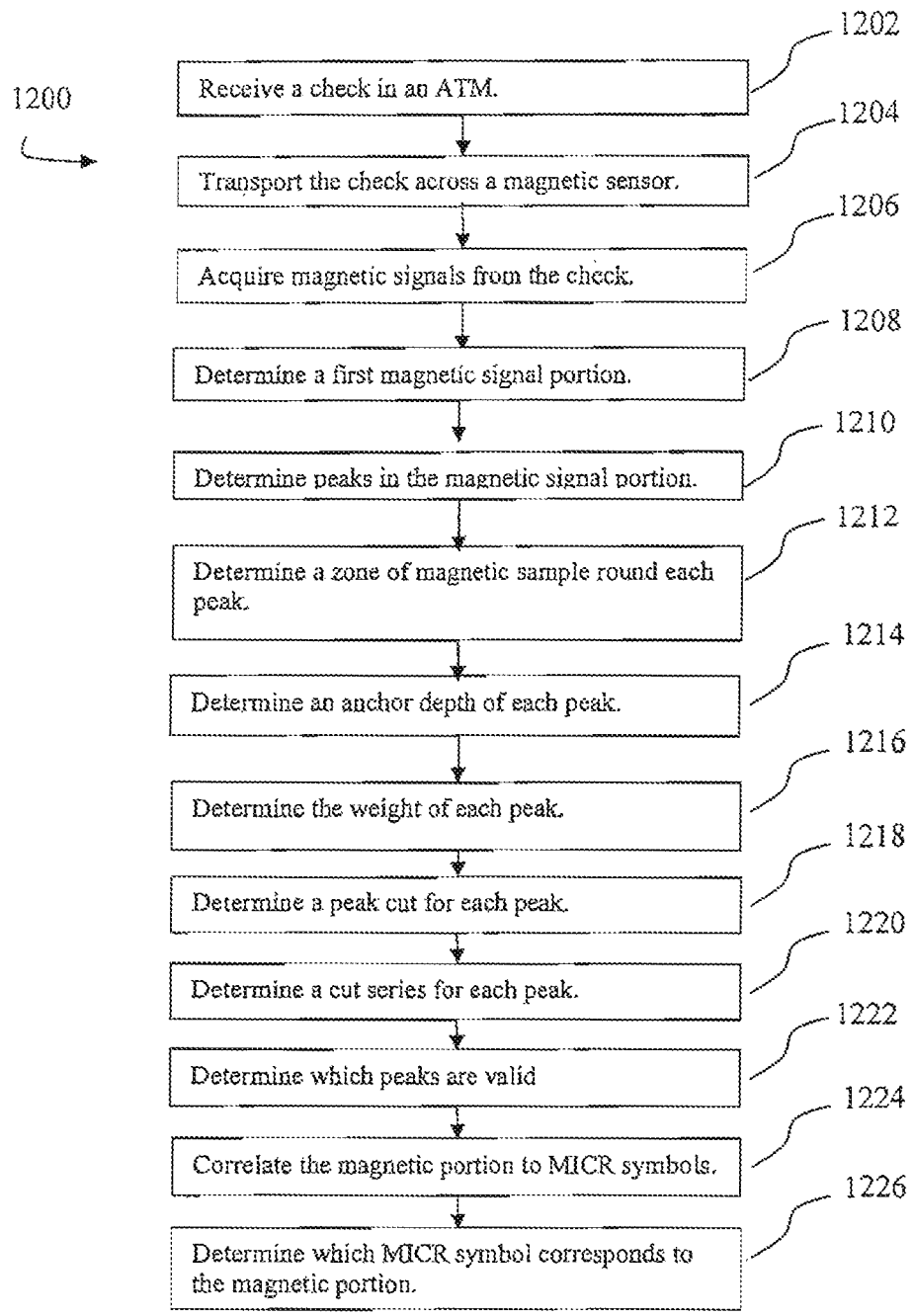
FIG. 36 shows steps in an example method to determine what MICR symbol is represented in a magnetic waveform using anchor depth, weight, cut, and cut series to determine valid peaks.

An example embodiment of using peak anchor depths, peak cuts, peak cut series, weights and peak amplitude values to detect MICR symbols from a magnetic waveform is schematically shown by the method steps in FIG. 36. The method is carried out by an ATM responsive to computer executable instructions carried out by at least one processor. The method begins at step 1202 where a check is received at an ATM. In some example embodiments documents that contain MICR symbols other than a check may be received. Next at step 1204 the check is transported into the ATM by one or more suitable transport devices. While the check is transported it may be moved adjacent to one or more sensors such a read heads capable of detecting magnetic ink. At step 1206 magnetic signals are acquired from the check. At step 1208 a portion of the magnetic signals acquired in step 1206 is selected through operation of the processor, that corresponds to a MICR symbol. In some example embodiments the signal portion may not actually correspond well with stored data for any MICR symbol, and when an analysis is performed in a later step it may be detected that the signal portion does not correspond with a MICR symbol. When this occurs, the processor may operate in accordance with its programming to collect other signal portions to determine if such portions correspond to valid characters. As discussed previously the determination as to the bounds of magnetic characters may be determined through operation of the processor based on signal gaps, signal variations, signal fluctuations or other features or combinations of signal patterns that generally correspond to the separation of characters for the particular types of characters being analyzed.

At step 1210 the possible peaks of the signal portion are determined. The peaks are determined by a processor analyzing the magnetic waveform values and/or amplitudes. In some example embodiments the peaks may be analyzed at eight fixed or processor resolved locations relative to the MICR symbol. In some example embodiments when a peak is determined through operation of the processor with a high confidence, that peak may be labeled valid. Other peak values may be determined at fixed locations away from a peak location that have been determined proper peaks for analysis based on operation of the processor. In yet other example embodiments other peaks may be searched for through operation of the processor in a small range of areas where each small range of areas is a fixed distance from a valid or a high confidence peak. Of course these approaches are exemplary.

At step 1212 data corresponding to a zone around each peak is selected through operation of a processor. In some example embodiments the zone length will be the same distance on each side of a peak center so that the peak is centered in the zone. In some example embodiments the zone will correspond with a fixed number of magnetic waveform sample locations within a zone. In some example embodiments the zone sample locations are an equal distance apart. At steps 1214 through 1220 the anchor depth, weight, peak cut and cut series respectively are calculated for each peak through operation of the processor. In step 1222 a determination is made as to which peaks are valid. The determination may be based on comparison of one or more features of the peak to one or more values and/or thresholds including the amplitude, anchor depth, weight, peak cut and cut series of the peak. The magnetic signal data resolved may be analyzed for correlation with a predetermined set of MICR symbols in step 1224. In some example embodiments the correlation may be based on correlating the peaks of the magnetic signal portion comprising a sample feature vector to a set of predetermined symbol feature vectors that correspond with one or more predetermined anchor depth, weight, peak cut or the cut series of each symbol of a given MICR character set. In some example embodiments the correlation function may be a Pearson correlation or any other suitable correlation technique. At step 1226 a determination is made through operation of the processor as to which MICR symbol the signal portion corresponds.

As discussed previously, in an example embodiment a comparison calculation may be performed between the determined sample feature vector of a detected magnetic waveform, and each of the plurality of predetermined symbol feature vectors for each of the standard E-13b MICR symbols or the standard CMC-7 symbols. In an example embodiment a Pearson correlation may be used to produce a correlation coefficient which is a quantity that gives the quality of a least square fitting to the original data. A higher Pearson correlation coefficient indicates a higher correlation between data sets, while a relatively lower Pearson correlation coefficient indicates a lower correlation between data sets. In an example embodiment, a correlation value of 1.0 corresponds to an exact match between the detected sample feature vector and the predetermined symbol feature vector of a standard E-13b symbol. In practice an exact match may be rare; however, as discussed previously, correlation coefficients which are closer to a value of 1.0 correspond to a relatively higher correlation between data sets than correlation coefficients that are relatively smaller in value. Thus, of the fourteen standard E-13b symbols the detected magnetic waveform is being analyzed for correlation to the symbol which produces the highest correlation coefficient with respect to the detected symbol may be determined by a processor as the correct match for the detected symbol. A similar determination may be made for a magnetic waveform being correlated with a feature vector representing distances between peaks and the fifteen standard CMC-7 symbol feature vectors of FIG. 31.

Using the E-13b MICR as an example, the Pearson correlation $r_{xy}$ between two vectors $\vec{x}$ and $\vec{y}$ may be calculated according to Equation 21. Equation 21 is an inner product of the magnetic waveform feature vector and one of the predetermined MICR symbol feature vectors.

$$r_{xy} = \vec{x} \otimes \vec{y} = \vec{y} \otimes \vec{x} = \frac{s_{xy}}{\sqrt{s_{xx}s_{yy}}} \qquad \text{EQ21}$$

Where $s_{xx}$, $s_{yy}$, and $s_{xy}$ in Equation 21 are defined by Equations 22 to 24. In some example embodiments for E-13b MICR feature vectors corresponding to eight possible peak positions, the value of n is eight. In other example embodiments for CMC-7 MICR feature vectors corresponding to six distances between peaks, the value of n is six.

$$s_{xx} = \sum_{i=1}^{n}(x_i - u_x)^2 = \left(\sum_{i=1}^{n}x_i^2\right) - nu_x^2 \qquad \text{EQ22}$$

$$s_{yy} = \sum_{i=1}^{n}(y_i - u_y)^2 = \left(\sum_{i=1}^{n}y_i^2\right) - nu_y^2 \qquad \text{EQ23}$$

$$s_{xy} = \sum_{i=1}^{n}(x_i - u_x)(y_i - u_y) = \left(\sum_{i=1}^{n}x_i y_i\right) - nu_x u_y \qquad \text{EQ24}$$

A standard cross-correlation matrix may be calculated that determines how well each of the standard predetermined feature vectors correlate with each of the other predetermined feature vectors. The standard cross-correlation matrix is shown in FIG. 38 and may be defined for E-13b as a 14-by-14 matrix. The matrix elements $V_{ij}$ may be the vector correlation coefficient between feature $\vec{v}_i$ vector and $\vec{v}_j$. FIG. 38 is produced with vector $\vec{v}_0$ corresponding to the symbol 0, . . . , and $\vec{v}_9$ symbol 9, $\vec{v}_{10}$ the transit symbol (T), $\vec{v}_{11}$ the amount symbol (A), $\vec{v}_{12}$ the on-us symbol (U) and $\vec{v}_{13}$ the dash symbol (D). The standard feature vector table may also then be expressed as the matrix $V=[\vec{v}_0\ \vec{v}_1\ \vec{v}_2\ \vec{v}_3\ \vec{v}_4\ \vec{v}_5\ \vec{v}_6\ \vec{v}_7\ \vec{v}_8\ \vec{v}_9\ \vec{v}_{10}\ \vec{v}_{11}\ \vec{v}_{12}\ \vec{v}_{13}]$ which represents the matrix of FIG. 38. Matrix V is a symmetric matrix with $V_{ij}=V_{ji}$. Each element along the diagonal line is one because that line represents when standard predetermined feature vector has been correlated to itself which represents a 100% confidence in that correlation. In some exemplary embodiments $V_{ij}$ should be one or as close to one as possible for any $i \neq j$. For a given magnetic waveform symbol to be recognized, in some embodiments the feature vector $\vec{v}_x$ may be constructed having elements corresponding to peak amplitudes, weights or any other suitable parameter such as distances between peaks for CMC-7 font. For one example embodiment for the E-13b font the feature vector will have element values corresponding to peak weights where the magnetic waveform feature vector may be represented as $\vec{v}_x=(\vec{w}_1\ \vec{w}_2\ \vec{w}_3\ \vec{w}_4\ \vec{w}_5\ \vec{w}_6\ \vec{w}_7\ \vec{w}_8)$. The element weights may be weight values of a peak calculated as discussed earlier and may be values derived from the filtered magnetic signal {y} that was discussed earlier.

Symbol recognition of the symbol x is in some example embodiments accomplished by a processor operating in accordance with its programming to calculate correlation coefficients between $\vec{v}_x$ and all 14 standard E-13b feature vectors in matrix V, and producing a 14-dimension result vector $\vec{r}$. The inner product operator may be used to represent the result vector as Equation 25.

$$\vec{r}(\vec{v}_x \otimes V)^T \qquad \text{EQ25}$$

The result column vector $\vec{r}=(r_0\ r_1\ r_2\ r_3\ r_4\ r_5\ r_6\ r_7\ r_8\ r_9\ r_{10}\ r_{11}\ r_{12}\ r_{13})$ may represent the inner product of $\vec{v}_x$ with each of the predetermined standard feature vectors. The largest element $r_k$ of vector $\vec{r}$ may indicate the recognized symbol which is the corresponding feature vector $\vec{v}_x$ in V. The value of $r_k$ may also be referred to as the confidence level. In general, in some example embodiments a confidence level greater than or equal to 95% may indicate a positive identification while a confidence level less than 95% and above 90% may still be acceptable. However, a confidence level under 90% may be taken as questionable. Of course these approaches are exemplary.

Figure 39:
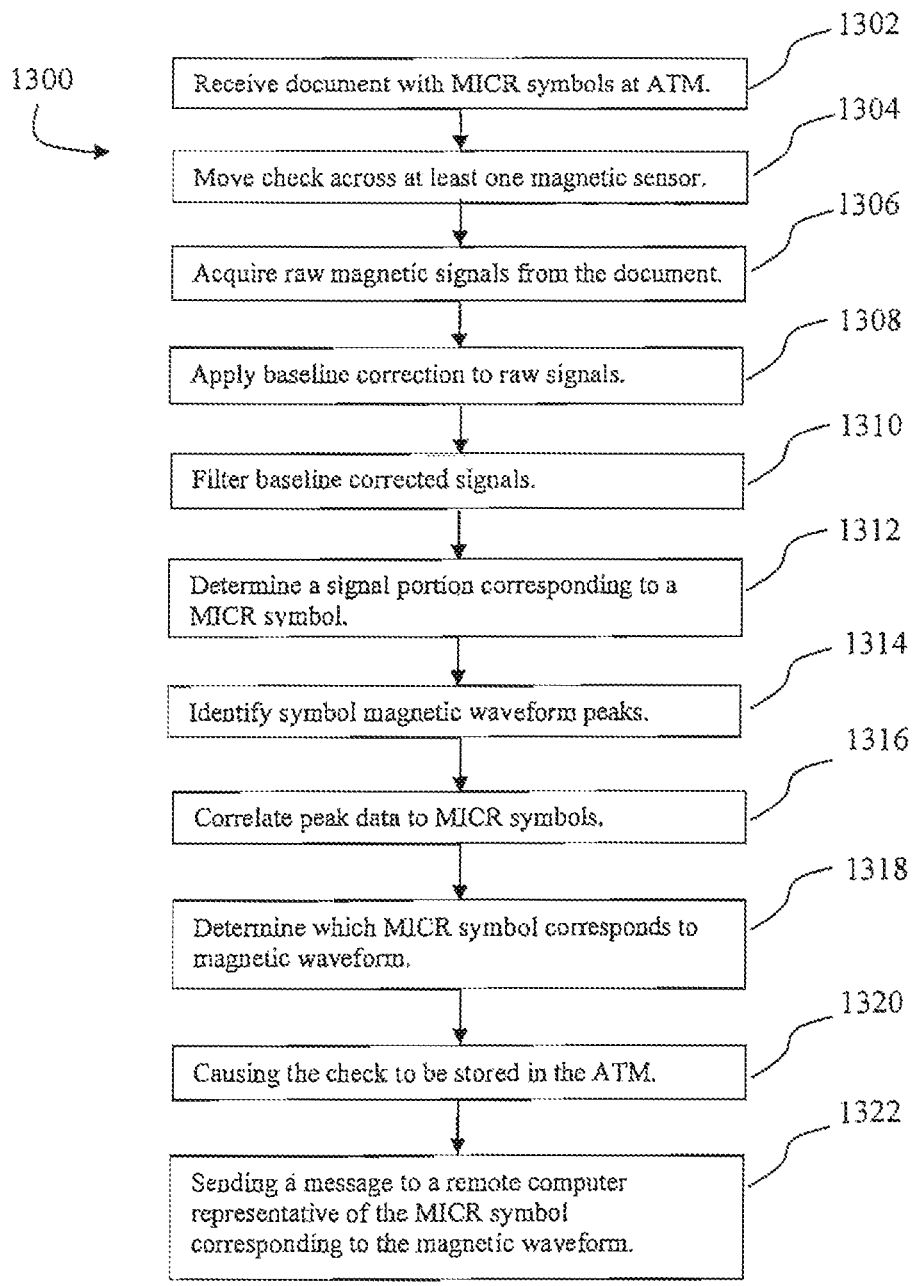
FIG. 39 shows an example method to determine what MICR symbol is represented in a magnetic waveform using baseline correction and filtering.

An example embodiment to detect MICR symbols by combining filtering and correlating a magnetic waveform is shown schematically through the method steps 1300 represented in FIG. 39. The method is carried out by operation of an ATM responsive to at least one processor carrying out computer executable instructions. The method begins at step 1302 where a document with MICR symbols is received at an automatic banking machine. At step 1304 the document is moved across at least one magnetic sensor such as a read head. In some example embodiments the document is moved on a transport that operates at a transport speed of about 500 mm/s. At step 1306 magnetic signals are acquired by the read head from the document as it is moved across one or more read heads or other magnetic sensors that are operative to sense the strength of magnetic properties sensed at each location from the magnetic ink of the MICR symbols. In some example embodiments the acquired signals may be raw signals that are uncorrected and unfiltered. In other embodiments the signals may be conditioned and/or converted to digital signals by suitable circuitry. In some example embodiments the magnetic sensor may comprise a plurality of sensor elements arranged consecutively along at least one column, and may be operative to acquire magnetic signals from a plurality of the sensor elements as the check moves across the sensor. Of course this approach is exemplary.

In some example embodiments the signals corresponding to the MICR symbols on the document may be sampled about every 63.5 micro-seconds and the sample values may be converted to an eight bit unsigned integer value through operation of suitable circuitry. In some example embodiments the raw signal may be a baseline signal corrected at step 1308. In some example embodiments the baseline correction may be carried out through operation of a processor based on an average value that is subtracted from each raw digitized magnetic signal. In some example embodiments the average value may be the average value over a corresponding fixed range of raw digitized magnetic signals. In some example embodiments when a new raw magnetic sample is acquired, it may be added through operation of the processor to a fixed raw magnetic sample range and the oldest raw magnetic sample from the fixed raw magnetic sample range may be removed and the average value may be recalculated. At step 1310 the baseline corrected signal may be filtered by appropriate circuitry to boost the signal to noise ratio by attenuating high frequency noise. In some example embodiments the filtering may be performed through operation of at least one processor digitally filtering the corrected magnetic signal. In some example embodiments the baseline corrected magnetic signals may be filtered with a Bessel IFF. In yet other example embodiments the Bessel IIF may be a 10th order filter.

At step 1312 a portion of the filtered signal is evaluated through operation of a processor for purposes of determining if it corresponds to a MICR symbol. In some example embodiments this determination may be made by locating a peak after a one-eighth inch quiet period of not detecting any peaks between which correspond to an area MICR symbols. At step 1314 the data values corresponding to peaks of the magnetic waveform that corresponds to a MICR symbol may be determined. At step 1316 the data values corresponding to peaks may be analyzed for correlation to data corresponding to each of the MICR symbols of a MICR font. In some example embodiments a confidence level for each correlation between the magnetic symbol peaks and each MICR symbol is determined through operation of a processor. In some example embodiments the correlation may be achieved using a Pearson correlation. In some example embodiments when none of the confidence levels is determined to be above a confidence threshold value, then a second magnetic signal portion that is offset from the initial magnetic signal portion by at least one magnetic sample may be determined and steps 1314 and step 1316 may be repeated with the second magnetic signal portion. At step 1318 a determination is made through operation of a processor as to which MICR symbol corresponds to the magnetic signal data. The steps may then be repeated for all of the magnetic signal data to resolve all of the magnetic symbols on the document. At step 1320 the document may be stored in the automatic banking machine or returned to the customer. In some example embodiments at least one message may be sent to at least one a remote computer, and the at least one message may include data representative of data resolved from the MICR symbols of the document. At least one message from the remote computer may include data which causes the machine to accept and store the check or return it to a customer. Of course this approach is merely exemplary.

In some example embodiments the ATM may be operative to read the MICR symbols on the document in all four orientations as represented schematically by FIGS. 40-43. In some example embodiments an ATM may read all four orientations with only one magnetic read head sensor at the top of the document and one magnetic sensor at the bottom of the document. In some example embodiments when the check is upside down the data received by the magnetic sensor corresponding to the side of the document with magnetic data may be filtered and amplified to allow better recovery of the peaks of the signal. The ATM may be operative to adjust the offset and the signal to noise ratio of the magnetic signal as discussed earlier. For example, features described in U.S. patent application Ser. No. 11/983,401 filed Nov. 8, 2007 may be used in some embodiments and the disclosure of this application is incorporated herein by reference in its entirety.

In some example embodiments a camera or other imaging device such as a linear CCD array is operative to capture optical images of the document may be placed on both sides of the transport. One imaging device may be operative to capture images of the front face of the document and one imaging device may capture images of the rear face of a document. In some example embodiments the imaging devices may be operative to capture images of a document to provide image data to optical recognition software that is operative to assist in the detection of MICR symbols. In alternative embodiments contact image scanners may be used to capture image data in a pixelated format.

In some example embodiments E-13b MICR symbols may be detected with an ATM operative to determine if a valid MICR line is located at near the "top" or "bottom" of a document face no matter which way the documents may be oriented. In some example embodiments the ATM may be operative to read the top and bottom regions of a check with top and bottom magnetic sensors. The top and bottom magnetic waveforms may both then be analyzed through operation of a processor as described previously to detect the peaks that may correspond to MICR symbols. As before, data corresponding to the MICR peaks may be compared through operation of a processor for correlation to a predetermined data sets corresponding to MICR symbols. It should be understood that the "top" and "bottom" references are for convenience only in describing representations of checks in the manner shown in the drawings and do not refer to relative vertical positions in an apparatus. In some example embodiments the correlation may be between a sample feature vector corresponding to the sensed magnetic waveform and predetermined symbol feature vectors representing the predetermined MICR symbols. Of course these approaches are exemplary.

Figure 40:
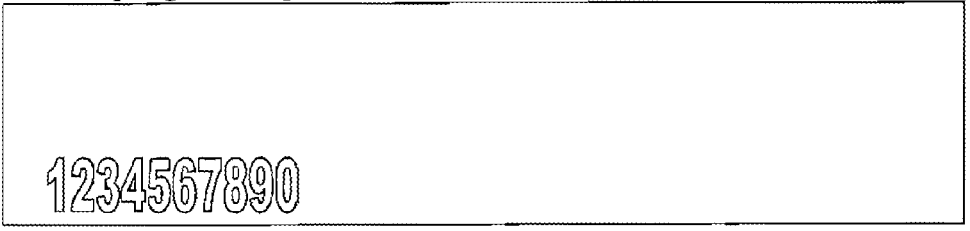
FIGS. 40-43 show example representations of a document in four possible orientations.

In some example embodiments when the check is front face up, right side up as in FIG. 40 the E-13b magnetic waveforms corresponding to each of the symbols as shown in FIG. 23 may each correspond well to their associated predetermined feature vector in FIG. 24. In some example embodiments if the MICR line on the check is scanned from left to right then the MICR symbols on the check are scanned from the front edge of the symbol to the back edge of a symbol. In some example embodiments the left to right scanning may be accomplished by using a transport that moves the check from right to left under stationary sensors. Magnetically scanning from the front to back edge of a MICR symbol means the sample feature vector of the magnetic waveform should correspond well to the feature vectors of FIG. 24. The reason is that the feature vectors of FIG. 24 may have been derived from scanning ideal MICR symbols from left to right as shown in the waveforms of FIG. 23. Because the magnetic scan of the bottom magnetic sensor may correspond very well with predetermined symbol feature vectors, there should be a high number of detected symbols so there may be a high confidence the MICR was correctly detected in the orientation represented in FIG. 40.

In contrast, in the face up, right side up orientation represented in FIG. 40, the upper magnetic scanner may not detect many magnetic waveforms that correspond to MICR symbols. In some example embodiments because the MICR on a check is generally located at the "bottom," the top sensor has essentially no magnetic data to sense. Without valid MICR data, the sensor may not detect any valid MICR symbols. In some example embodiments when the bottom sensor detects data corresponding to many more valid MICR symbols than the top sensor, the top sensor data values may be disregarded.

Figure 42:
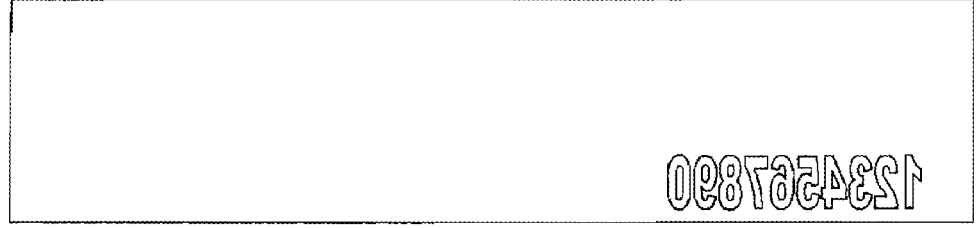
Figure 43:
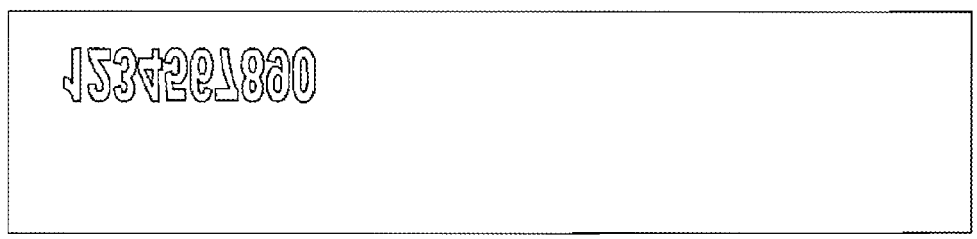

A corresponding orientation related to when the check may be in the front face up, right side up position is when the check is front face upside down right side up as represented in FIG. 42. In some example embodiments when the MICR symbols of a check are read with a check in this orientation it is again scanned from left to right, it may still be possible to detect valid MICR symbols. In this orientation the MICR symbols will still be scanned from the front of the symbol to the rear of the symbol again. This means the sample feature vector derived from the waveform will correspond well with one of the predetermined feature vectors of FIG. 24. However, because the check is now "upside down" the magnetic signal will generally be weaker when it is read through the check. In some example embodiments an offset adjustment may be performed through operation of the processor to reposition the peaks for analysis as discussed above. Additionally, filtering may be performed on the magnetic waveforms to improve the signal to noise ratio as discussed above to aid in detecting the MICR symbol to which a sensed waveform may correspond. Because the upper sensor is scanning in the direction which corresponds to the feature vectors, many of the MICR symbols may be recovered with a high confidence when the check is oriented as represented in FIG. 42. Because the bottom sensor is on the opposite edge of the check from the MICR symbols, the bottom sensor may not detect any valid MICR symbols and the bottom sensor data may be disregarded. The processor may operate in accordance with its programming in deciding when data may be discarded.

In some example embodiments four sensors may be used to read the MICR data. Four sensors may allow both sides of the check to be read on the top of the check and both sides of the check to be read at the bottom of the check. However, providing four sensors may be more costly in that using only two sensors may require twice the computing power to filter, sample and correlate waveforms and associated peaks. Of course these approaches are exemplary.

Figure 41:
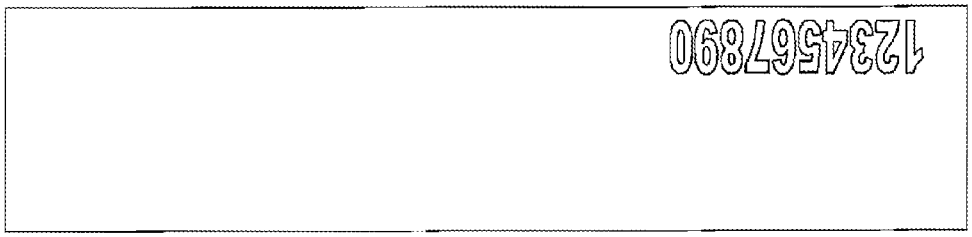

In some example embodiments a check may be oriented as represented in FIG. 41 with the front face up, upside down. In this orientation the check itself may still be scanned from left to right. However, now the E-13b MICR symbols are scanned from the back of a MICR symbol to the front of a MICR symbol when the same transport is used to transport the check from right to left. The magnetic waveforms scanned from a check as oriented in FIG. 41 are in the opposite directions to those in FIG. 23. Because the waveforms are not symmetric in some embodiments the scanned magnetic waveforms may not correlate well with the waveforms of FIG. 23 because the waveforms in FIG. 23 correspond to MICR symbols scanned from left to right. Because the sampled magnetic waveforms may not correlate well with the waveforms of FIG. 23, the magnetic waveform may not correspond well with any of the E-13b feature vectors in FIG. 24.

Even though none of the waveforms of FIG. 23 may be symmetric, inverted waveforms and portions of some waveforms in FIG. 23 may be nearly symmetric. The partial symmetry may be used to accurately resolve some of the MICR symbols in some example embodiments that have MICR symbols scanned from back to front. For example the waveforms in FIG. 23 for the MICR symbols "0" and "8" are approximately symmetric if the peaks are inverted after scanning from back to front. In a front to back scan of a MICR symbol "0" there would be a detection of the four peaks shown in FIG. 23. At sample location one (using the exemplary eight position sample locations discussed earlier and shown in FIG. 30) a positive peak may be detected followed by a negative peak at location two. Sample locations three through six would not detect any peaks. Sample location seven would detect a positive peak followed by a negative peak. The peak amplitudes correspond to the feature vector for the symbol "0" in FIG. 24. If the waveform for the MICR symbol for "0" in FIG. 23 is scanned in reverse (back to front), sample position one has a negative peak, sample position two has a positive peak, sample locations three through six have no peaks, sample location seven has a negative peak and sample location eight has a positive peak. If all the peak values in the back to front scan are inverted, then the back to front scan may roughly correspond to the front to back scan for the MICR symbol "0." The front to back feature vector of FIG. 24 and the back to front scan (with inverted amplitudes) feature vector for the MICR symbol "0" may be very similar.

Because the inverted feature vectors may be very similar, at least one processor is programmed to correlate the MICR symbol "0" when it is scanned in the back to front direction. In some example embodiments the correlation matrix may have an additional vector for the MICR symbol "0" that has the values of the original feature vector of the MICR symbol "0" inverted. Because the magnetic waveform in FIG. 23 is symmetrical for the MICR symbol "8" (with peaks inverted) a similar approach may in some example embodiments may be used to detect the symbol "8" when it is scanned in the back to front direction as in FIG. 23.

In some example embodiments all the waveforms of FIG. 23 are scanned in the back to front direction represented in FIG. 41 and sampled at the same eight corresponding sample locations. The sample locations may correspond to the sample locations of the elements in the feature vectors of FIG. 24. Fourteen new feature vectors may be added to FIG. 24 that correspond to each of the MICR symbols of FIG. 24 being scanned in the back to front direction.

In some example embodiments a portion of a MICR symbol may be symmetric. For the E-13b MICR symbol "2" the magnetic waveform of FIG. 23 is symmetric with respect to its first five sample locations corresponding to a positive peak, negative peak, no peak, positive peak and negative peak read in the front to back scan. In reverse right to left scan, with the peaks again inverted, the sequence may be similar over this portion of the magnetic waveform. The corresponding feature vector in FIG. 34 for the E-13b MICR symbol "2" is symmetric when the first five elements are considered by themselves. The magnetic waveform for the E-13b MICR symbol "5" may be partially symmetric as may be the first six vector elements (sample locations) of the corresponding feature vector in FIG. 24 when the magnitudes are inverted.

In some example embodiments a processor operates to detect a portion of the feature vectors that may be symmetric (with inverted magnitudes) when reading MICR symbols from back to front. In some example embodiments E-13b MICR symbols may be scanned from back to front then may have their sample magnitudes inverted before correlation to the feature vectors of FIG. 24. In some example embodiments the symmetric portion (with inverted magnitudes) of a sampled magnetic waveform may need to be shifted so that symmetric portion may correspond to a portion of a feature vector in FIG. 24. As shown in for MICR symbols "2" and "5" in FIG. 24 the symmetric portion may need to be shifted so that the first five vector elements correspond to the symmetric portion and the last three correspond to zero. For the MICR symbol "5" the symmetric portion may need to be shifted so the last two elements correspond to zero.

In some example embodiments when a check is in the front face down, right side up orientation as represented in FIG. 42 the MICR symbols are again read from back to front. Because the check is now upside down the MICR symbols may be read through the paper by the "bottom" sensor. The magnetic waveform captured by the sensor may offset shifted and filtered to improve the signal to noise ratio as discussed earlier. In some example embodiments when the signal has been recovered, some of the E-13b MICR symbols may be recovered as discussed above for the back to front scan for the orientation represented in FIG. 41.

In some example embodiments when only some of the symbols are recovered through one sensor as discussed above for the orientations represented FIGS. 41 and 42, data from the other magnetic sensor may not be analyzed to save processor power. Turning off one of the two magnetic sensors may allow one or more processors to be fully operative to analyze the signals for the magnetic sensor that has detected some MICR symbols. In some example embodiments when only certain MICR symbols that may be partially symmetric are detected, the feature vector table for front to back scans of FIG. 24 may be disabled and another feature vector table corresponding to back to front scans of MICR symbols may be used to detect the MICR symbols. In some example embodiments when some MICR symbols are detected with symmetric properties, data corresponding to optical images of unrecognized MICR symbols may be processed using at least one processor operating optical image recognition software to recognize the optical MICR symbol images.

In some example embodiments CMC-7 MICR symbols may be read in any of the four orientations represented in FIGS. 40-43. Detection of CMC-7 MICR symbols in any orientation may be more difficult because the standard feature vectors may all be symmetric with themselves or another feature vector. In the CMC-7 feature vector table of FIG. 31, the feature vectors for the symbols "0", "8" and "I" are symmetric with themselves. They are symmetric whether read from front to back or from back to front. For example the feature vector for the symbol "0" has the first two and the last two elements for short peak distance values with the two middle element values for long distance values so the feature vector for "0" will appear similar whether the elements are read from first to last or from last to first. The rest of the twelve feature vectors are symmetric with one other feature vector. For example the feature vector for the CMC-7 MICR symbol "1" is symmetric to the feature vector for the symbol "T." The feature vector for the symbol "2" corresponds to "5", "3" to "N", "4" to "A", "6" to "9" and "7" to "D." Because there is a corresponding symmetric CMC-7 symbol for every CMC-7 symbol, it becomes more difficult to recognize if the CMC-7 magnetic waveform is validly being read from front to back or from back to front. It is difficult to determine which of the orientations shown in FIGS. 40-43 that the check may be in.

In some example embodiments optical symbol recognition functionality may be combined with the magnetic MICR symbol recognition for the analysis of the CMC-7 MICR font. In some example embodiments when a CMC-7 MICR symbol is detected, it may be correlated through operation of a processor with an optical symbol recognition result. This may be done for the first detected symbol or the first several detected symbols. After the optical symbols are compared with the resolved MICR symbols it is possible to know the orientation of the MICR symbols. In some example embodiments once it is known which sensor is detecting valid magnetic symbols, the other sensor values may be disregarded or the sensor may be turned off and computing resources may be applied to data from the sensor detecting valid symbols. In some example embodiments once it is known on which check face the MICR symbols are located and whether the symbols are being read font to back or back to front the optical imaging function carried out through operation of a processor may be suspended or turned off and the CMC-7 MICR symbols may be determined using only magnetic detection methods. Of course these approaches are exemplary.

Figure 44:
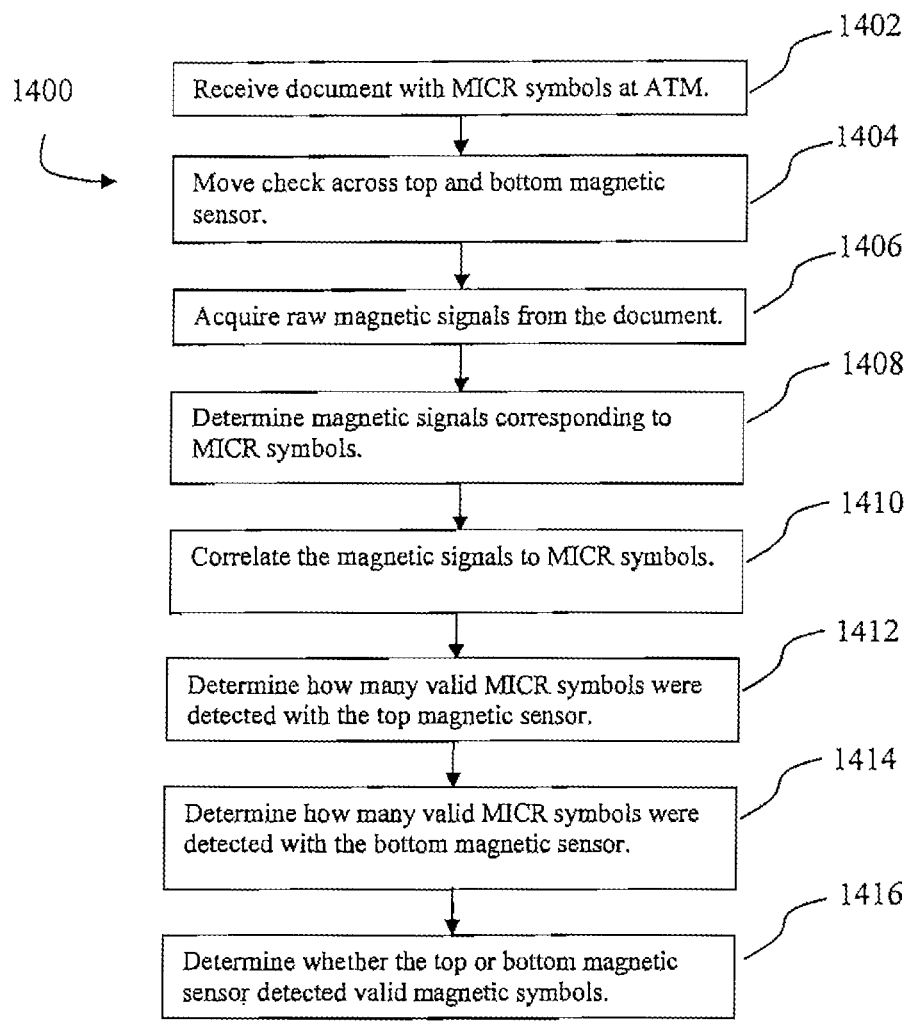
FIG. 44 shows steps in an example method to detect MICR symbols in any possible document orientation.

An example embodiment operative to detect E-13b MICR symbols in any of the four possible check orientations is represented schematically as a method 1400 in FIG. 44. Similar to other methods previously described the method begins at step 1402 where a document with MICR symbols is received at an automatic banking machine. In some embodiments the document is a banking check. At step 1404 the document is moved across "top" and "bottom" magnetic sensors. In some example embodiments the top magnetic sensor may be operative to be positioned adjacent the top of the check as the check is moved in a transport. In some example embodiments the top and bottom sensors may both be operative to read magnetic data from the face of the check facing magnetic sensor, or magnetic data on the rear side of the check facing away from the top magnetic sensor. At step 1406 magnetic signals are acquired from the top and bottom magnetic sensors as the check moves past the magnetic sensors. At step 1408 magnetic signal regions corresponding to MICR symbols are determined through operation of at least one processor. It should be understood that "top" and "bottom" refer to areas adjacent opposed the long side edges of the check and are used herein to refer to the exemplary graphic representations in the drawings. There is no requirement that one area of a check be positioned vertically higher than another area in carrying out the check analysis processes described in this application. At step 1410 the magnetic signal regions are correlated to MICR symbols through operation of a processor. A determination of how many valid and invalid MICR symbols are detected with the top magnetic sensor and how many valid and invalid MICR symbols are detected with the bottom magnetic sensor is made in steps 1412 and 1414. The determination in steps 1412 and 1414 in the exemplary embodiment is made using a sample feature vector analysis of the magnetic waveform based on a comparison to data corresponding to a standard set of predetermined symbol feature vectors similar to those in FIG. 24. In step 1416, responsive to step 1412 and 1414 it is determined whether the top or bottom magnetic sensors detected valid MICR symbols.

Figure 45:
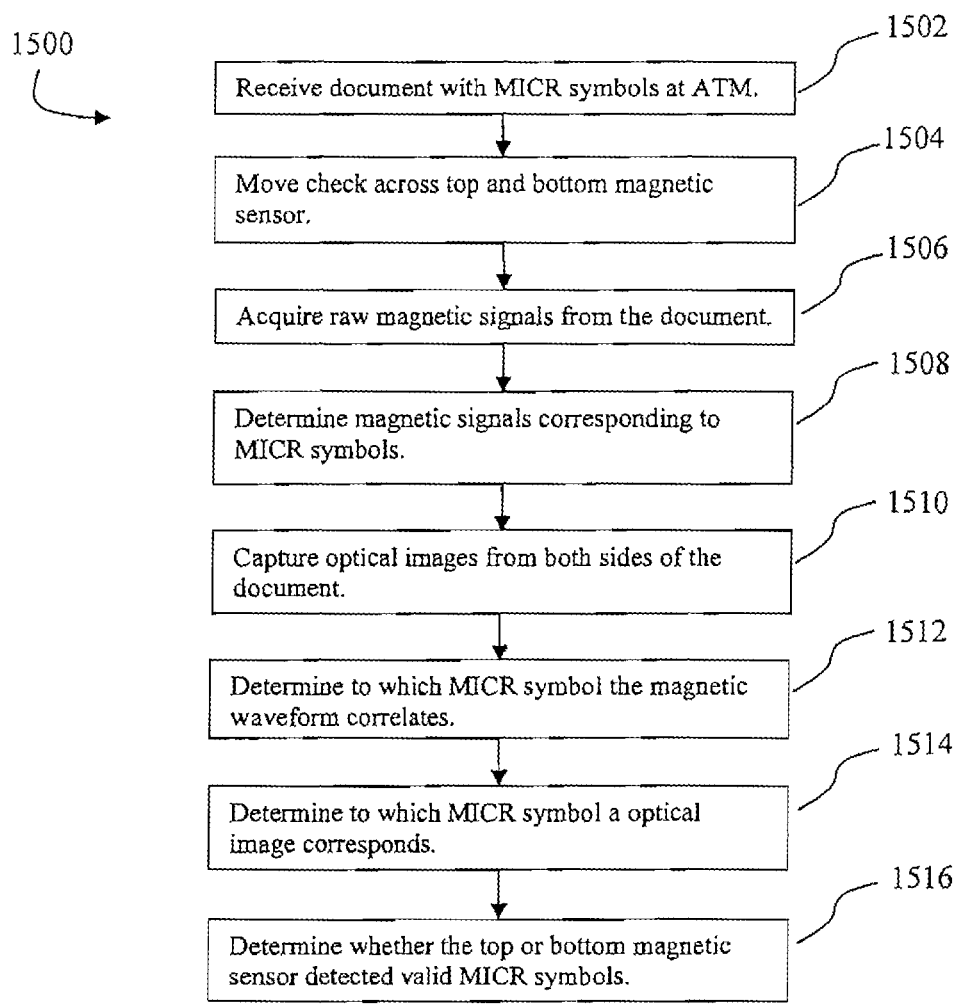
FIG. 45 shows steps in an example method to detect MICR symbols in any possible document orientation with optical assistance.

An example embodiment to detect CMC-7 MICR symbols in any of the four possible check orientations is shown schematically as method 1500 in FIG. 45. The method begins at step 1502 where a document with MICR symbols is received in an automatic banking machine. At step 1504 the document is moved across top and a bottom magnetic sensors. At step 1506 magnetic signals are acquired from the top and bottom magnetic sensors as the check moves past the magnetic sensors. At step 1508 magnetic signal regions corresponding to MICR symbols are determined through operation of a processor. At step 1510 an optical image is captured from both faces of the document. At step 1512 a determination is made as to which MICR symbols the magnetic signal region correlates. At step 1514 a determination is made through operation of a processor as to which MICR symbol the optical image of at least one MICR symbol corresponds. Responsive to steps 1512 and 1514, a determination is made as to whether the top or bottom magnetic sensor detected valid MICR symbols.

In some example embodiments optical character recognition (OCR) and magnetic symbol recognition techniques may be utilized in combination to improve MICR symbol detection results. In some example embodiments all the MICR symbols may be recognized using any of the earlier discussed techniques and all of the MICR symbols may be detected by OCR techniques. In some example embodiments the magnetic and OCR recognition results may be compared through operation of a processor for each symbol, position by position, to determine if both results agree. In some example embodiments if the results disagree, whether the magnetic or optical symbol will be associated with that position, may be resolved based on which MICR symbol and the magnetic technique associated with the symbol position. For example if the magnetic technique associated a "2" or "5" symbol to the character, and the optical results disagree, then because of the "2 or 5" dichotomy discussed below the optical result may be used. Of course this approach is exemplary.

In some example embodiments combining optical and magnetic recognition results may be useful to resolve the "2 or 5" dichotomy. For example in some example embodiments if the magnetic symbol recognition technique carried out through operation of a processor predicts the symbol is a "2" or a "5," then the resolved optical results may be assigned to that symbol position. The reason for favoring the optical results if the signal is a "2" or "5" is because it may often be difficult to distinguish a "2" from a "5" using magnetic symbol recognition techniques. In FIG. 23 the magnetic waveform for a "2" looks like the waveform for a "5" with the main difference being that a "5" has a larger center gap between peaks. Sometimes when a check is being moved by a transport past the magnetic sensors, the transport may slip and/or because of electrical noise, the space between peaks may be changed. When the center distance in a "5" shrinks it may look like a "2" and when the center distance in a "2" increases is may look like a "5." For other symbols that may be easier to detect magnetically than optically, the magnetic symbol may be used when a conflict with optical symbol recognition results is detected. Various approaches may be taken and carried out through processors executing the suitable program steps.

In some example embodiments a confidence level may be resolved through operation of a processor for each symbol that is magnetically recognized and an optical confidence level may be resolved for each symbol optically recognized. In some example embodiments the magnetic and optical confidence levels may be compared when there is a disagreement with regard to the detected symbol. In some example embodiments the highest confidence level may be selected. In some example embodiments when the magnetic confidence level is low, the data corresponding to the magnetic waveform sampled may be shifted and the magnetic symbol detection algorithm may be repeated to see if a better confidence level and correlation to the optical results may be achieved.

In some example embodiments an initial optical image of the entire check may be captured. Next the MICR symbols may be located and cropped from that image data. After the MICR symbols are cropped this image of the MICR symbols may be contrast boosted. In some example embodiments the contrast boosted image data may be de-skewed. The de-skewed image may be used with the OCR algorithm executed by a processor to optically recognize the MICR symbols.

Some example embodiments may operate to more accurately position E-13b peaks. In some example embodiments the data corresponding to peaks of the magnetic waveforms in FIG. 23 may correspond to eight fixed peak sample locations. The fixed peak sample locations may be equally spaced apart. As discussed above, the eight fixed peak sample locations may correspond to the eight elements in a feature vector of a symbol as in FIG. 24.

In some example embodiments when a peak is detected between sample locations it may be flagged through operation of a processor. This flagging technique may also be very useful in resolving the "2 or 5" dichotomy when a transport slips. For example if the third peak in FIG. 30 was between sample locations 3 and 4 at position 3.5, it would be flagged. In some sample embodiments when peak is flagged the processor manipulates the data so the peak will be moved to an adjacent sample position and a first E-13b feature vector for that waveform may be generated through operation of the processor with a peak at that location. In some example embodiments a second feature vector may be created with the flagged peak in the position of the other adjacent location. For example with the third peak of FIG. 30 at position 3.5 a first feature vector will be generated with the flagged peak at position 3 and a second feature vector will be generated with the peak at position 4. In some example embodiments data corresponding to both of these feature vectors may be correlated through operation of a processor to determine to which standard feature vector (corresponding to a known symbol) the sampled feature vector best correlated. The best of the two correlations may be selected and the other feature vector disregarded. In some example embodiments when a peak already exists at one adjacent location then only one feature vector may be created by moving a flagged peak to the other adjacent location.

In some example embodiments more than one peak of an E-13b MICR symbol waveform may be flagged through operation of a processor. For example peaks may be flagged when they may be detected at position 2.4 and at position 5.6. In this example case a feature vector may be generated by at least one processor manipulating the data in a way that corresponds to moving the first flagged peak to position 2 and the second flagged peak to position 5. A second feature vector may be created with the first flagged peak at position 3 and the second flagged peak at position 5. A third and fourth feature vector may be created with the second flagged feature vector at position 6 and the first flagged peak at positions 2 and 3. The four feature vectors for the flagged peaks may now be correlated through operation of a processor to the standard feature vectors of FIG. 24 to determine which one is the best correlation.

In some example embodiments an E-13b sample feature vector may be generated that does not correspond well with any standard feature vector. In some example embodiments when the correlation is poor data corresponding to a first peak may have been missed and caused poor correlation. In some example embodiments when the correlation is poor a leading peak may be inserted at E-13b position 1 (when using the eight position feature vector discussed above). In some example embodiments the magnitude of the feature vector inserted at position 1 may be an average of all possible position 1 valid peak magnitudes. The feature vector may now be correlated through operation of a processor to determine if there is now a good correlation with a standard E-13b feature vector.

Figure 46:
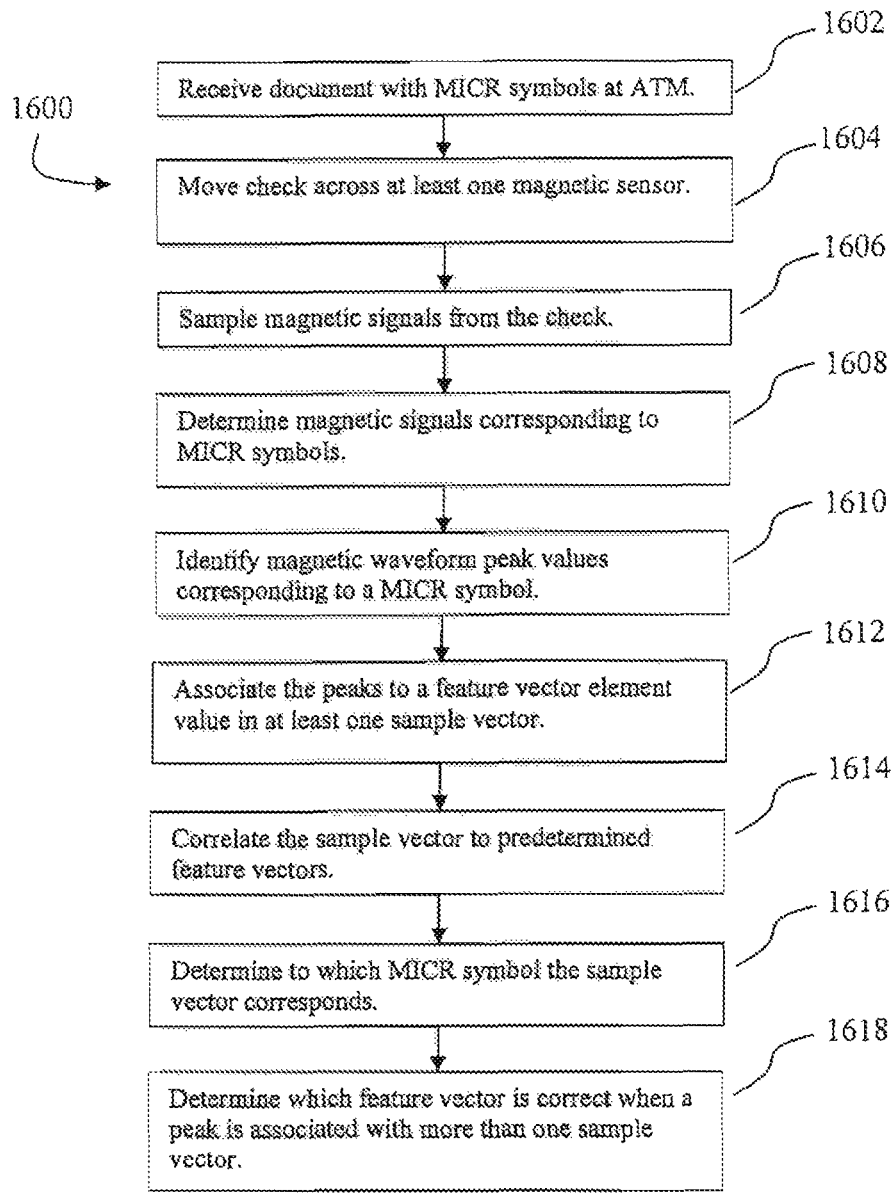
FIG. 46 shows an example method to detect MICR symbols using magnetic waveform peaks.

An example embodiment to detect E-13b MICR symbols using the flagging of peaks is represented by steps of a method 1600 in FIG. 46. The method begins at step 1602 where a document with MICR symbols is received in an automatic banking machine. At step 1604 the document is moved across at least one magnetic sensor. In step 1606 magnetic samples are sampled from sensor output through operation of circuitry including a processor as the sensor senses the document. In step 1608 it is determined through operation of the processor which magnetic signals correspond with MICR symbols. At step 1610 data values corresponding to magnetic waveform MICR symbol peak values are generated. In step 1612 the peak data values are used by a processor to generate sample feature vector element values and generate at least one sample feature vector. If a peak location is in between two feature vector locations then the peak may be flagged and associated through operation of a processor with an additional feature vectors in this step. At step 1614 the sample feature vector is compared to each of a plurality of predetermined symbol feature vectors of a MICR font. At step 1616 a determination is made through operation of a processor as to which MICR feature vector the sample feature vector generally corresponds. If a peak data value may result in more than one feature vector in step 1612, then in step 1618 a determination is made by the processor as to which feature vector is likely the valid sample feature vector.

In some example embodiments data corresponding to missing peaks may be added or extra peaks may be removed through operation of the processor when detecting CMC-7 MICR peaks. As discussed earlier and shown in the example CMC-7 waveform in FIG. 31, the standard CMC-7 feature vectors correspond to distance between magnetic CMC-7 MICR waveform peaks. In some example embodiments the distances between peaks may be one of short or long distances. The feature vectors of FIG. 31 all may have only two long and four distances represented in the elements of a CMC-7 MICR symbol feature vector. Because every CMC-7 feature vector waveform has the distance between peaks, there should be seven peaks detected for every CMC-7 MICR symbol.

In some example embodiments when three short peaks should be detected but only two short peaks are detected, data corresponding to a peak may be inserted through operation of the processor in between the longest of the long distances between peaks. The resulting waveform may now have the required two long and four short peak distances for a valid CMC-7 symbol. In some example embodiments when four long peaks are detected but zero short peaks are detected, data corresponding to a peak may be inserted in between each of the two longest of the long distances between peaks. In some example embodiments when a peak is missing, a threshold of a peak magnitude may be used to detect valid peaks may be lowered through the processor operating to change threshold values in accordance with its programming. Lowering the peak threshold may result in a missing peak being detected. Of course these approaches are exemplary.

In some example embodiments data may be processed such that CMC-7 MICR symbol waveform peaks are removed through operation of the processor when more than seven peaks are detected. In some example embodiments when one long distance between peaks and six short distances between peaks is detected, data corresponding to the peak between the two corresponding shortest distances may be removed. In some example embodiments when an extra peak is detected, the distance to the next peak on both sides of each peak may be calculated and data corresponding to the peak with the shortest distances to both adjacent peaks may be removed. In some example embodiments when an extra peak is detected and two adjacent peaks have a high weight and are located very near to one another with regard to distance transversely across the symbol, data corresponding to one of those peaks may be removed. The programming associated with the processor is operative to carry out manipulation of the data to accomplish such analysis.

In some example embodiments when data corresponding to a first peak is removed, the resulting CMC-7 feature vector may be cross correlated with the standard predetermined symbol feature vectors of FIG. 31. If after comparison for correlation the confidence level is low, the processor may operate to modify the data such that the removed first peak is reinserted and a different second peak is removed. The feature vector that corresponds to the second peak being removed may be analyzed through operation of the processor and compared for correlation with data for known symbols to see if the first or second feature vector results in a better correlation.

In some example embodiments data corresponding to the distances between peaks may be calculated and compared to the standard feature vector values for short distances (10) and the standard feature vectors for long distances (15) between peaks to determine which peak to remove or where to insert a missing peak. For example if there is an extra peak and sequential relative distances of 15, 15, 10, 10, 10, 2, and 8 are between peaks, then the data corresponding to the peak between the distances of 2 and 8 will be removed leaving a feature vector corresponding to the sequential consists of relative distances of 15, 15, 10, 10, 10, 10.

In another example if data corresponding to sequential relative distances of 15, 9, 6, 10, 10, 10, 10 are detected, there must be an extra peak because seven distances were detected. For CMC-7 there must always be four short distances and here they may already be detected because the four distances of 10 correspond to the feature vector short distances in FIG. 31. Additionally, the first value of 15 corresponds well with the long values of FIG. 31. In some example embodiments at least one processor may be operative to calculate and detect that if the peak between the values 9 and 6 is removed, then a second long value of 15 will result, so that peak may be the one removed.

In another example the relative sequential distances between peaks of 30, 10, 10, 10, 10 are detected, so a peak must be missing. In this case, the processor may be operative to calculate and detect that if a peak is inserted in the middle of the distance 30, then the result may produce the two missing long distances each equal to 15.

In another example the sequential relative distances between peaks of 15, 25, 10, 10, 10 are detected so a peak must be missing. In this case at least one processor may be operative to calculate and detect that if a peak is inserted at a location within the 25 distance, then the result may produce the missing long distance and the missing short distance. In this example it is determined by the processor that it may not be best to place the missing peak in the middle of the distance of 25 because the sequence of distances 15, 12.5, 12.5, 10, 10, 10 may be the result. It may be better to generate a possible vector of 15, 15, 10, 10, 10, 10, and a second possible vector of 15, 10, 15, 10, 10, 10 and then compare these vectors with a symbol resolved another recognition technique such as image analysis to determine the correct CMC-7 MICR symbol.

In some example embodiments the CMC-7 feature vector resulting from peaks being removed or inserted may not correlate well with any of the standard feature vectors of FIG. 31. In that case, the processor operates so that data corresponding to a removed peak is reinserted or an added peak may be removed and a different peak is removed or inserted. The new sample feature vector may be re-correlated to determine if the new feature vector has a better correspondence.

Figure 47:
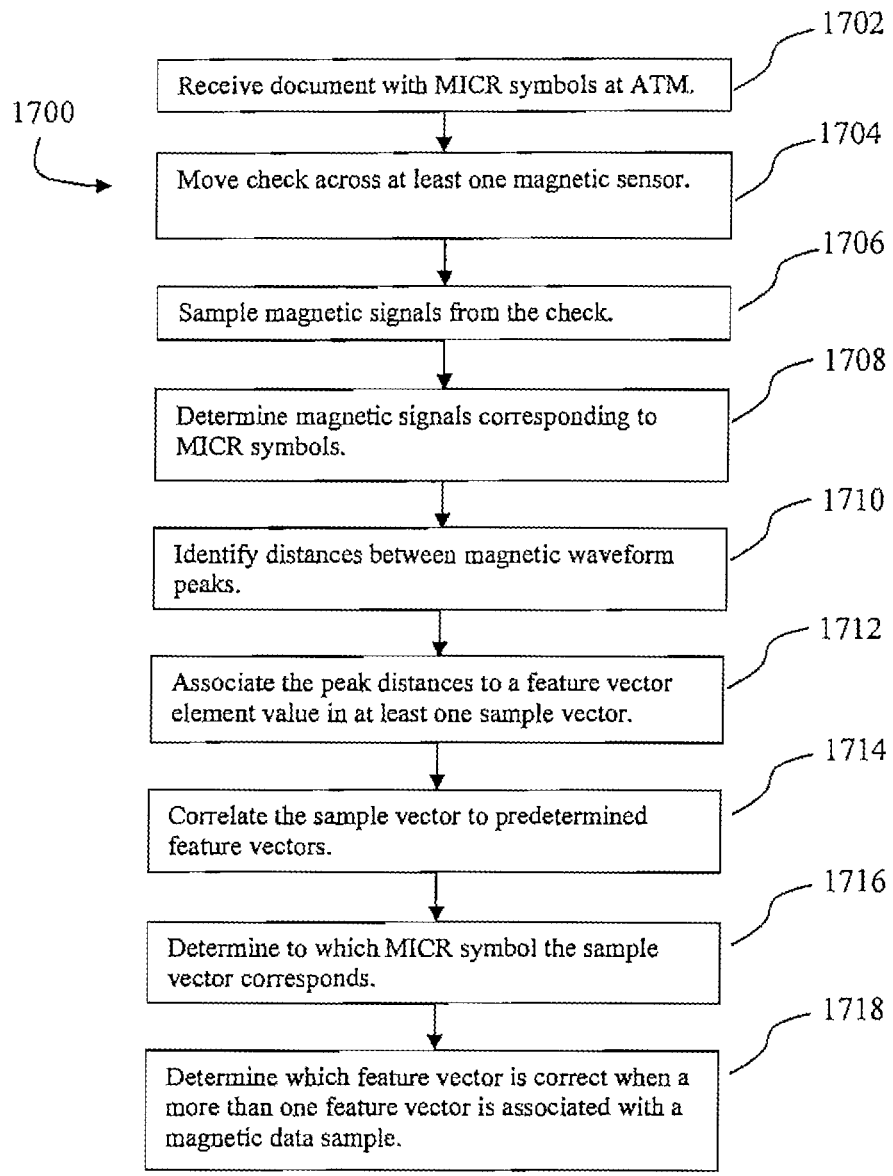
FIG. 47 shows steps in an example method to detect MICR symbols using magnetic waveform peak distances.

An example embodiment to determine E-13b MICR symbols using the flagging of distances between peaks is represented schematically as a method 1700 in FIG. 47. The method begins at step 1702 where a document with MICR symbols is received at an automatic banking machine. At step 1704 the document is moved across at least one magnetic sensor. In step 1706 magnetic samples corresponding to signals from the sensor are sampled from the document. In step 1708 it is determined through operation of a processor which magnetic signals correspond with MICR symbols. At step 1710 data corresponding to relative distances between magnetic waveform MICR symbol peaks are generated. At step 1712 peak distances are used to generate a sample feature vector. In this step if a peak is missing or there is an extra peak, then more than one feature vector may be generated. At step 1714 the sample feature vector may be analyzed for correlation to each of a plurality of predetermined symbol feature vectors. In step 1716 it is determined to which MICR symbol the sample feature vector generally corresponds. At step 1718, in the case when more than one sample feature vector was generated in step 1712, a determination is made as to which sample feature vector the corresponding MICR symbol is most likely correct. OCR results determined through operation of a processor may be used in this step to verify the correct MICR symbol.

Figure 48:
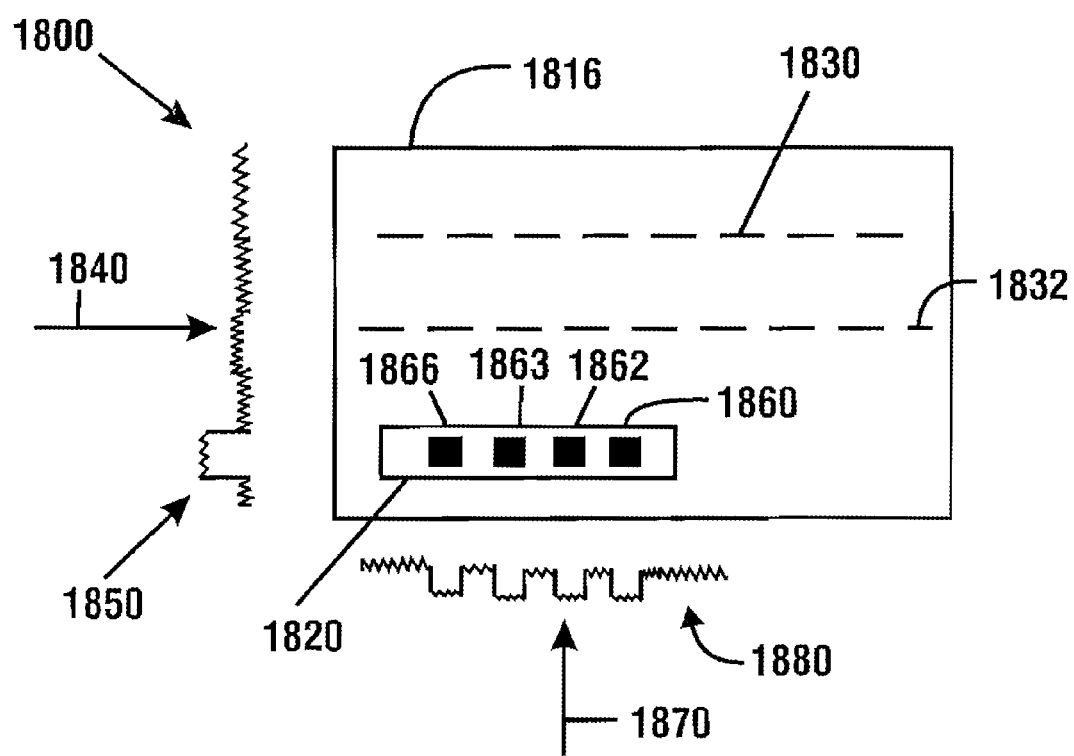
FIG. 48 shows a visual representation of an example of how to detect MICR symbols using optical scan lines.

In some example embodiments optical scan lines may be used to locate the MICR line on a document or a check. In some example embodiments once the position of a MICR symbol is detected using scan lines, data corresponding to the location of the symbol may be given to an OCR software application operating in a processor. FIG. 48 graphically illustrates data analysis carried out by a processor corresponding to the use of optical scan lines to locate MICR symbols 1860, 1862, 1863, 1866. It should be understood that the references to horizontally and vertically refer to the corresponding representation in the drawings only. In some example embodiments the check 1810 is horizontally scanned as shown by example scan lines 1830 and 1832. In some example embodiments image data corresponding to the MICR line 1820 may be optically cropped from the check. In some example embodiments data from any number of suitable scan lines may be captured and the number of scan lines may depend on the type of optical scanner used. As the check 1810 is scanned horizontally in the graphical representation shown, data corresponding to vertical graph 1850 corresponding to the intensity of the image being scanned may be produced based on pixel values through operation of the processor. In some example embodiments the MICR symbols 1860, 1862, 1863, 1866 on a check may be at least a 30% darker contrast than the other visible images on the check. Because the MICR symbols may be darker than the rest of the check, data corresponding to a vertical graph 1850 may be produced through operation of the processor that is operative to allow the spatial location of the MICR symbols 1860, 1862, 1863, 1866 to be determined. The "vertical" graph may in some embodiments comprise a waveform representing optical image density of a scan line corresponding to the vertical location of the scan line on the check 1810. The location may be determined by the processor detecting where the vertical graph 1850 optical density is higher than the rest of the optical intensity of the rest of the check. This is based on the pixel values corresponding to darkness of the printed MICR symbols. In some example embodiments the vertical location of the MICR line 1820 may now be presented to an OCR software application.

In some example embodiments the image data corresponding to the MICR line 1820 may now be horizontally cropped. In some example embodiments the data corresponding to MICR line 1820 may now be contrast boosted. In some example embodiments the MICR line 1820 may now be optically vertically scanned 1870 to determine the positions of the individual MICR symbols 1860, 1862, 1863, 1866. Data corresponding to a horizontal graph 1880 may be produced and the processor is operative to cause the horizontal locations of the MICR symbols 1860, 1862, 1863, 1866 to be located. The horizontal graph may be a waveform representing optical image density of a vertical scan line corresponding to horizontal location of the scan line on the check 1810. The symbol locations may be determined through operation of a processor by detecting where the horizontal graph 1880 optical density (darkness of pixels) is greater than the rest of the optical intensity of the rest of the check. In some example embodiments data corresponding to the horizontal location of the MICR symbols 1860, 1862, 1863, 1866 may now be input to an OCR software application operating in a processor. In some example embodiments about 11 vertical scans of each MICR symbol may be performed responsive to operation of a processor to accurately detect the horizontal location of a MICR symbols 1860, 1862, 1863, 1866. In some example embodiments the use of optical scanning to locate a MICR symbol may reduce computational resources as compared to having traditional OCR software perform both the MICR symbol location and the MICR symbol recognition. Of course these approaches are exemplary.

Figure 49:
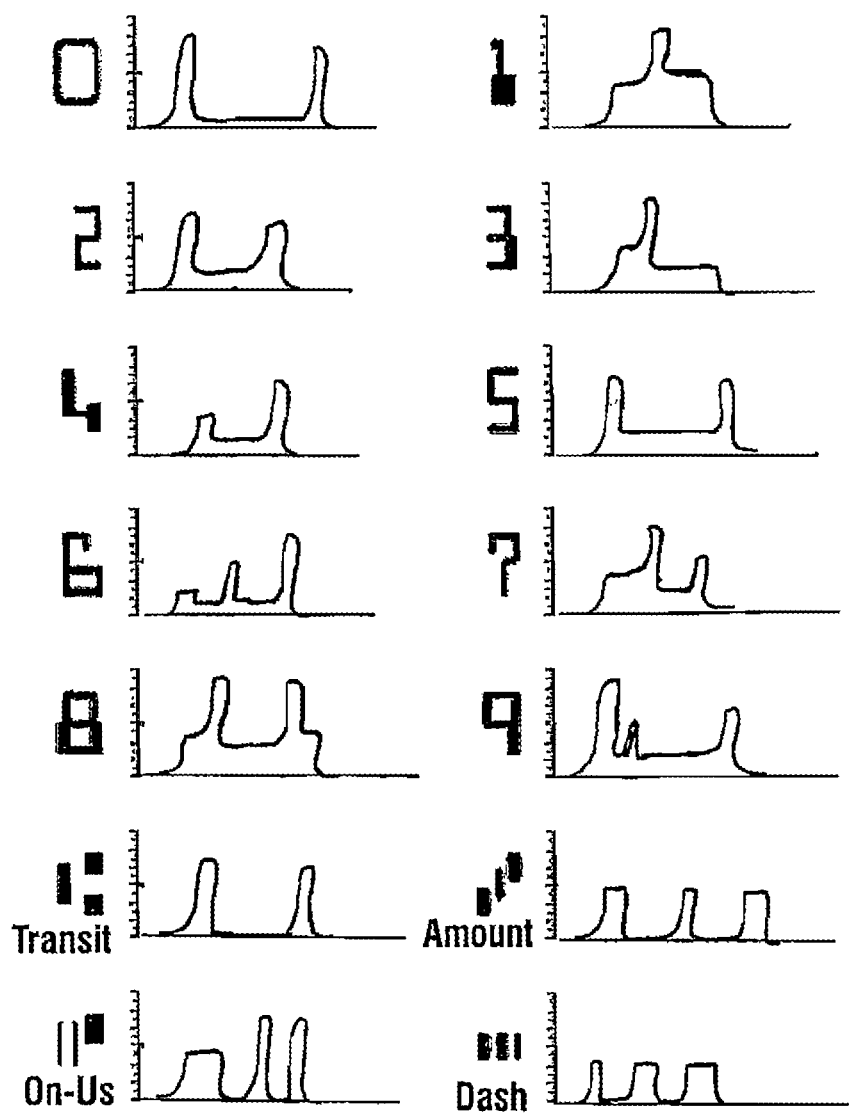
FIG. 49 shows an example of graphical representations of optical image intensity waveforms.

In some example embodiments it may be possible to use a single lineal sensor array optical scan to determine to what MICR symbol the optical scan image data corresponds. FIG. 49 is a graphical representation of what the optical density data may look like for each if the E-13b MICR symbols when the symbols are scanned with a contact image sensor comprising a linear sensing array from right to left. In some example embodiments the waveforms of FIG. 49 may correlate to the derivatives of the magnetic waveforms of FIG. 23.

In some example embodiments the waveforms of FIG. 49 may be sampled through operation of a processor to produce an optical feature vector for each if the E-13b MICR symbols as was done in FIG. 23 to produce the standard magnetic feature vectors of FIG. 24. After a standard optical feature vector table is derived and stored in a data store, then the E-13b MICR symbols may be optically scanned and an optical sample feature vector generated. The optical sample feature vector may then be compared through operation of a processor for correlation to data for the plurality of predetermined standard optical symbol feature vectors to determine to which symbol the optical sample feature vector may correspond. In some example embodiments the optical signal may be sampled in the eight standard locations as discussed earlier and an optical sample feature vector with eight elements may be generated. The eight feature vector elements may correspond to the amplitude of the waveforms in FIG. 49 at eight fixed locations. The earlier discussed sampling, filtering and correlating techniques described for magnetic MICR waveforms may be applied in whole or in part to the optical intensity MICR waveforms. Of course these approaches are exemplary and in other embodiments other approaches may be used.

It is to be understood, that although a Pearson correlation has been described in the above example embodiments, in alternative example embodiments, other types of correlation calculations may be carried out through operation of at least one processor to determine which of the fourteen standard E-13b symbols or the fifteen standard CMC-7 symbols most closely matches a MICR line symbol on a check. Further, although the above described example method discusses symbols on a check in the E-13b font, in other example embodiments, the above described detection method may be used to magnetically detect symbols printed on checks in other types of fonts in the MICR line or elsewhere.

Also, in other example embodiments, different MICR fonts may be detected using different circuits connected in parallel to the magnetic sensor. Each of the different circuits may be tuned to more accurately capture magnetic waveforms which properly distinguish the symbols in the different respective MICR fonts.

Figure 29:
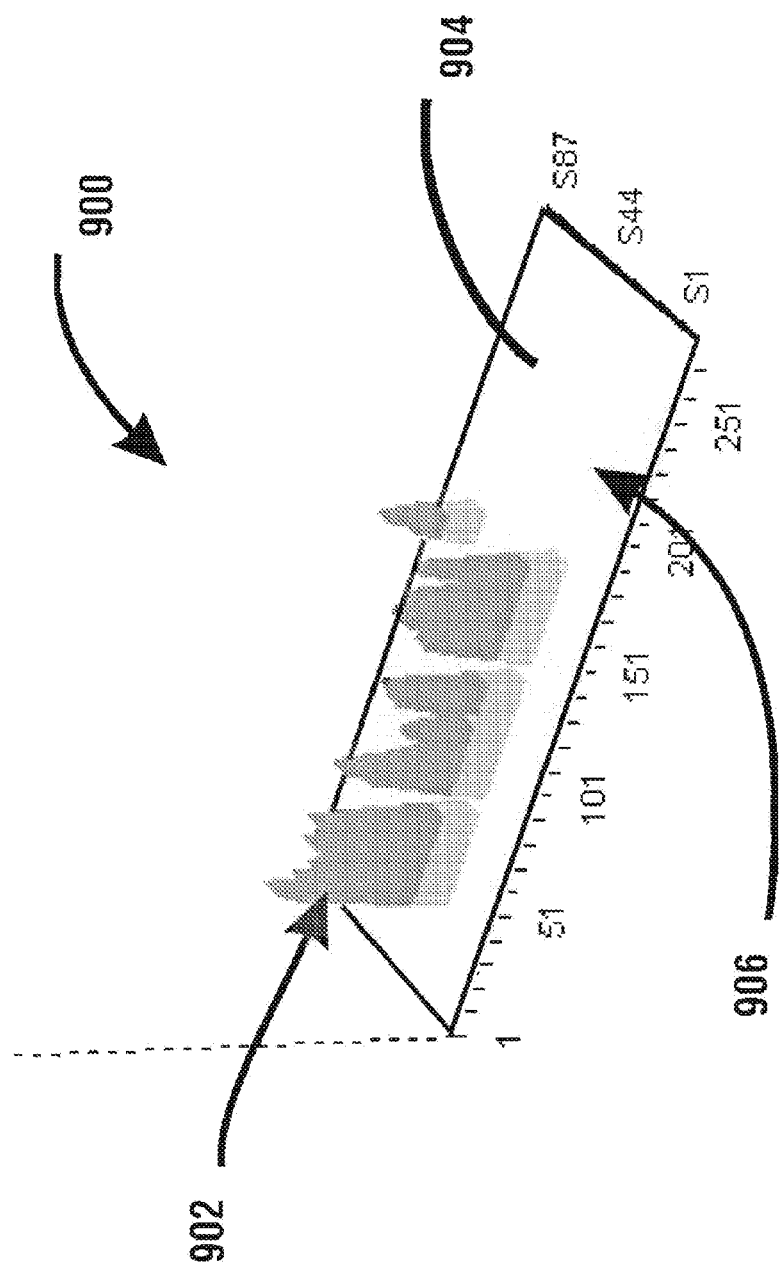
FIG. 29 shows an example of a three dimensional graphical representation of magnetic patterns on a check.

FIG. 29 shows an example of a three-dimensional graphical representation 900 of magnetic patterns on a check as detected by the reader head in an example embodiment of a check processing device. The grayscale features 902 projecting from a surface 904 representation of the check correspond to the levels of the magnetic signals detected at the corresponding locations on the check. The vertically higher the grayscale feature, the relatively stronger the magnetic signal for that location. The absence of grayscale features on portions 906 of the check indicates that magnetic signals were either not detected or were below a minium threshold for those portions on the check. In an exemplary embodiment a diagnostic software application is operative to generate data corresponding to such a three-dimensional graphical representation of the magnetic patterns on documents responsive to magnetic scans produced by the check processing device. Such graphical representations 900 produced by the software for a given document may be output through a display on the ATM and used to aid a user in identifying magnetic features useful for identifying the type or other characteristics of the document. Information about the identified magnetic features may then be incorporated into the programming of the ATM.

For example, an embodiment may carry out a method of generating data corresponding to such three dimensional graphs through operation of a computer and displaying such graphs through a display device. The data corresponding to such graphs may be generated from magnetic scans directly received from an operating check processing device, or the graphs may be generated from magnetic scans previously generated and stored in a data store in the ATM.

In this described example embodiment, the method may also include programming corresponding to identifying two-dimensional areas or zones on the check which may and/or may not be associated with magnetic signals of particular levels. The method may also include storing through operation of a processor the data corresponding to the identified areas and levels in a data store in operative connection with the ATM. The method may also include configuring and/or programming the ATM so that the processor in is responsive to the stored data when evaluating the processed documents.

Computer executable software instructions used in operating the automated banking machines and connected computers, and such instructions may be resident on and/or loaded from computer readable media or articles of various types into the respective processors. Such computer executable software instructions may be included on and loaded from one or more articles such as diskettes, compact disks, CDs, DVDs, tapes, flash memory device, hard drives, RAM, ROM and/or other internal or portable storage devices placed in operative connection with the automated banking machine. Other articles which include data representative of the instructions for operating computers in the manner described herein are suitable for use in achieving operation of automated banking machines and systems in accordance with example embodiments.

The example embodiments of the automated banking machines and systems described herein have been described with reference to particular methods, components and features. Other embodiments may include other or different methods, components or features which provide similar functionality.

Thus the example embodiments achieve at least some of the above stated objectives, eliminate difficulties encountered in the use of prior devices and systems, and attain the useful results described herein.

In the foregoing description certain terms have been described as example embodiments for purposes of brevity, clarity and understanding. However no unnecessary limitations are to be implied therefrom because such terms are used for descriptive purposes and are intended to be broadly construed. Moreover the descriptions and illustrations herein are by way of examples and the embodiment is not limited to the features shown or described.

Further, in the following claims any feature described as a means for performing a function shall be construed as encompassing any means known to those skilled in the art as being capable of carrying out the recited function, and shall not be deemed limited to the particular means shown or described for performing the recited function in the foregoing description, or mere equivalents thereof.

Having described the features, discoveries and principles of the embodiments, the manner in which it is constructed and operated, any of the advantages and useful results attained; the new and useful structures, devices, elements, arrangements, parts, combinations, systems, equipment, operations, methods, processes and relationships are set forth in the appended claims.

We claim:

1. Apparatus comprising:
    an automated banking machine that is operable responsive at least in part to data read from data bearing records,
        wherein the machine includes at least one data reader,
            wherein the at least one data reader is operable to read user data usable to identify a financial account,
        wherein the machine includes a cash dispenser,
        wherein the machine includes a document acceptor,
            wherein the document acceptor is operable to accept checks and currency notes from machine users,
        wherein the machine includes at least one processor,
            wherein the at least one processor is operable to allow a user of the machine to carry out a document deposit transaction on a financial account responsive at least in part to computer-determined correspondence between user data read by the at least one data reader and authorized user data stored in at least one authorized user data store,
                wherein the at least one processor is operable to cause the financial account to be credited a value associated with a deposited amount,
        wherein the machine includes scanning sensors,
            wherein the scanning sensors are operable to capture a first image which includes a first visible representation of a first side of a document being deposited,
                wherein the first image includes pixels,
                wherein the first visible representation comprises first image data,
                    wherein the first image data includes a first arrangement of pixels,
        wherein the machine includes at least one display,
            wherein the at least one display includes a user display,
                wherein the user display is operable to provide visible outputs to machine users,
                wherein the user display allows the user to provide inputs associated with the document deposit transaction, including input corresponding to the deposited amount,
        wherein the at least one processor is in operative connection with the at least one data reader, the document acceptor, the cash dispenser, the scanning sensors, and the at least one display,
        wherein the at least one processor is operable to determine whether the first visible representation is in a skewed orientation in the first image,
            wherein the at least one processor is operable responsive at least in part to a positive determination, to cause the first arrangement of pixels to be rotated relative to other pixels of the first image to cause the first visible representation to be placed in a deskewed orientation,
            wherein the at least one processor is operable to cause the user display to display a document image that includes the first visible representation in the deskewed orientation,
            wherein the at least one processor is operable to resolve first document data from the document image,
            wherein the at least one processor is operable to cause to be communicated to at least one remote computer remotely located from the machine, both
                the first document data, and
                user data usable to identify the financial account.

2. The apparatus according to claim 1 wherein the machine is part of a banking system that includes a plurality of cash dispensing automated banking machines,
    wherein the at least one data reader includes a card reader and a biometric reader,
    wherein the at least one processor is operative during a transaction to cause both
        card data to be read from a user card through operation of the card reader, and
        biometric data to be read from a user through operation of the biometric reader,
    wherein the at least one processor is operative to cause read card data to be compared with card information stored in an authorized user information data store,
    wherein the at least one processor is operative to cause read biometric data to be compared with biometric information stored in the authorized user information data store,
    wherein the at least one processor is operative to authorize a machine user to request the document deposit transaction responsive at least in part to both:
        computer-determined correspondence between the read card data and stored card information, and
        computer-determined correspondence between the read biometric data and stored biometric information.

3. The apparatus according to claim 1 wherein the document acceptor is operable to receive paper checks from machine users, wherein the document acceptor includes at least one document image scanner, and wherein the at least one document image scanner includes the scanning sensors.

4. The apparatus according to claim 3 wherein the document acceptor includes a document analysis module, wherein the document analysis module includes a camera, and wherein the camera includes the at least one document image scanner.

5. The apparatus according to claim 4 wherein the document analysis module includes at least one magnetic sensor, and wherein the at least one magnetic sensor is operable to read magnetic data from a micr line of a check.

6. The apparatus according to claim 1 wherein the scanning sensors include at least one image data reader, wherein the at least one processor is operative to cause the at least one image data reader to read the first document data from the document image.

7. The apparatus according to claim 6 wherein the first document data includes a document amount, wherein the at least one processor is operative to cause the at least one image data reader to read the document amount from the document image.

8. The apparatus according to claim 1 wherein the at least one processor is in operative connection with at least one wireless communications network, and wherein the at least one processor is operative to cause the first document data to be sent over the at least one wireless communications network to the at least one remote computer.

9. The apparatus according to claim 1 wherein the scanning sensors are operable to capture a second image which includes a second visible representation of a second side of the document being deposited, wherein the at least one processor is operable to cause the user display to display the second image.

10. An apparatus operable by a user to make a check deposit into a financial account, comprising:
   at least one document image scanner,
      wherein the at least one document image scanner is operable to capture a first check image which includes a first visible representation of a first side of a check being deposited,
      wherein the first check image includes pixels,
      wherein the first visible representation comprises first image data,
         wherein the first image data includes a first arrangement of pixels,
      wherein the at least one document image scanner is operable to capture a second check image which includes a second visible representation of a second side of the check,
      wherein the second side is opposite the first side,
      wherein the second check image includes pixels,
      wherein the second visible representation comprises second image data,
         wherein the second image data includes a second arrangement of pixels,
   a user display,
      wherein the user display is operable to display the first visible representation and the second visible representation,
      wherein the user display allows the user to provide inputs associated with the check deposit, including input corresponding to a check amount of the check,
   at least one processor,
      wherein the at least one processor is in operative connection with the at least one document image scanner and the user display,
      wherein the at least one processor is operable to determine whether the first visible representation is in a skewed orientation in the first check image,
         wherein the at least one processor is operable responsive at least in part to a positive determination, to cause the first arrangement of pixels to be rotated relative to other pixels of the first check image to cause the first visible representation to be placed in a deskewed orientation,
      wherein the at least one processor is operable to cause the user display to display the first visible representation and the second visible representation,
         wherein the at least one processor is operable to cause the user display to display the first visible representation in the deskewed orientation,
      wherein the at least one processor is operable to resolve check data from the first visible representation,
      wherein the at least one processor is operable to cause to be wirelessly communicated to at least one remote computer, both
         the check data resolved, and
         data usable to identify the financial account.

11. The apparatus according to claim 10 wherein the apparatus comprises an automated banking machine, wherein the machine is part of a banking system,
   wherein the machine includes a cash dispenser,
   wherein the machine includes a document acceptor,
      wherein the document acceptor is operable to receive paper checks from machine users,
   wherein the machine includes at least one data reader,
      wherein the at least one data reader is operable to read the data usable to identify the financial account,
   wherein the at least one processor is operable to allow a machine user to carry out a check deposit transaction on a financial account responsive at least in part to computer-determined correspondence between user data read by the at least one data reader and authorized user data stored in at least one authorized user data store,
   wherein the at least one processor is operable to cause the financial account to be credited a value associated with the check amount.

12. An apparatus operable by a user to make a check deposit into a financial account, comprising:
   at least one document image scanner,
      wherein the at least one document image scanner is operable to capture a first check image which includes a first visible representation of a first side of a check being deposited,
      wherein the first check image includes pixels,
      wherein the first visible representation comprises first image data,
         wherein the first image data includes a first arrangement of pixels,
      wherein the at least one document image scanner is operable to capture a second check image which includes a second visible representation of a second side of the check,
      wherein the second side is opposite the first side,
      wherein the second check image includes pixels,
      wherein the second visible representation comprises second image data,
         wherein the second image data includes a second arrangement of pixels,
   a user display,
      wherein the user display is operable to display the first visible representation and the second visible representation, wherein the user display allows the user to provide inputs associated with the check deposit, including input corresponding to a check amount of the check, at least one processor,
- wherein the at least one processor is in operative connection with the at least one document image scanner and the user display,
- wherein the at least one processor is operable to determine whether the first visible representation is in a skewed orientation in the first check image,
  - wherein the at least one processor is operable responsive at least in part to a positive determination, to cause the first arrangement of pixels to be rotated relative to other pixels of the first check image to cause the first visible representation to be placed in a deskewed orientation,
- wherein the at least one processor is operable to cause the user display to display the first visible representation and the second visible representation,
- wherein the at least one processor is operable to cause to be wirelessly communicated to at least one remote computer, both
  - check data corresponding to the first visible representation in the deskewed orientation, and
  - data usable to identify the financial account.

13. The apparatus according to claim 12 wherein the apparatus comprises an automated banking machine, wherein the machine is part of a banking system,
- wherein the machine includes a cash dispenser,
- wherein the machine includes a document acceptor,
  - wherein the document acceptor is operable to receive paper checks from machine users,
- wherein the machine includes at least one data reader,
  - wherein the at least one data reader is operable to read the data usable to identify the financial account,
- wherein the at least one processor is operable to allow a machine user to carry out a check deposit transaction on a financial account responsive at least in part to computer-determined correspondence between user data read by the at least one data reader and authorized user data stored in at least one authorized user data store,
  - wherein the at least one processor is operable to cause the financial account to be credited a value associated with the check amount.

14. The apparatus according to claim 12 wherein the at least one processor is operable to cause the user display to display the first visible representation in the deskewed orientation.

15. The apparatus according to claim 12 wherein the at least one processor is operable to cause the check data to be resolved from the first visible representation, and wherein the at least one processor is operable to cause the check data resolved to be wirelessly communicated to the at least one remote computer.

16. The apparatus according to claim 15 wherein the at least one processor is operable to cause the check data to be resolved from the first visible representation in the deskewed orientation.

17. The apparatus according to claim 15 wherein the check data includes the check amount, wherein the at least one processor is operable to resolve the check amount from the first visible representation.

18. The apparatus according to claim 12 wherein the at least one processor is in operative connection with at least one wireless communications network, and wherein the at least one processor is operative to cause the check data to be sent over the at least one wireless communications network to the at least one remote computer.

19. The apparatus according to claim 18 wherein the at least one wireless communications network comprises a wireless phone network, and wherein the at least one processor is operative to cause the check data to be sent over the at least one wireless phone network to the at least one remote computer.

20. The apparatus according to claim 12 wherein the at least one document image scanner includes a camera.

* * * * *